(12) United States Patent
Li

(10) Patent No.: US 8,935,931 B2
(45) Date of Patent: Jan. 20, 2015

(54) METHOD OF ADDING ADJACENT HIGH-TEMPERATURE HEATING-SIDE FOR ABSORPTION HEAT

(76) Inventor: Huayu Li, Qingdao (CN)

( * ) Notice: Subject to any disclaimer, the term of this patent is extended or adjusted under 35 U.S.C. 154(b) by 679 days.

(21) Appl. No.: 13/055,713

(22) PCT Filed: Jul. 22, 2009

(86) PCT No.: PCT/CN2009/072874
§ 371 (c)(1),
(2), (4) Date: Jan. 25, 2011

(87) PCT Pub. No.: WO2010/009673
PCT Pub. Date: Jan. 28, 2010

(65) Prior Publication Data
US 2011/0296854 A1      Dec. 8, 2011

(30) Foreign Application Priority Data

Jul. 25, 2008   (CN) .......................... 2008 1 0138676
Oct. 14, 2008   (CN) .......................... 2008 1 0166576

(51) Int. Cl.
| | | |
|---|---|---|
| F25B 45/00 | (2006.01) | |
| F25B 15/02 | (2006.01) | |
| F25B 30/04 | (2006.01) | |

(52) U.S. Cl.
CPC ................ *F25B 15/02* (2013.01); *F25B 30/04* (2013.01); *Y02B 30/62* (2013.01)
USPC ........ 62/77; 62/119; 62/483; 62/489; 62/101; 62/476

(58) Field of Classification Search
CPC .......... F25B 15/02; F25B 30/04; Y02B 30/62
USPC ....................... 62/77, 104, 101, 476, 483, 489
See application file for complete search history.

(56) References Cited

U.S. PATENT DOCUMENTS

| | | | | |
|---|---|---|---|---|
| 3,483,710 | A * | 12/1969 | Bearint .............................. | 62/79 |
| 4,484,456 | A * | 11/1984 | Reimann .......................... | 62/476 |
| 4,505,123 | A * | 3/1985 | Kusakabe et al. ............... | 62/148 |
| 5,727,397 | A * | 3/1998 | He .................................. | 62/476 |
| 5,782,097 | A * | 7/1998 | Phillips et al. .................. | 62/101 |
| 6,035,650 | A * | 3/2000 | Winnington et al. ........... | 62/105 |
| 6,128,917 | A * | 10/2000 | Riesch et al. .................... | 62/476 |
| 6,536,229 | B1 * | 3/2003 | Takabatake et al. ............ | 62/476 |
| 7,225,634 | B2 * | 6/2007 | Inoue .............................. | 62/476 |

(Continued)

*Primary Examiner* — Mohammad M Ali
*Assistant Examiner* — Raheena Rehman

(57) ABSTRACT

This invention belongs to the area of heat pump/refrigeration technology, which provides absorption heat pump of multi-terminal heating and the ways of additional adjacent high-temperature heating-side.

Refrigerating fluid flows from a generator to a new absorber, and then into a new absorption-evaporator, and finally into the generator.

Refrigerating fluid flows from the generator to the new absorption-evaporator, and then into the new absorber, the generator.

Refrigerant vapor in the condenser flows through a new throttle, and then into the new absorption-evaporator and the new absorber.

Refrigerant vapor in the evaporator flows through the new liquid refrigerant pump, and then into the new absorption-evaporator and the new absorber.

The pipeline of heated medium in the new absorber is connected with the external.

The invention can form new units of simple structure and high heating temperature, and reduce the temperature requirement of cooling medium or actuated-hot when it is used to refrigeration type.

13 Claims, 59 Drawing Sheets

(56) References Cited

U.S. PATENT DOCUMENTS

2005/0132724 A1* 6/2005 Sharma et al. .................. 62/101
2005/0250811 A1* 11/2005 Berner et al. .................. 514/319
2006/0230776 A1* 10/2006 Inoue et al. .................. 62/324.2
2008/0302122 A1* 12/2008 Inoue et al. .................. 62/324.2

* cited by examiner

METHOD OF ADDING ADJACENT HIGH-TEMPERATURE HEATING-SIDE FOR ABSORPTION HEAT

BACKGROUND OF THE PRESENT INVENTION

1. Field of Invention

This invention belongs to the area of heat pump/refrigeration technology and the utilization of low-temperature waste heat.

2. Description of Related Arts

A permanent goal of heat pump units is higher performance coefficient (COP), structure as simple as possible and suitable operating parameters.

It can be seen from the heat pump units that each exothermic section corresponds to a thermal demand of the heated medium. The higher the exothermic section is, the higher the cost is that the units pay to increase the temperature of waste heat medium. Different exothermic section of the units has different effects on its COP. Heating section at low temperature has a higher COP while heating section at high temperature has a lower COP, which forms a completed performance of the heat pump units. Obviously, the heating section of the units should match the temperature range of heated medium to ensure higher COP. Given the residual heat resources and the actuated-hot resources, each heating section of the units has a corresponding temperature range and COP. Obviously the heating section should match the temperature range of heated medium.

It can be seen from the structure and process of the units that a complete process of absorption heat pump must have two exothermic sections in absorber and evaporator. When an exothermic process of heat pump (or two heating sections) can't meet the need of users and we only need one more heating section to satisfy the need, it not only makes the structure and process of the units more complex, but also makes the COP of the units much lower if we increase two exothermic sections in absorber and evaporator of a complete heat pump process. In other words, we should not add a complete heat pump process but a corresponding heating section to satisfy the heat demand of heated medium when the heat demand exceeds two exothermic sections in absorber and evaporator.

In reality, the heat demand of heated medium is optional. Adopting three-terminal heating can make the structure of units simple and get a high COP when two-terminal heating can't meet the need of users and four-terminal heating exceeds it.

Moreover, seen from the perspective of providing high-temperature heating, adding high-temperature heating-side can have different heating options. But they must satisfy the approaching principle. This principle is that it is reasonable to have a close technology between the aspect of promoting temperature and changing the COP and the existing process of heat pump. In other words, they must satisfy the requirements that it is adjacent between the additional of high-temperature heating-side and the heating-side of the existing heat pump.

SUMMARY OF THE PRESENT INVENTION

The invention provides a method of adding the adjacent high-temperature heating-side on absorption heat bump. It mainly increases some components on the existing absorption heat pump which at least completes two or more stages of heating by absorber and condenser, such as an absorber, an absorption-evaporator, a solution pump, a throttle, a liquid refrigerant pump, a solution heat exchanger and so on. At the same time, the components also connect with the main components of the existing absorption heat pump (a generator, a condenser, an evaporator and the absorption-evaporator) to form a new high-temperature heating-side of the heat pump.

The method of adding the adjacent high-temperature heating-side on absorption heat pump is as follows: on the absorption heat pump which at least completes two or more stages of heating by the absorber and the condenser, we increase some components. At the same time, there are some connections among them.

The specific method is as follows:

(1) Adding some components: a new absorber, a new absorption-evaporator, a new throttle, a new liquid refrigerant pump, a new solution pump, a new solution heat exchanger and a second new solution heat exchanger. And the pipe connection of refrigerant circulation is as follows:

The pipe of concentrated solution in a concentrated solution generator connects the second new solution heat exchanger and then connects the new absorber. The pipe of dilute solution in the new absorber connects the new solution heat exchanger and then connects a new absorption-evaporator. The pipe of dilute solution in the new absorption-evaporator connects the new solution pump, the new solution heat exchanger, the second new solution heat exchanger and then connects the concentrated solution generator.

(2) Adding some components: the new absorber, the new absorption-evaporator, the new throttle or a new liquid refrigerant pump, the new solution pump, the new solution heat exchanger and a new second solution pump. And the pipe connection of refrigerant circulation is as follows:

The pipe of concentrated solution in the concentrated solution generator passes through the new solution heat exchanger and then connects the new absorption-evaporator. The pipe of dilute solution in the new absorption-evaporator passes through the new solution pump and then connects the new absorber. The pipe of dilute solution in the new absorber passes through the second new solution pump, the new solution heat exchanger and then connects the concentrated solution generator.

(3) Adding some components: the new absorber, the new absorption-evaporator, the new throttle or the new liquid refrigerant pump, the new solution pump and the new solution heat exchange. And the pipe connection of refrigerant circulation is as follows:

Change the pipe of a dilute solution provider passes through the solution pump, one or several solution heat exchanger and then connects the concentrated solution generator into that the pipe from the dilute solution provider passes through the solution pump, one or several solution heat exchanger and then connects the new absorber. The pipe of dilute solution in the new absorber passes through the new solution heat exchanger and then connects the new absorption-evaporator. The pipe of dilute solution in the new absorption-evaporator passes through the new solution pump, the new solution heat exchanger and then connects the concentrated solution generator.

(4) Adding some components: the new absorber, the new absorption-evaporator, the new throttle or the new liquid refrigerant pump, the new solution pump, the new solution heat exchanger and the second new solution heat exchanger. And the pipe connection of refrigerant circulation is as follows:

Change the pipe from the dilute solution provider passes through the solution pump, one or several solution heat exchanger and then connects the concentrated solution generator into that the pipe from the dilute solution provider passes through the solution pump, one or several solution heat exchanger, the second new solution heat exchanger and then connects the new absorber. The pipe of dilute solution in the new absorber passes through the new solution heat exchanger and then connects the new absorption-evaporator. The pipe of dilute solution in the new absorption-evaporator passes through the new solution pump, the new solution heat exchanger, the second new solution heat exchanger and then connects the concentrated solution generator.

(5) Adding some components: the new absorber, the new absorption-evaporator, the new throttle or the new liquid refrigerant pump, the new solution pump, the new solution heat exchanger and the second new solution heat exchanger. And the pipe connection of refrigerant circulation is as follows:

Change the pipe from the dilute solution provider passes through the solution pump, one or several solution heat exchanger and then connects the concentrated solution generator into that the pipe from the dilute solution provider passes through the solution pump, one or several solution heat exchanger, the new solution heat exchanger and then connects the new absorption-evaporator. The pipe of dilute solution in the new absorption-evaporator passes through the new solution pump and then connects the new absorber. The pipe of dilute solution in the new absorber passes through the second new solution pump, the new solution heat exchanger and then connects the concentrated solution generator.

(6) We add the pipe of refrigerant vapor from a refrigerant vapor provider or the evaporator or the absorption-evaporator or the low pressure absorber or the absorption-evaporator and the low pressure absorber, and then the pipe connects the new absorption-evaporator.

After added the pipe of the liquid refrigerant to the condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber. And the pipe of heated medium on the new absorber connects external. In this way, the new absorber becomes the adjacent high-temperature heating-side of heat pump unit.

Accordingly we develop absorption heat pumps with additional adjacent high-temperature heating-side.

We take one of the technical schemes as an example. In technology, we increase components which include the new absorber, the new absorption-evaporator, the new throttle or the new liquid refrigerant pump, the new solution pump, the new solution heat exchanger and the second new solution heat exchanger. And it also haves a refrigerant circulation as follows:

The added pipe of concentrated solution from the concentrated solution generator passes through the second new solution heat exchanger and then connects the new absorber. The dilute solution pipe of the new absorber passes through the new solution heat exchanger and then connects the new absorption-evaporator. The dilute solution pipe of the new absorption-evaporator passes through the new solution pump, the new solution heat exchanger, the second new solution heat exchanger and then connects the concentrated solution generator.

The concentrated solution generator provides concentrated solution which flows through the second new solution heat exchanger to the new absorber. The provider of refrigerant vapor supplies refrigerant vapor to the new absorption-evaporator. Refrigerant vapor flows through the throttle and then is provided from the condenser to the new absorption-evaporator. Or Refrigerant vapor flows through the new liquid refrigerant pump and then is provided from the evaporator to the new absorption-evaporator. The dilute solution which flows through the new absorption-evaporator, the new solution heat exchanger and the second new solution heat exchanger is provided to the concentrated solution generator. The concentrated solution enters the new absorber and absorbs the refrigerant vapor came from the new absorption-evaporator and releases heat to the heated medium. The dilute solution which flows through the new solution heat exchanger and enters the new absorption-evaporator and then absorbs the refrigerant vapor came from refrigerant vapor provider. At the same time, the released heat heats the refrigerant medium and forms the high pressure refrigerant vapor provided to the new absorber. The dilute solution in the new absorption-evaporator flows through the new solution pump which makes its pressure higher, the new solution heat exchanger, the second new solution heat exchanger, and then flows into concentrated solution generator.

Accordingly, the temperature of waste heat raises a second time in the new absorber after being heated in the new absorption-evaporator. In addition the temperature promoted for the first time and the temperature of waste heat raised in the absorber of heat pump belong to the same level. So it is adjacent between the additional of high-temperature heating-side and the heating-side of the existing heat pump.

Shown in FIG. 3 is an example to expound the invention. In the example, some components which include the new absorber, the new absorption-evaporator, a new throttle, the new solution pump, the new solution pump and solution heat exchanger is added on absorption heat pump to get the adjacent high-temperature heating-side.

(1) Structurally, the heat pump system in FIG. 3 consists of the components which include generator, condenser, evaporator, absorber, throttle, solution pump, solution heat exchanger and form single-stage single-effect, and the new components which include the new absorber, the new absorption-evaporator, the new throttle, a new solution pump and the solution heat exchanger. The generator, the condenser, the evaporator, the absorber, the throttle, the solution pump and the solution heat exchanger can form the single-stage single-effect absorption heat pump in which the components are connected as follows:

The refrigerant vapor pipe of the generator connects condenser. The liquid refrigerant pipe of the condenser passes through the throttle and then connects the evaporator. The refrigerant vapor pipe of the evaporator connects the absorber. The dilute solution pipe of the absorber connects the solution pump, the solution heat exchanger and then connects the generator. The concentrated solution pipe of the generator passes through the solution heat exchanger and then connects the absorber.

The pipe of actuated-hot medium on the generator and the pipe of waste heat medium on evaporator and the pipe of the heated medium on the absorber and the condenser connect with external separately. At last, we get the process of single-stage single-effect absorption heat pump. By the following process, we can make the new absorber to be a new high-temperature heating-side.

Change the dilute solution pipe of the absorber passes through the solution pump, the solution heat exchanger and then connects the generator into that the dilute solution pipe of the absorber passes through the solution pump, the solution heat exchanger and then connects the new absorber. The pipe of dilute solution in the new absorber passes through the new solution heat exchanger and then connects the new absorption-evaporator. The dilute solution pipe of the new absorption-evaporator passes through the new solution pump, the new solution heat exchanger and then connects the generator.

At the same time, the additional pipe of refrigerant vapor on the evaporator connects with the new absorption-evaporator. After that the liquid refrigerant pipe of the condenser passes through the new throttle and then connects the new absorption-evaporator, the refrigerant vapor pipe of the new absorption-evaporator connects the new absorber. The heated medium pipe of the new absorber connects external. The new absorber becomes the new high-temperature heating-side.

(2) On the process, a new process of heat pump is generated except the process of single-stage single-effect heat pump after adding the high-temperature heating-side. In the new process, dilute solution in the absorber which flows through the solution pump and the solution heat exchanger enters the new absorber and absorbs the refrigerant vapor came from the new absorption-evaporator and releases heat to the heated medium. The concentration of solution decreases in the new absorber. Then, the solution which flows through the new solution heat exchanger and enters the new absorption-evaporator and absorbs the refrigerant vapor came from evaporator and releases heat to the refrigerant medium. The concentration of solution in the new absorption-evaporator will decrease again. And then, the solution which flows through the new solution pump and the new solution heat exchanger enters absorber. The dilute solution in generator under the action of actuated-hot releases refrigerant vapor to condenser and releases heat to heated medium becomes the liquid refrigerant.

The liquid refrigerant in condenser can be divided into two parts: one part which flows through the throttle enters the evaporator and absorbs the waste heat becoming refrigerant vapor and then provides to the new absorption-evaporator. The other part which flows through the new throttle enters the new absorption-evaporator and absorbs the heat becoming refrigerant vapor and then provides to the new absorber. A part of the poor solution concentration produced by the absorber is used to the process of the single-stage single-effect heat pump. The poor solution concentration comes from the concentrated solution in the export of the generator and the dilute solution in the export of the absorber. And the other part of the poor solution concentration is used to the new process of heat pump. This poor solution concentration comes from the solution in the export of the absorber and the solution in the export of the new absorption-evaporator.

(3) Characterization of thermodynamic effect:

Firstly, the new process of heat pump is completed by the evaporator, the new absorption-evaporator, the new absorber, the generator, the condenser, the throttle, the new throttle, the new solution pump, the new solution heat exchanger with the help of the absorber, the solution pump, and the solution heat exchanger. The process which provides refrigerant vapor from the absorption-evaporator to the absorber is the process of single generator two-stage absorption heat pump. The new process of heat pump and the process of single-stage single-effect heat pump share the condenser. The new absorber's heating temperature is higher than the condenser's. It is the adjacent high-temperature heating-side of the absorber or the condenser.

Secondly, in new heat pump, the absorber, the condenser, and the new absorber heat the heated medium separately. The new absorber is the adjacent high-temperature heating-side of the absorber or the condenser. And then, we get the absorption heat pump with three-terminal heating which adds a high-temperature heating-side based on the single-stage single-effect heat pump with two-terminal heating. Its thermodynamic effect is between the single-stage single-effect absorption heat pump and single generator two-stage absorption heat pump in which the refrigerant vapor is provided from the absorption-evaporator to the absorber. Then, we get the new situation as follows:

A. Compared with single-stage single-effect unit, the new units owns a higher heating temperature and can use a lower temperature of waste heat and promotes the using value of residual heat resources.

B. The new units decrease the demand of actuated-hot medium and can use the actuated-hot medium which can only be used in single generator two-stage unit and promotes the using value of actuated-hot medium.

C. When the units is used in refrigeration they also can promote the using value of actuated-hot medium or can achieve a lower refrigeration temperature or can decrease the demand of the temperature of cooling medium.

In summary, the invention gets a unit which is between the single-stage single-effect unit and single generator two-stage unit. And its thermodynamic performance and working parameter is between the two's too. It fills the gap between the two. Speaking vividly, the single-stage single-effect unit and single generator two-stage unit just are two end points while the new unit is the line between them. Similarly, thermodynamic performance and working parameter is between the three-effect unit's and the double-effect unit's by adding adjacent high-temperature heating-side in single-stage three-effect heat pump. And thermodynamic performance and working parameter is between the double-effect unit's and the single-effect unit's by adding adjacent high-temperature heating-side in single-stage double-effect heat pump, and so on. This approach makes the matching principle of energy utilization to be a better realization.

According to the existing absorption heat pump of different structures, based on the method of adding high-temperature heating-side on absorption heat pump, we can get the corresponding multiterminal heating absorption heat pump unit with additional adjacent high-temperature heating-side as follows:

1. According to the method of added high-temperature heating-side to absorption heat pump, on the single-stage single-effect absorption heat pump which consists of the generator, the condenser, the evaporator, the absorber, the throttle, the solution pump and the solution heat exchanger, we can get three-terminal heating absorption heat pump with additional adjacent high-temperature heating-side based on the single-stage single-effect heat pump of two heating-side by adding some components and some connections among the components of unit;

The specific method is as follows:

(1) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

The concentrated solution pipe of the generator passes through the second new solution heat exchanger and then connects the new absorber; The pipe of dilute solution in the new absorber passes through the new solution heat exchanger and then connects the new absorption-evaporator; The pipe of dilute solution in the new absorption-evaporator passes through the new solution pump, the new solution heat exchanger, the second new solution heat exchanger and then connects the generator;

(2) Adding some components: the new absorber, the new absorption-evaporator, the new throttle or the new liquid refrigerant pump, the new solution pump, the new solution heat exchanger and the second new solution pump; And the pipe connection of refrigerant circulation is as follows:

The concentrated solution pipe of the generator passes through the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the generator;

(3) Adding some components: the new absorber, the new absorption-evaporator, the new throttle or the new liquid refrigerant pump, the new solution pump and new solution heat exchange; And the pipe connection of refrigerant circulation is as follows:

Change the pipe of the absorber passes through the solution pump, the solution heat exchanger and then connects the generator into that the pipe of the absorber passes through the solution pump, the solution heat exchanger and then connects the new absorber; The pipe of dilute solution on the new absorber passes through the new solution heat exchanger and then connects the new absorption-evaporator; The pipe of dilute solution on the new absorption-evaporator passes through the new solution pump, the new solution heat exchanger and then connects the generator;

(4) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger and then connects the generator into that the pipe of the absorber passes through the solution pump, the solution heat exchanger, the second new solution heat exchanger and then connects the new absorber; The pipe of dilute solution on the new absorber passes through the new solution heat exchanger and then connects the new absorption-evaporator; The pipe of dilute solution on the new absorption-evaporator passes through the new solution pump, the new solution heat exchanger, the second new solution heat exchanger and then connects the generator;

(5) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger and then connects the generator into that the pipe of the absorber passes through the solution pump, the solution heat exchanger, the new solution heat exchanger and then connects the new absorption-evaporator; The dilute solution pipe of the new absorption-evaporator passes through the new solution pump and then connects the new absorber; The pipe of dilute solution on the new absorber passes through the second new solution pump, the new solution heat exchanger and then connects the generator;

(6) We add the pipe of refrigerant vapor from the evaporator, and then the pipe connects the new absorption-evaporator; After adding the pipe of the liquid refrigerant to the condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber; And the pipe of heated medium on the new absorber connects external; The absorber, the condenser and the new absorber provide heat to the heated medium; In this way, the new absorber becomes the adjacent high-temperature heating-side of the absorber or the condenser.

2. According to the method of adding high-temperature heating-side to absorption heat pump, on the concatenated loops single-stage double-effect absorption heat pump which consists of the high pressure generator, the low pressure generator, the condenser, the evaporator, the absorber, the throttle, the second throttle, the solution pump, the second solution pump, the solution heat exchanger and the second solution heat exchanger, we can get three-terminal heating absorption heat pump of additional adjacent high-temperature heating-side based on the concatenated loops single-stage double-effect heat pump with two heating-side by adding some components and some connections among the components of unit;

The specific method is as follows:

(1) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

The concentrated solution pipe of the low pressure generator or the high pressure generator passes through the second new solution heat exchanger and then connects the new absorber; The pipe of dilute solution on the new absorber passes through the new solution heat exchanger and then connects the new absorption-evaporator; The pipe of dilute solution on the new absorption-evaporator passes through the new solution pump, the new solution heat exchanger, the second new solution heat exchanger and then connects the low pressure generator or the high pressure generator;

(2) Adding some components: the new absorber, the new absorption-evaporator, the new throttle or the new liquid refrigerant pump, the new solution pump, the new solution heat exchanger and the second new solution pump; And the pipe connection of refrigerant circulation is as follows:

The concentrated solution pipe of the low pressure generator or the high pressure generator passes through the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger connects the low pressure generator or the high pressure generator;

(3) Adding some components: the new absorber, the new absorption-evaporator, the new throttle or the new liquid refrigerant pump, the new solution pump and new solution heat exchange; And the pipe connection of refrigerant circulation is as follows:

Change the pipe of the absorber passes through the solution pump, the solution heat exchanger, the second solution heat exchanger and then connects the low pressure generator into that the pipe of the absorber passes through the solution pump, the solution heat exchanger, the second solution heat exchanger and then connects the new absorber; The pipe of dilute solution on the new absorber passes through the new solution heat exchanger and then connects the new absorption-evaporator; The pipe of dilute solution on the new absorption-evaporator passes through the new solution pump, the new solution heat exchanger and then connects the low pressure generator;

(4) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger, the second solution heat exchanger and then connects the low pressure generator into that the pipe of the absorber passes through the solution pump, the solution heat exchanger, the second solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the low pressure generator;

(5) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger, the second solution heat exchanger and then connects the low pressure generator into that the pipe of the absorber passes through the solution pump, the solution heat exchanger, the second solution heat exchanger, the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the low pressure generator;

(6) We add the pipe of refrigerant vapor from the evaporator and then the pipe connects the new absorption-evaporator; After adding the pipe of the liquid refrigerant to the condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber; And the pipe of heated medium on the new absorber connects external; The absorber, the condenser and the new absorber provide heat to the heated medium; In this way, the new absorber becomes the adjacent high-temperature heating-side of the absorber or the condenser.

3. According to the method of adding high-temperature heating-side to absorption heat pump, on the concatenated loops single-stage double-effect absorption heat pump which consists of the high pressure generator, the low pressure generator, the condenser, the evaporator, the absorber, the throttle, the second throttle, the solution pump, the solution heat exchanger and the second solution heat exchanger, we can get three-terminal heating absorption heat pump of additional adjacent high-temperature heating-side based on the concatenated loops single-stage double-effect heat pump with two heating-side by adding some components and some connections among the components of unit;

The specific method is as follows:

(1) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

The concentrated solution pipe of the low pressure generator or the high pressure generator passes through the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the low pressure generator or the high pressure generator;

(2) Adding some components: the new absorber, the new absorption-evaporator, the new throttle or the new liquid refrigerant pump, the new solution pump, the new solution heat exchanger and the second new solution pump; And the pipe connection of refrigerant circulation is as follows:

The concentrated solution pipe of the low pressure generator or the high pressure generator passes through the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger connects the low pressure generator or the high pressure generator;

(3) Adding some components: the new absorber, the new absorption-evaporator, the new throttle or the new liquid refrigerant pump, the new solution pump and new solution heat exchange; And the pipe connection of refrigerant circulation is as follows:

Change the pipe of the absorber passes through the solution pump, the solution heat exchanger, the second solution heat exchanger and then connects the high pressure generator into that the pipe of the absorber passes through the solution pump, the solution heat exchanger, the second solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects the high pressure generator;

(4) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger, the second solution heat exchanger and then connects the high pressure generator into that the pipe of the absorber passes through the solution pump, the solution heat exchanger, the second solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the high pressure generator;

(5) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger, the second solution heat exchanger and then connects the high pressure generator into that the pipe of the absorber passes through the solution pump, the solution heat exchanger, the second solution heat exchanger, the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the high pressure generator;

(6) We add the pipe of refrigerant vapor from evaporator, and then the pipe connects the new absorption-evaporator;

After adding the pipe of the liquid refrigerant to the condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber; And the pipe of heated medium on the new absorber connects external; The absorber, the condenser and the new absorber provide heat to the heated medium; In this way, the new absorber becomes the adjacent high-temperature heating-side of the absorber or the condenser.

4. According to the method of adding high-temperature heating-side to absorption heat pump, on the solution parallel loop single-stage double-effect absorption heat pump which consists of the high pressure generator, the low pressure generator, the condenser, the evaporator, the absorber, the throttle, the second throttle, the solution pump, the solution heat exchanger and the second solution heat exchanger, we can get three-terminal heating absorption heat pump of additional adjacent high-temperature heating-side based on the solution parallel loop single-stage double-effect heat pump with two heating-side by adding some components and some connections among the components of the unit;

The specific method is as follows:

(1) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

The concentrated solution pipe of the low pressure generator or the high pressure generator passes through the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the low pressure generator or the high pressure generator;

(2) Adding some components: the new absorber, the new absorption-evaporator, the new throttle or the new liquid refrigerant pump, the new solution pump, the new solution heat exchanger and the second new solution pump; And the pipe connection of refrigerant circulation is as follows:

The concentrated solution pipe of the low pressure generator or the high pressure generator passes through the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger connects the low pressure generator or the high pressure generator;

(3) Adding some components: the new absorber, the new absorption-evaporator, the new throttle or the new liquid refrigerant pump, the new solution pump and new solution heat exchange; And the pipe connection of refrigerant circulation is as follows:

Change the pipe of the absorber passes through the solution pump, the second solution heat exchanger and then connects the low pressure generator into that the pipe of the absorber passes through the solution pump, the second solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects the low pressure generator;

Or change the pipe of the absorber passes through the solution pump, the solution heat exchanger solution and then connects the high pressure generator into that the pipe of the absorber passes through the solution pump, the solution heat exchanger solution and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects the high pressure generator;

(4) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the second solution heat exchanger and then connects the low pressure generator into that the pipe of the absorber passes through the solution pump, the second solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the low pressure generator;

Or change the pipe of the absorber passes through the solution pump, the solution heat exchanger and then connects the high pressure generator into that the pipe of the absorber passes through the solution pump, the solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the high pressure generator;

(5) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the second solution heat exchanger and then connects the low pressure generator into that the pipe of the absorber passes through the solution pump, the second solution heat exchanger, the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the low pressure generator;

Or change the pipe of the absorber passes through the solution pump, the solution heat exchanger and then connects the high pressure generator into that the pipe of the absorber passes through the solution pump, the solution heat exchanger, the new solution heat exchanger and then connects the new absorption-evaporator; The dilute solution pipe of new absorption evaporator passes through the new solution pump and then connects the new absorber; The dilute solution pipe of the new absorber passes through the second new solution pump, the new solution heat exchanger and then connects the high pressure generator;

(6) We add the pipe of refrigerant vapor from the evaporator, and then the pipe connects the new absorption-evaporator; After adding the pipe of the liquid refrigerant to the condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber; And the pipe of heated medium on the new absorber connects external; The absorber, the condenser and the new absorber provide heat to the heated medium; In this way, the new absorber becomes the adjacent high-temperature heating-side of the absorber or the condenser.

5. According to the method of adding high-temperature heating-side to absorption heat pump, on the concatenated loops single-stage three-effect absorption heat pump which consists of the high pressure generator, the medium pressure generator, the low pressure generator, the condenser, the evaporator, the absorber, the throttle, the second throttle, the third throttle, the solution pump, the second solution pump, the third solution pump, the solution heat exchanger, the second solution heat exchanger and the third solution heat exchanger, we can get three-terminal heating absorption heat pump of additional adjacent high-temperature heating-side based on the concatenated loops single-stage three-effect heat pump with two heating-side by adding some components and some connections among the components of unit;

The specific method is as follows:

(1) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

The added concentrated solution pipe of the low pressure generator or the medium pressure generator or the high pressure generator passes through the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the low pressure generator or the medium pressure generator or the high pressure generator;

(2) Adding some components: the new absorber, the new absorption-evaporator, the new throttle or the new liquid refrigerant pump, the new solution pump, the new solution heat exchanger and the second new solution pump; And the pipe connection of refrigerant circulation is as follows:

The concentrated solution pipe of the low pressure generator or the medium pressure generator or the high pressure generator passes through the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger connects the low pressure generator or the medium pressure generator or the high pressure generator;

(3) Adding some components: the new absorber, the new absorption-evaporator, the new throttle or the new liquid refrigerant pump, the new solution pump and new solution heat exchange; And the pipe connection of refrigerant circulation is as follows:

Change the pipe of the absorber passes through the solution pump, the solution heat exchanger, the second solution heat exchanger, the third solution heat exchanger and then connects the low pressure generator into that the pipe of the absorber passes through the solution pump, the solution heat exchanger, the second solution heat exchanger, the third solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects the low pressure generator;

(4) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger, the second solution heat exchanger, the third solution heat exchanger and then connects the low pressure generator into that the pipe of the absorber passes through the solution pump, the solution heat exchanger, the second solution heat exchanger, the third solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the low pressure generator;

(5) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger, the second solution heat exchanger, the third solution heat exchanger and then connects the low pressure generator into that the pipe of the absorber passes through the solution pump, the solution heat exchanger, the second solution heat exchanger, the third solution heat exchanger, the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the low pressure generator;

(6) We add the pipe of refrigerant vapor from the evaporator, and then the pipe connects the new absorption-evaporator;

After adding the pipe of the liquid refrigerant to the condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber; And the pipe of heated medium on the new absorber connects external; The absorber, the condenser and the new absorber provide heat to the heated medium; In this way, the new absorber becomes the adjacent high-temperature heating-side of the absorber or the condenser.

6. According to the method of adding high-temperature heating-side to absorption heat pump, on the concatenated loops single-stage three-effect absorption heat pump which consists of the high pressure generator, the medium pressure generator, the low pressure generator, the condenser, the evaporator, the absorber, the throttle, the second throttle, the third throttle, the solution pump, the solution heat exchanger, the second solution heat exchanger and the third solution heat exchanger, we can get three-terminal heating absorption heat pump of additional adjacent high-temperature heating-side based on the concatenated loops single-stage three-effect heat pump with two heating-side by adding some components and some connections among the components of unit;

The specific method is as follows:

(1) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

The added concentrated solution pipe of the low pressure generator or the medium pressure generator or the high pressure generator passes through the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the low pressure generator or the medium pressure generator or the high pressure generator;

(2) Adding some components: the new absorber, the new absorption-evaporator, the new throttle or the new liquid refrigerant pump, the new solution pump, the new solution heat exchanger and the second new solution pump; And the pipe connection of refrigerant circulation is as follows:

The concentrated solution pipe of the low pressure generator or the medium pressure generator or the high pressure generator passes through the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger connects the low pressure generator or the medium pressure generator or the high pressure generator;

(3) Adding some components: the new absorber, the new absorption-evaporator, the new throttle or the new liquid refrigerant pump, the new solution pump and new solution heat exchange; And the pipe connection of refrigerant circulation is as follows:

Change the pipe of the absorber passes through the solution pump, the solution heat exchanger, the second solution heat exchanger, the third solution heat exchanger and then connects the high pressure generator into that the pipe of the absorber passes through the solution pump, the solution heat exchanger, the second solution heat exchanger, the third solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects the high pressure generator;

(4) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger, the second solution heat exchanger, the third solution heat exchanger and then connects the high pressure generator into that the pipe of the absorber passes through the solution pump, the solution heat exchanger, the second solution heat exchanger, the third solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the high pressure generator;

(5) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger, the second solution heat exchanger, the third solution heat exchanger and then connects the high pressure generator into that the pipe of the absorber passes through the solution pump, the solution heat exchanger, the second solution heat exchanger, the third solution heat exchanger, the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the high pressure generator;

(6) We add the pipe of refrigerant vapor from the evaporator, and then the pipe connects the new absorption-evaporator;

After adding the pipe of the liquid refrigerant to the condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber; And the pipe of heated medium on the new absorber connects external; The absorber, the condenser and the new absorber provide heat to the heated medium; In this way, the new absorber becomes the adjacent high-temperature heating-side of the absorber or the condenser.

7. According to the method of adding high-temperature heating-side to absorption heat pump, on the solution parallel loop single-stage three-effect absorption heat pump which consists of the high pressure generator, the medium pressure generator, the low pressure generator, the condenser, the evaporator, the absorber, the throttle, the second throttle, the third throttle, the solution pump, the solution heat exchanger, the second solution heat exchanger and the third solution heat exchanger, we can get three-terminal heating absorption heat pump of additional adjacent high-temperature heating-side based on the solution parallel loop single-stage three-effect heat pump with two heating-side by adding some components and some connections among the components of unit;

The specific method is as follows:

(1) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

The added concentrated solution pipe of the low pressure generator or the medium pressure generator or the high pressure generator passes through the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the low pressure generator or the medium pressure generator or the high pressure generator;

(2) Adding some components: the new absorber, the new absorption-evaporator, the new throttle or the new liquid refrigerant pump, the new solution pump, the new solution heat exchanger and the second new solution pump; And the pipe connection of refrigerant circulation is as follows:

The concentrated solution pipe of the low pressure generator or the medium pressure generator or the high pressure generator passes through the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the low pressure generator or the medium pressure generator or the high pressure generator;

(3) Adding some components: the new absorber, the new absorption-evaporator, the new throttle or the new liquid refrigerant pump, the new solution pump and new solution heat exchange; And the pipe connection of refrigerant circulation is as follows:

Change the pipe of the absorber passes through the solution pump, the third solution heat exchanger and then connects the low pressure generator into that the pipe of the absorber passes through the solution pump, the third solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects the low pressure generator;

Or change the pipe of the absorber passes through the solution pump, the second solution heat exchanger and then connects the medium pressure generator into that the pipe of the absorber passes through the solution pump, the second solution heat exchange and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects the medium pressure generator;

Or change the pipe of the absorber passes through the solution pump, the third solution heat exchanger and then connects the high pressure generator into that the pipe of the absorber passes through the solution pump, the third solution heat exchange and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects the high pressure generator;

(4) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the third solution heat exchanger and then connects the low pressure generator into that the pipe of the absorber passes through the solution pump, the third solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the low pressure generator;

Or change the pipe of the absorber connects the solution pump, the second solution heat exchanger and then connects the medium pressure generator into that the pipe of the absorber passes through the solution pump, the second solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the medium pressure generator;

Or change the pipe of the absorber passes through the solution pump, the third solution heat exchanger and then connects the high pressure generator into that the pipe of the absorber passes through the solution pump, the third solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the high pressure generator;

(5) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the third solution heat exchanger and then connects the low pressure generator into that the pipe of the absorber passes through the solution pump, the third solution heat exchanger, the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the low pressure generator;

Or change the pipe of the absorber passes through the solution pump, the second solution heat exchanger and then connects the medium pressure generator into that the pipe of the absorber passes through the solution pump, the second solution heat exchanger, the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the medium pressure generator;

Or change the pipe of the absorber passes through the solution pump, the third solution heat exchanger and then connects the high pressure generator into that the pipe of the absorber passes through the solution pump, the third solution heat exchanger, the new solution heat exchanger and then connects the new absorption-evaporator; The dilute solution pipe of the new absorption-evaporator connects the new solution pump and then connects the new absorber; The dilute solution pipe of the new absorber passes through the second new solution pump, the new solution heat exchanger and then connects the high pressure generator;

(6) We add the pipe of refrigerant vapor from the evaporator, and then the pipe connects the new absorption-evaporator;

After adding the pipe of the liquid refrigerant to the condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber; And the pipe of heated medium on the new absorber connects external; The absorber, the condenser and the new absorber provide heat to the heated medium; In this way, the new absorber becomes the adjacent high-temperature heating-side of the absorber or the condenser.

8. According to the method of adding high-temperature heating-side to absorption heat pump, on the single generator two-stage absorption heat pump which consists of generator, the condenser, the evaporator, absorption-evaporator, the absorber, the throttle, the second throttle or the liquid refrigerant pump, the solution heat exchanger and the second solution and provides refrigerant vapor to the absorber from the absorption-evaporator, we can get three-terminal heating absorption heat pump of additional adjacent high-temperature heating-side based on the single generator two-stage heat pump with two heating-side by adding some components and some connections among the components of unit;

The specific method is as follows:

(1) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

The concentrated solution pipe of generator passes through the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects generator;

(2) Adding some components: the new absorber, the new absorption-evaporator, the new throttle or the new liquid refrigerant pump, the new solution pump, the new solution heat exchanger and the second new solution pump; And the pipe connection of refrigerant circulation is as follows:

The concentrated solution pipe of generator passes through the new solution heat exchanger and then connects the new absorption-evaporator; The dilute solution pipe of the new absorption-evaporator connects the new solution pump and then connects the new absorber; The dilute solution pipe of the new absorber passes through the second new solution pump, the new solution heat exchanger connects generator;

(3) Adding some components: the new absorber, the new absorption-evaporator, the new throttle or the new liquid refrigerant pump, the new solution pump and new solution heat exchange; And the pipe connection of refrigerant circulation is as follows:

Change the pipe of absorption-evaporator passes through the solution pump, the solution heat exchanger, the second solution heat exchanger and then connects generator into that the pipe of absorption-evaporator passes through the solution pump, the solution heat exchanger, the second solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects generator;

(4) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of absorption-evaporator passes through the solution pump, the solution heat exchanger, the second solution heat exchanger and then connects generator into that the pipe of absorption-evaporator passes through the solution pump, the solution heat exchanger, the second solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects generator;

(5) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of absorption-evaporator passes through the solution pump, the solution heat exchanger, the second solution heat exchanger and then connects generator into that the pipe of absorption-evaporator passes through the solution pump, the solution heat exchanger, the second solution heat exchanger, the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects generator;

We add the pipe of refrigerant vapor from the evaporator, and then the pipe connects the new absorption-evaporator;

After adding the pipe of the liquid refrigerant to the condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber; And the pipe of heated medium on the new absorber connects external; The absorber, the condenser and the new absorber provide heat to the heated medium; In this way, the new absorber becomes the adjacent high-temperature heating-side of the absorber or the condenser.

9. According to the method of adding high-temperature heating-side to absorption heat pump, on the two-generator two-stage absorption heat pump which consists of the high pressure generator, the condenser, the high pressure the absorber, the throttle, the solution pump, the solution heat exchanger, the low pressure generator, the low pressure the absorber, the second solution pump and the second solution heat exchanger and provides refrigerant vapor to the high pressure the absorber from the low pressure generator, we can get four-terminal heating absorption heat pump of additional adjacent high-temperature heating-side based on the two-generator two-stage heat pump with three heating-side by adding some components and some connections among the components of unit;

The specific method is as follows:

(1) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

The concentrated solution pipe of the high pressure generator passes through the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the high pressure generator;

(2) Adding some components: the new absorber, the new absorption-evaporator, the new throttle or the new liquid refrigerant pump, the new solution pump, the new solution heat exchanger and the second new solution pump; And the pipe connection of refrigerant circulation is as follows:

The concentrated solution pipe of the high pressure generator passes through the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger connects the high pressure generator;

(3) Adding some components: the new absorber, the new absorption-evaporator, the new throttle or the new liquid refrigerant pump, the new solution pump and new solution heat exchange; And the pipe connection of refrigerant circulation is as follows:

Change the pipe of the high pressure the absorber passes through the solution pump, the solution heat exchanger and then connects the high pressure generator into that the pipe of the high pressure the absorber passes through the solution pump, the solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects the high pressure generator;

(4) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the high pressure the absorber passes through the solution pump, the solution heat exchanger and then connects the high pressure generator into that the pipe of the high pressure the absorber passes through the solution pump, the solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the high pressure generator;

(5) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the high pressure the absorber passes through the solution pump, the solution heat exchanger and then connects the high pressure generator into that the pipe of absorption-evaporator passes through the solution pump, the solution heat exchanger, the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the high pressure generator;

(6) We add the pipe of refrigerant vapor from the evaporator, and then the pipe connects the new absorption-evaporator;

After adding the pipe of the liquid refrigerant to the condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber; And the pipe of heated medium on the new absorber connects external; The low pressure the absorber, the high pressure the absorber, the condenser and the new absorber provide heat to the heated medium; In this way, the new absorber becomes the adjacent high-temperature heating-side of the high pressure the absorber or the condenser.

10. According to the method of adding high-temperature heating-side to absorption heat pump, on the two-generator two-stage absorption heat pump which consists of the high pressure generator, the high pressure condenser, the low pressure condenser, evaporator, the low pressure the absorber, the low pressure generator, the high pressure the absorber, the solution pump, the second solution pump, the throttle, the second throttle, the solution heat exchanger and the second solution heat exchanger and provides refrigerant vapor to the high pressure the absorber and the low pressure condenser from the low pressure generator, we can get five-terminal heating absorption heat pump of additional adjacent high-temperature heating-side based on the two-generator two-stage heat pump of four heating-side by adding some components and some connections among the components of unit;

The specific method is as follows:

(1) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows The concentrated solution pipe of the high pressure generator passes through the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the high pressure generator;

(2) Adding some components: the new absorber, the new absorption-evaporator, the new throttle or the new liquid refrigerant pump, the new solution pump, the new solution heat exchanger and the second new solution pump; And the pipe connection of refrigerant circulation is as follows:

The concentrated solution pipe of the high pressure generator passes through the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger connects the high pressure generator;

(3) Adding some components: the new absorber, the new absorption-evaporator, the new throttle or the new liquid refrigerant pump, the new solution pump and new solution heat exchange; And the pipe connection of refrigerant circulation is as follows:

Change the pipe of the high pressure the absorber passes through the solution pump, the solution heat exchanger and then connects the high pressure generator into that the pipe of the high pressure the absorber passes through the solution pump, the solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects the high pressure generator (4) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the high pressure the absorber passes through the solution pump, the solution heat exchanger and then connects the high pressure generator into that the pipe of the high pressure the absorber passes through the solution pump, the solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the high pressure generator;

(5) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the high pressure the absorber passes through the solution pump, the solution heat exchanger and then connects the high pressure generator into that the pipe of absorption-evaporator passes through the solution pump, the solution heat exchanger, the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the high pressure generator;

(6) We add the pipe of refrigerant vapor from the evaporator, and then the pipe connects the new absorption-evaporator;

After adding the pipe of the liquid refrigerant to the high pressure condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber; And the pipe of heated medium on the new absorber connects external; The low pressure the absorber, the low pressure condenser, the high pressure the absorber, the high pressure condenser and the new absorber provide heat to the heated medium; In this way, the new absorber becomes the adjacent high-temperature heating-side of the high pressure the absorber or the high pressure condenser.

11. According to the method of adding high-temperature heating-side to absorption heat pump, on the two-generator two-stage absorption heat pump with two heating-side which consists of the high pressure generator, the condenser, the evaporator, absorption-evaporator, the low pressure generator, the absorber, the solution pump, the second solution pump, the throttle, the second throttle, the solution heat exchanger, the second solution heat exchanger and collection steam-steam separator and provides refrigerant vapor to the absorber from the absorption-evaporator and the low pressure generator by collection steam-steam separator, we can get five-terminal heating absorption heat pump of additional adjacent high-temperature heating-side based on the two-generator two-stage heat pump of four heating-side by adding some components and some connections among the components of unit;

The specific method is as follows:

(1) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

The concentrated solution pipe of the high pressure generator passes through the second new solution heat exchanger and then connects the new absorber; The dilute solution pipe of the new absorber passes through the new solution heat exchanger and then connects the new absorption-evaporator;

The dilute solution pipe of the new absorption-evaporator passes through the new solution pump, the new solution heat exchanger, the second new solution heat exchanger and then connects the high pressure generator;

(2) Adding some components: the new absorber, the new absorption-evaporator, the new throttle or the new liquid refrigerant pump, the new solution pump, the new solution heat exchanger and the second new solution pump; And the pipe connection of refrigerant circulation is as follows:

The concentrated solution pipe of the high pressure generator passes through the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger connects the high pressure generator;

(3) Adding some components: the new absorber, the new absorption-evaporator, the new throttle or the new liquid refrigerant pump, the new solution pump and the new solution heat exchanger; And the pipe connection of refrigerant circulation is as follows:

Change the pipe of the absorber passes through the solution pump, the solution heat exchanger and then connects the high pressure generator into that the pipe of the high pressure the absorber passes through the solution pump, the solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger and then connects the high pressure generator;

(4) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger and then connects the high pressure generator into that the pipe of the high pressure the absorber passes through the solution pump, the solution heat exchanger, the second new solution heat exchanger and then connects the new absorber; The dilute solution pipe of the new absorber passes through the new solution heat exchanger and then connects the new absorption-evaporator; The dilute solution pipe of the new absorption-evaporator passes through the new solution pump, the new solution heat exchanger, the second new solution heat exchanger and then connects the high pressure generator;

(5) Adding some components: the new absorber, the new absorption-evaporator, the new throttle or the new liquid refrigerant pump, the new solution pump, the new solution heat exchanger and the second new solution heat exchanger; And the pipe connection of refrigerant circulation is as follows:

Change the pipe of the absorber passes through the solution pump, the solution heat exchanger and then connects the high pressure generator into that the pipe of absorption-evaporator passes through the solution pump, the solution heat exchanger, the new solution heat exchanger and then connects the new absorption-evaporator; The dilute solution pipe of the new absorption-evaporator passes through the new solution pump and then connects the new absorber; The dilute solution pipe of the new absorber passes through the second new solution pump, the new solution heat exchanger and then connects the high pressure generator;

(6) We add the pipe of refrigerant vapor from collection steam-steam separator, and then the pipe connects the new absorption-evaporator;

After adding the pipe of the liquid refrigerant to the condenser which connects the new throttle or adding the pipe of the liquid refrigerant to the evaporator which connects the new liquid refrigerant pump and then connects the new absorption-evaporator, the pipe of the liquid refrigerant on the new absorption-evaporator connects the new absorber; And the pipe of heated medium on the new absorber connects external; The absorber, the condenser, the new absorber provide heat with the heated medium; In this way, the new absorber becomes the adjacent high-temperature heating-side of the absorber or the condenser.

According to the method of adding high-temperature heating-side to absorption heat pump, in the absorption heat pump with additional adjacent high-temperature heating-side, we can get the absorption heat pump with adding high-temperature heating-side by adding some connections among the components of the unit;

The specific method is as follows:

(1) Adding some components: an adding the absorber, an adding absorption-evaporator, an adding throttle or an adding the liquid refrigerant pump, an adding solution pump, an adding solution heat exchanger and a second adding solution heat exchanger; And the pipe connection of refrigerant circulation is as follows:

The concentrated solution pipe of concentrated solution generator passes through the second adding solution heat exchanger and then connects the adding absorber; The dilute solution pipe of the adding absorber passes through the adding solution heat exchanger and then connects the adding absorption-evaporator; The dilute solution pipe of the adding absorption-evaporator passes through the adding solution pump, the adding solution heat exchanger, the second adding solution heat exchanger and then connects concentrated solution generator;

(2) Adding some components: the adding absorber, adding absorption-evaporator, the adding throttle or the adding the liquid refrigerant pump, the adding solution pump, the adding solution heat exchanger and adding the second solution pump; And the pipe connection of refrigerant circulation is as follows:

The concentrated solution pipe of concentrated solution generator passes through the adding solution heat exchanger and then connects the adding absorption-evaporator; The dilute solution pipe of the adding absorption-evaporator passes through the adding solution pump and then connects the adding absorber; The dilute solution pipe of the adding absorber passes through adding the second solution pump, the adding solution heat exchanger connects concentrated solution generator;

(3) Adding some components: the adding absorber, adding absorption-evaporator, the adding throttle or the adding the liquid refrigerant pump, the adding solution pump and adding solution heat exchange; And the pipe connection of refrigerant circulation is as follows:

Change the pipe of dilute solution provider passes through the solution pump, one or several solution heat exchanger or concentrated solution generator, the second new solution heat exchanger and then connects the new absorber into that the pipe of dilute solution provider passes through the solution pump, one or several solution heat exchanger or concentrated solution generator, new the second solution heat exchange connects the adding absorber; The dilute solution pipe of the adding absorber passes through the adding solution heat exchanger and then connects the adding absorption-evaporator; The dilute solution pipe of the adding absorption-evaporator passes through the adding solution pump, the adding solution heat exchanger and then connects the new absorber;

(4) Adding some components: the adding absorber, adding absorption-evaporator, the adding throttle or the adding the liquid refrigerant pump, the adding solution pump, the adding solution heat exchanger and the second adding solution heat exchanger; And the pipe connection of refrigerant circulation is as follows:

Change the pipe of dilute solution provider passes through the solution pump, one or several solution heat exchanger or concentrated solution generator, the second new solution heat exchanger and then connects the new absorber into that the pipe of dilute solution provider passes through the solution pump, one or several solution heat exchanger or concentrated solution generator, new the second solution heat exchange, the second adding solution heat exchanger connects the adding absorber; The dilute solution pipe of the adding absorber passes through the adding solution heat exchanger and then connects the adding absorption-evaporator; The dilute solution pipe of the adding absorption-evaporator passes through the adding solution pump, the adding solution heat exchanger, the second adding solution heat exchanger and then connects the new absorber;

(5) We add the pipe of refrigerant vapor from the condenser, and then the pipe connects the adding throttle; Or adding the pipe of refrigerant vapor from the evaporator, and then it connects the adding the liquid refrigerant pump, then it connects the adding absorption-evaporator, then it connects the adding absorber; Or we add the pipe of refrigerant vapor from the evaporator, and then it connects the adding the liquid refrigerant pump, then it connects the adding absorption-evaporator, then it connects the adding absorber, at the same time we change the pipe of refrigerant vapor from the condenser which connects the new throttle, the new absorption-evaporator one by one to the pipe of refrigerant vapor from the evaporator which connects the adding the liquid refrigerant pump, the new throttle and the new absorption-evaporator one by one;

Adding the pipe of refrigerant vapor to the absorption-evaporator, and then it connects the adding absorption-evaporator; And the pipe of heated medium on the adding absorber connects external.

In the invention which adds mainly some components such as the absorber, absorption-evaporator, the throttle or the liquid refrigerant pump, the solution pump, the solution heat exchanger, it provides a way of adding adjacent high-temperature heating-side to the absorption heat pump with different structures. In this way, the heating temperature of the new heat pump is higher than the existing process of heat pump. And it doesn't participate in the heating process of heated medium in the existing process of heat pump. Then we get a new heat pump system with a higher heating temperature and a similar COP of the existing heat pump. The new heat pump system belongs to the intermediate system between two different heating stages. It enriches the stage and type of heat pump and expands the application scope of heat pump system and simplifies the structure of heat pump and promotes the utilization efficiency of waste heat; we can see that the invention owns a well novelty, creativity, practicality.

BRIEF DESCRIPTION OF THE DRAWINGS

FIG. 1-5 gives five processes of solution and two processes of refrigerant media which are provided by the invention. They are the delegate of absorption heat pump with multiterminal heating according to the method provided by the invention. Similarly, the following statements are the corresponding delegate of absorption heat pump with multiterminal heating in the different existing absorption heat pumps.

Figure 5:
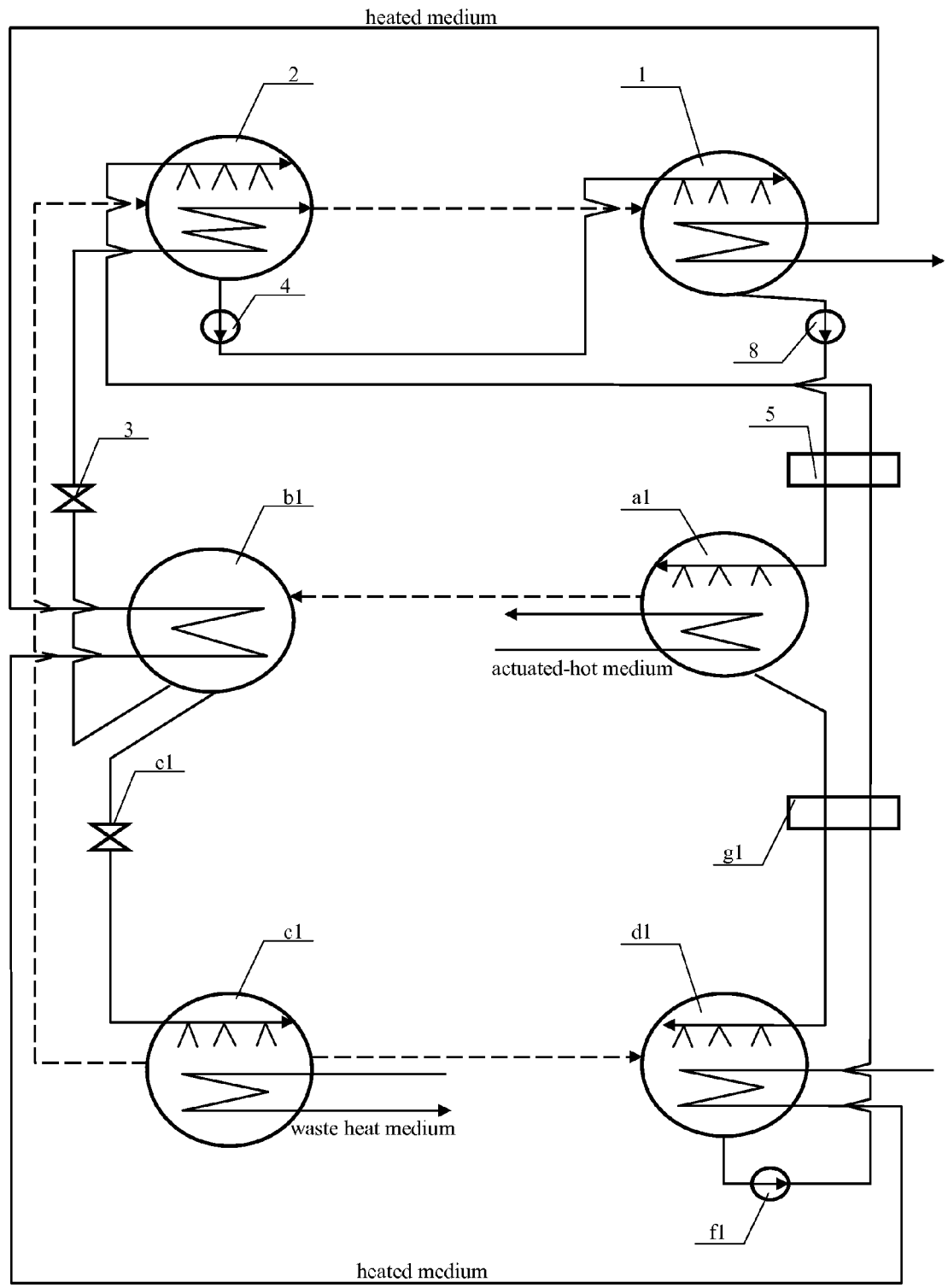
FIG. 5 provides the fifth construction and flow diagram of absorption heat pump with three-terminal heating that consists of adding an adjacent high-temperature heating-side to the single-stage single-effect absorption heat pump.
Figure 6:
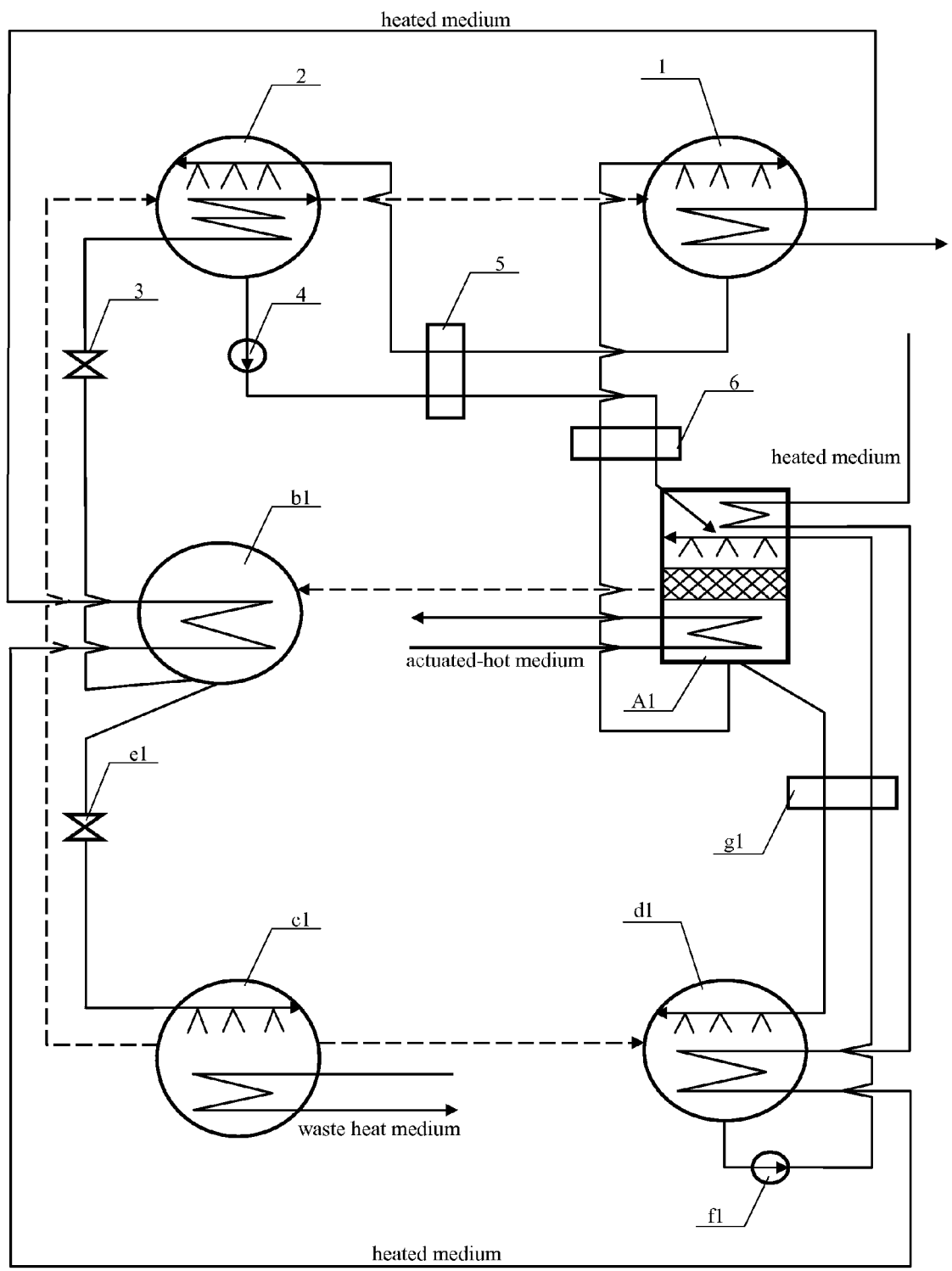
FIG. 6 provides the sixth construction and flow diagram of absorption heat pump with three-terminal heating that consists of adding an adjacent high-temperature heating-side to the single-stage single-effect absorption heat pump.
Figure 7:
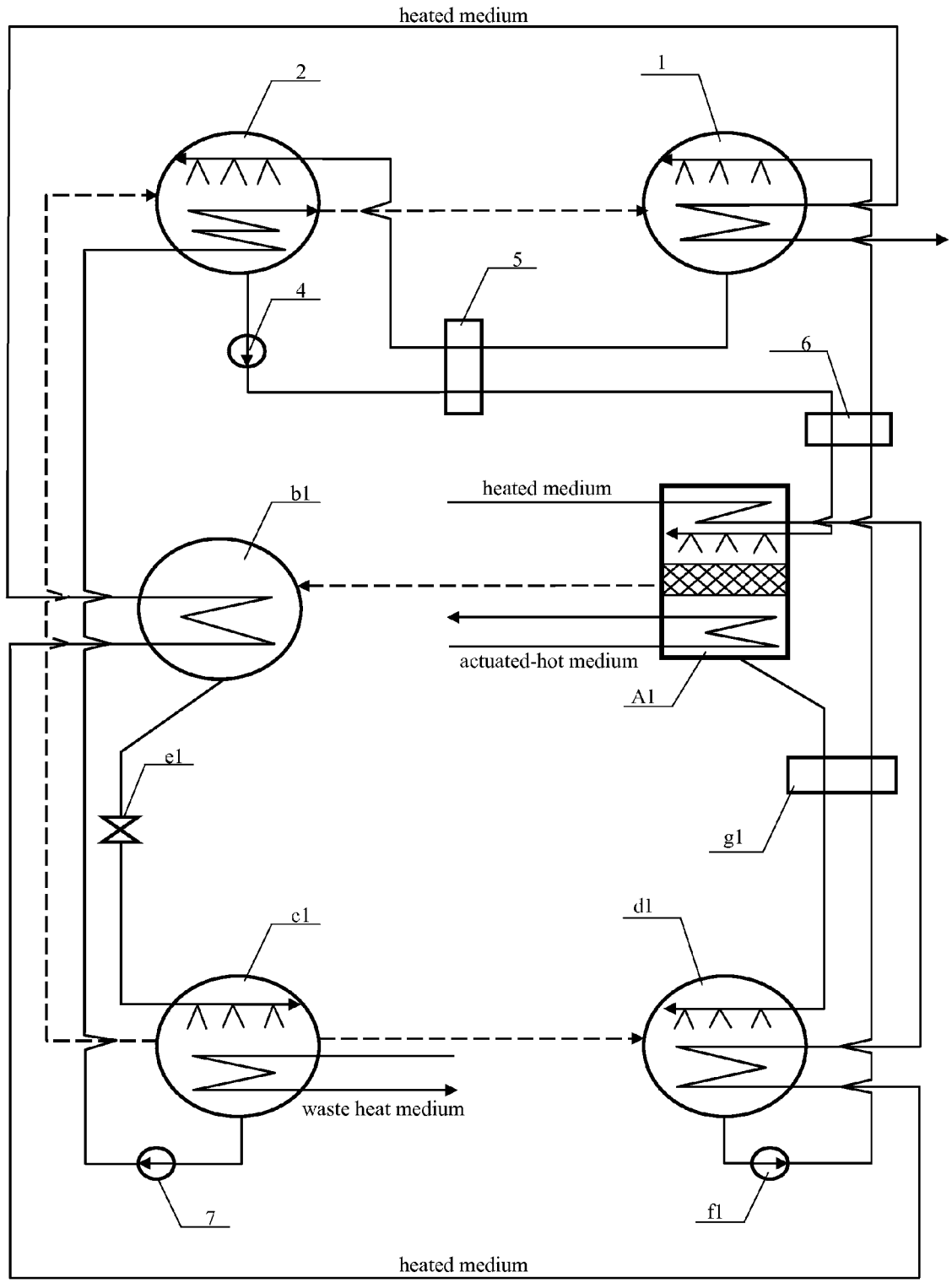
FIG. 7 provides the seventh construction and flow diagram of absorption heat pump with three-terminal heating that consists of adding an adjacent high-temperature heating-side to the single-stage single-effect absorption heat pump.

Different from FIG. 1 to FIG. 5, FIG. 6 and the FIG. 7 adopt the rectifying tower instead of generator, and it fit for the unit in which the ammonia solution is delegate.

Figure 8:
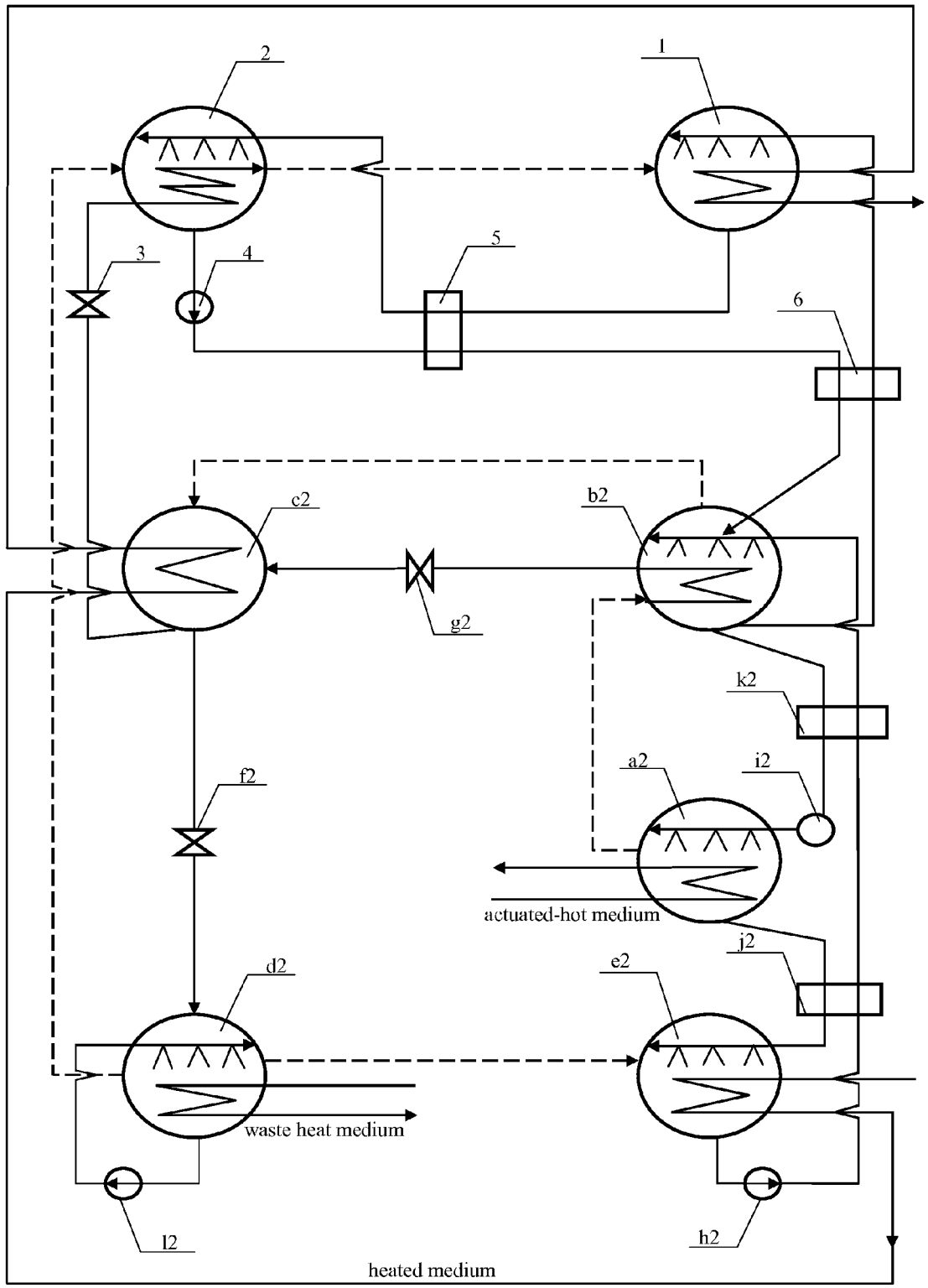

FIG. 8 provides the first construction and flow diagram of absorption heat pump with three-terminal heating that consists of adding an adjacent high-temperature heating-side to the concatenated loops single-stage double-effect absorption heat pump.

Figure 9:
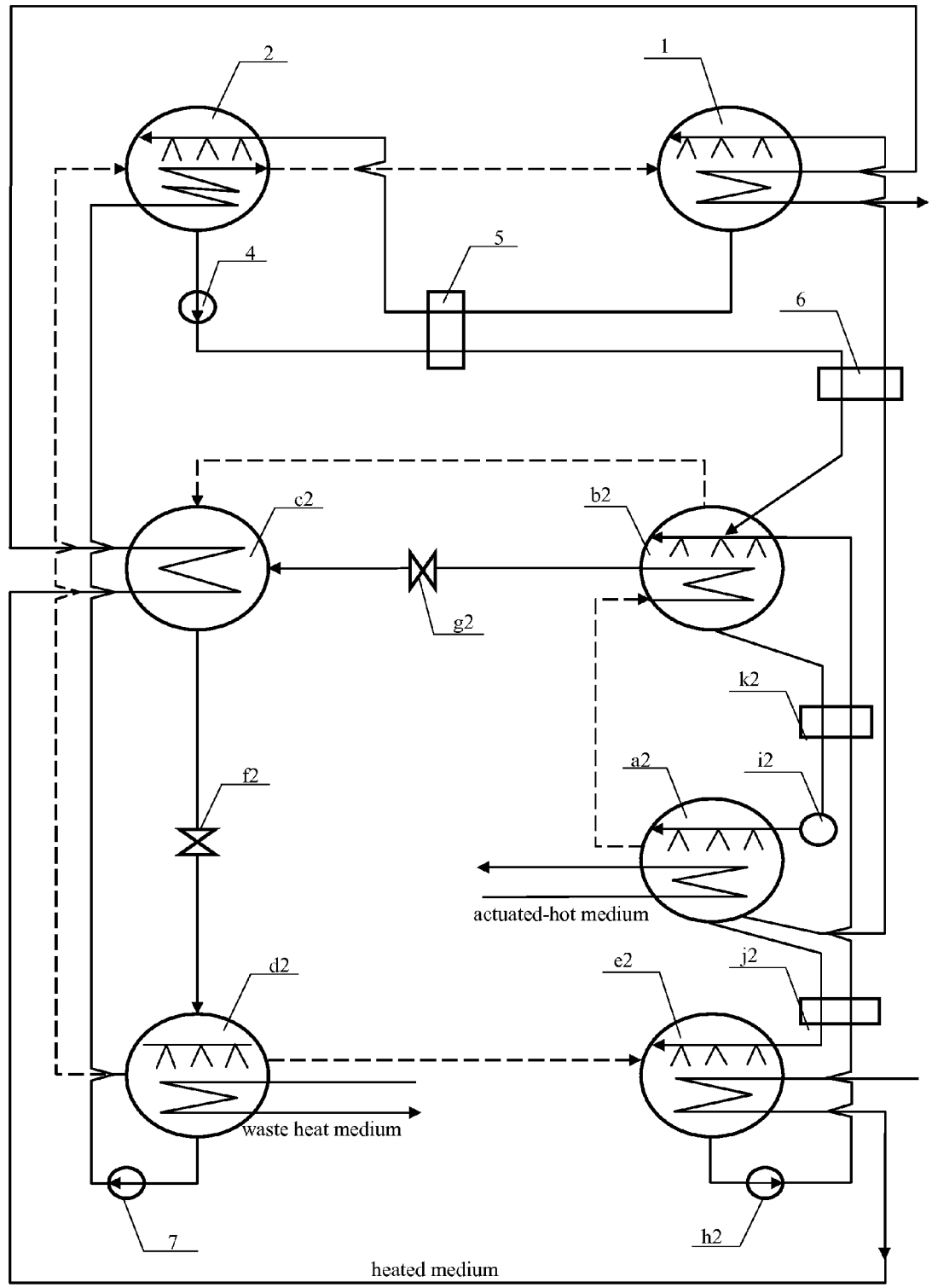

FIG. 9 provides the second construction and flow diagram of absorption heat pump with three-terminal heating that consists of adding an adjacent high-temperature heating-side to the concatenated loops single-stage double-effect absorption heat pump.

Figure 10:
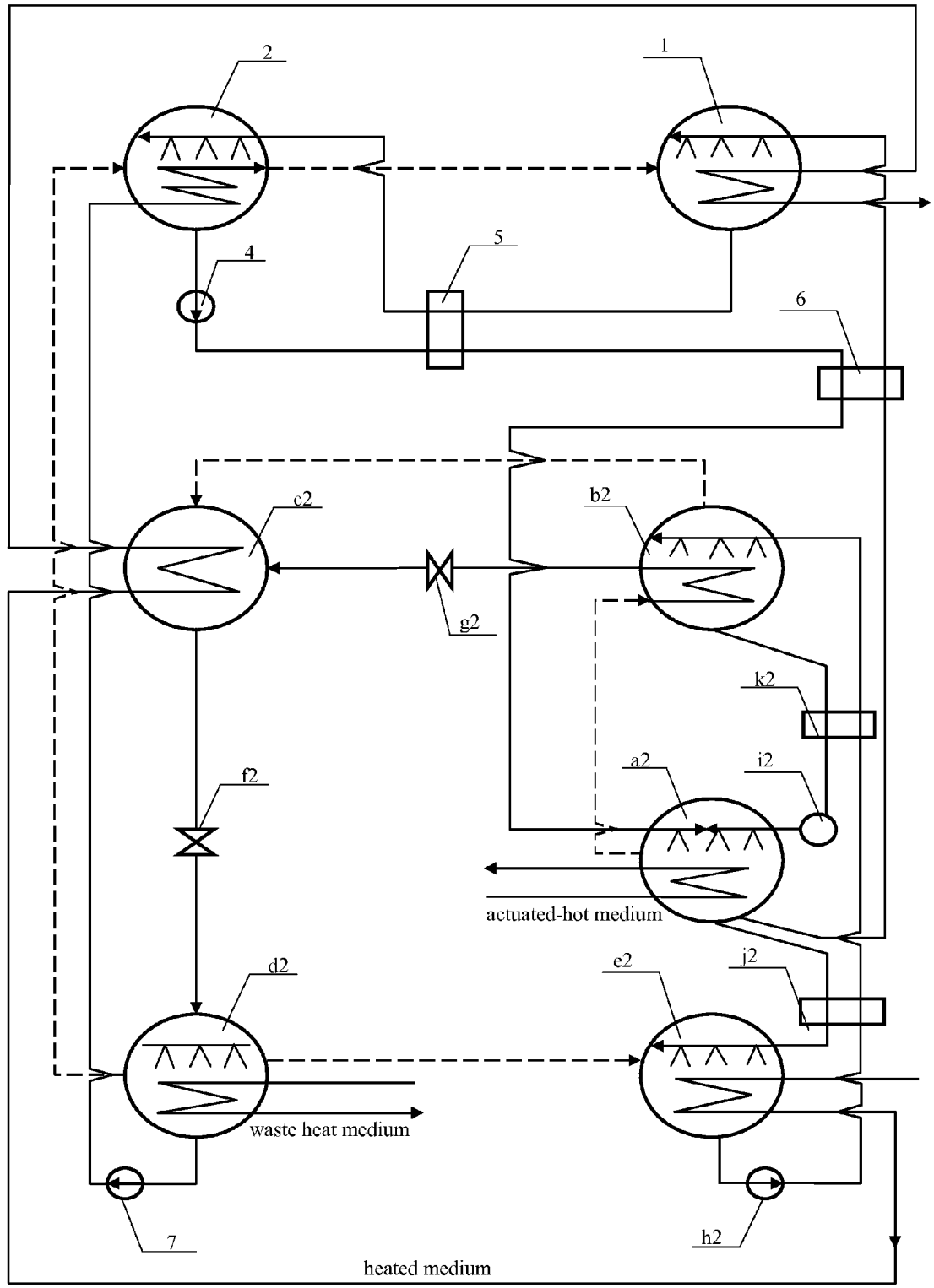

FIG. 10 provides the third construction and flow diagram of absorption heat pump with three-terminal heating that consists of adding an adjacent high-temperature heating-side to the concatenated loops single-stage double-effect absorption heat pump.

Figure 11:
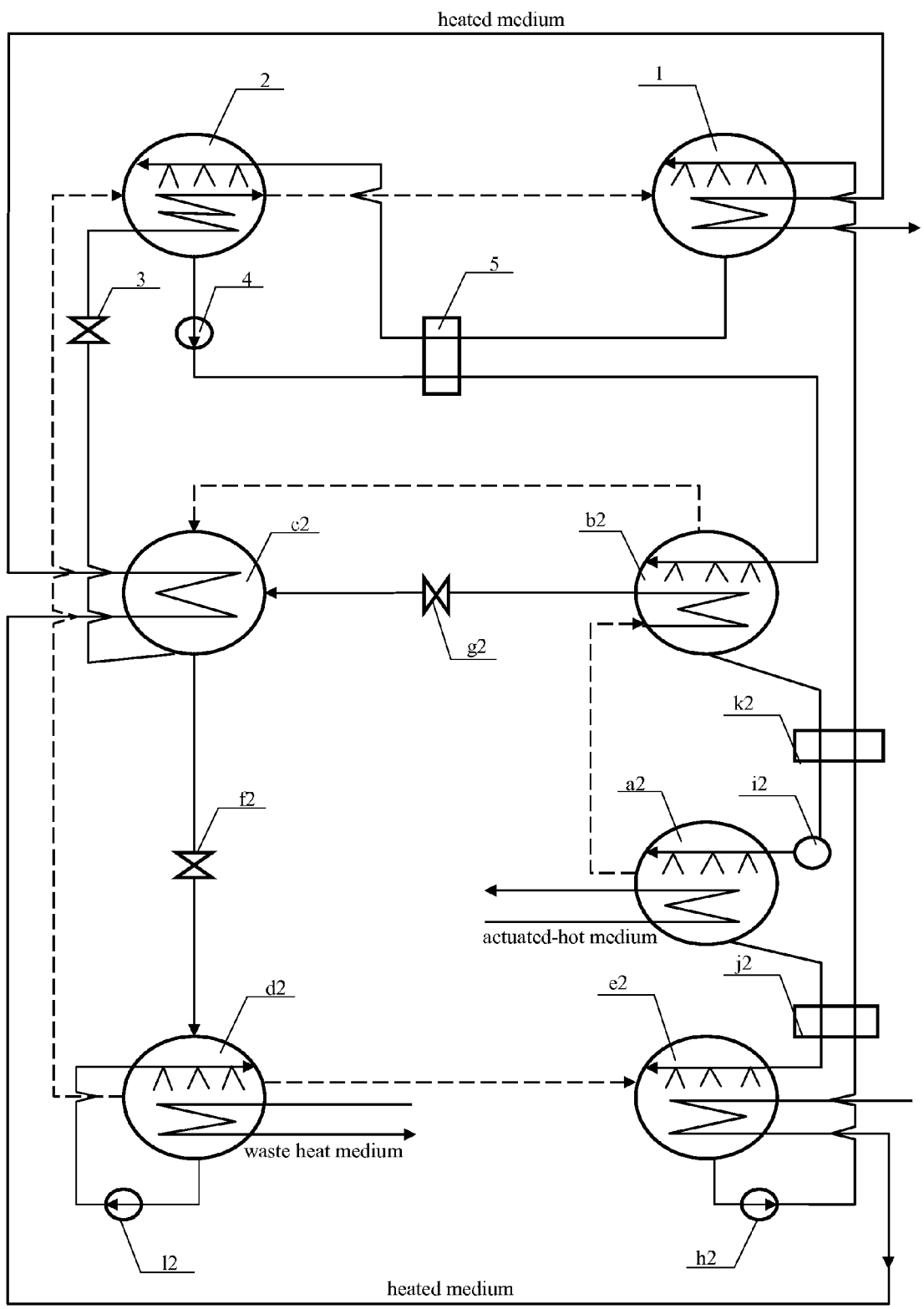

FIG. 11 provides the fourth construction and flow diagram of absorption heat pump with three-terminal heating that consists of adding an adjacent high-temperature heating-side to the concatenated loops single-stage double-effect absorption heat pump.

Figure 12:
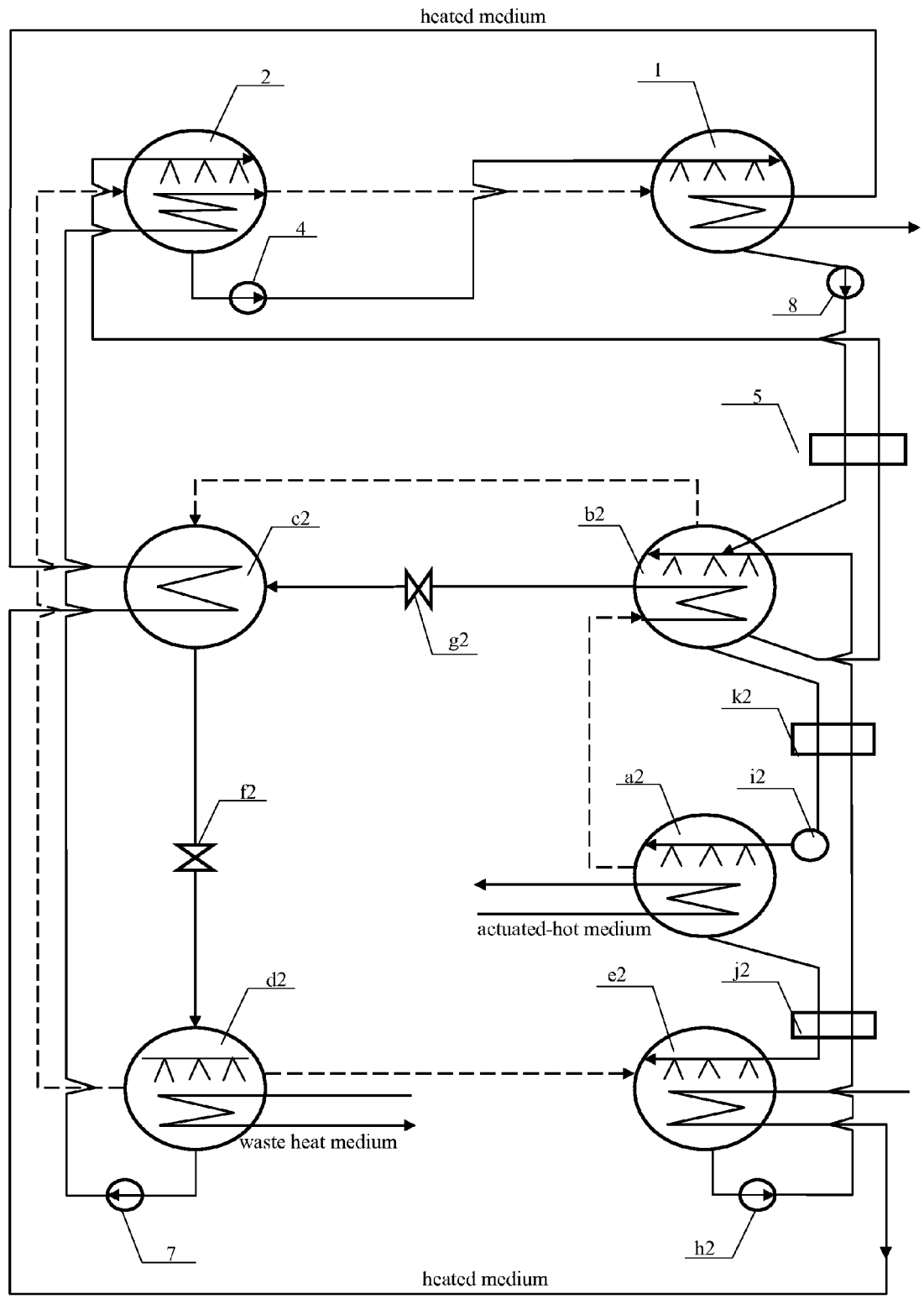

FIG. 12 provides the fifth construction and flow diagram of absorption heat pump with three-terminal heating that consists of adding an adjacent high-temperature heating-side to the concatenated loops single-stage double-effect absorption heat pump.

Figure 13:
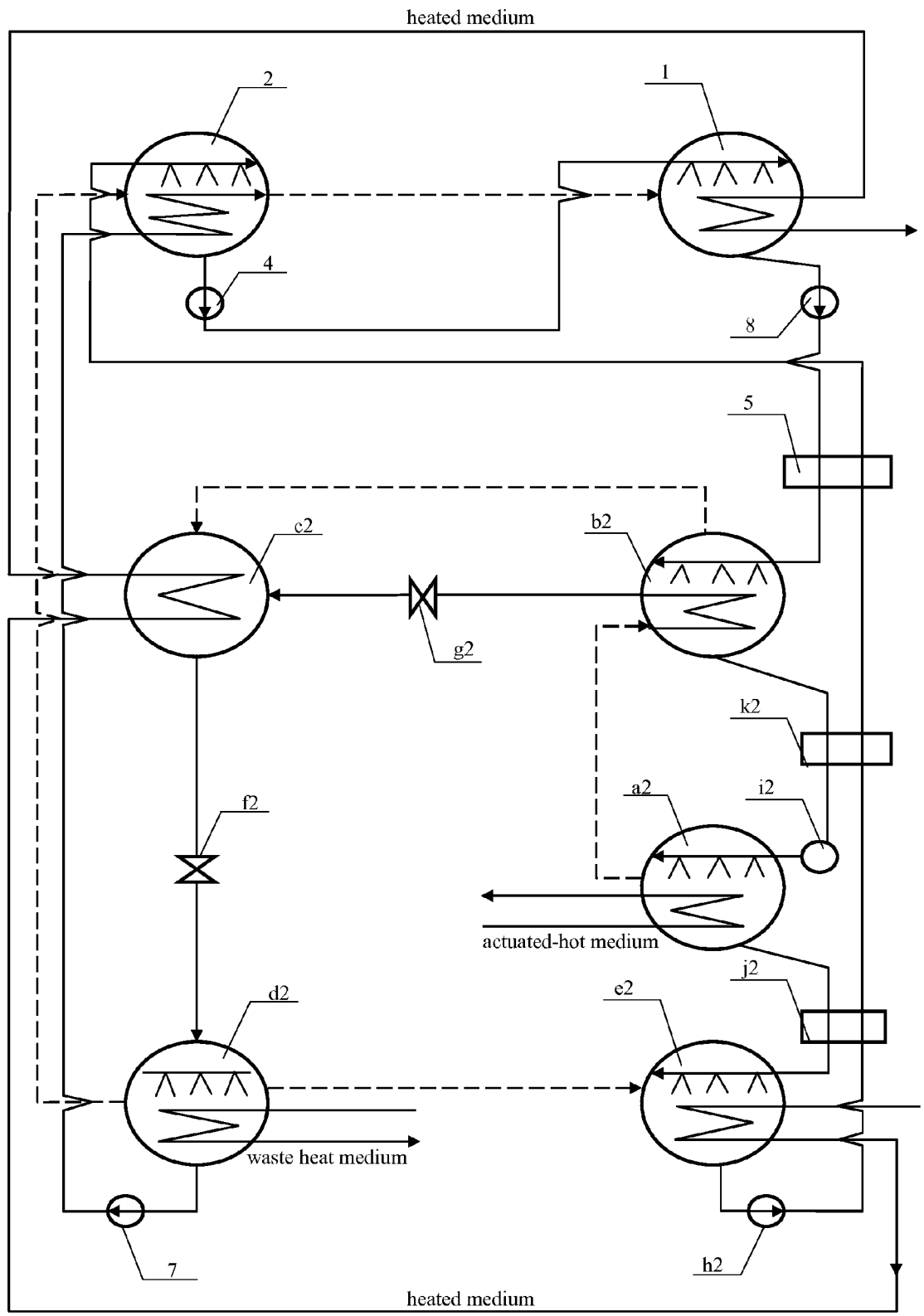

FIG. 13 provides the sixth construction and flow diagram of absorption heat pump with three-terminal heating that consists of adding an adjacent high-temperature heating-side to the concatenated loops single-stage double-effect absorption heat pump.

In the FIG. 8 to FIG. 13, the existing concatenated loops single-stage double-effect absorption heat pump adopt two solution pumps, and the pipe from absorber connects solution pump, solution heat exchanger, the second solution heat exchanger and the low pressure generator one by one.

Figure 14:
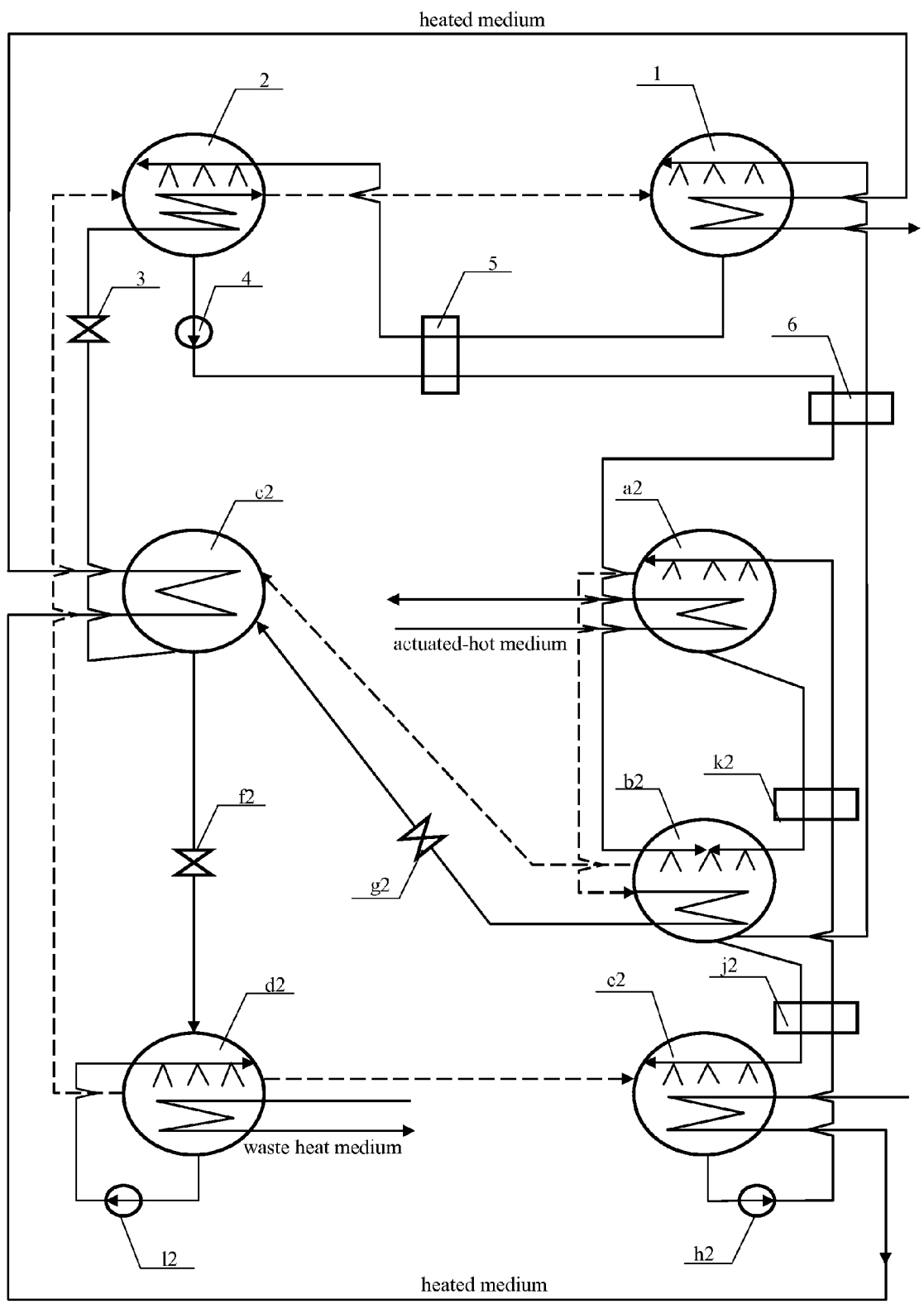

FIG. 14 provides the seventh construction and flow diagram of absorption heat pump with three-terminal heating that consists of adding an adjacent high-temperature heating-side to the concatenated loops single-stage double-effect absorption heat pump.

Figure 15:
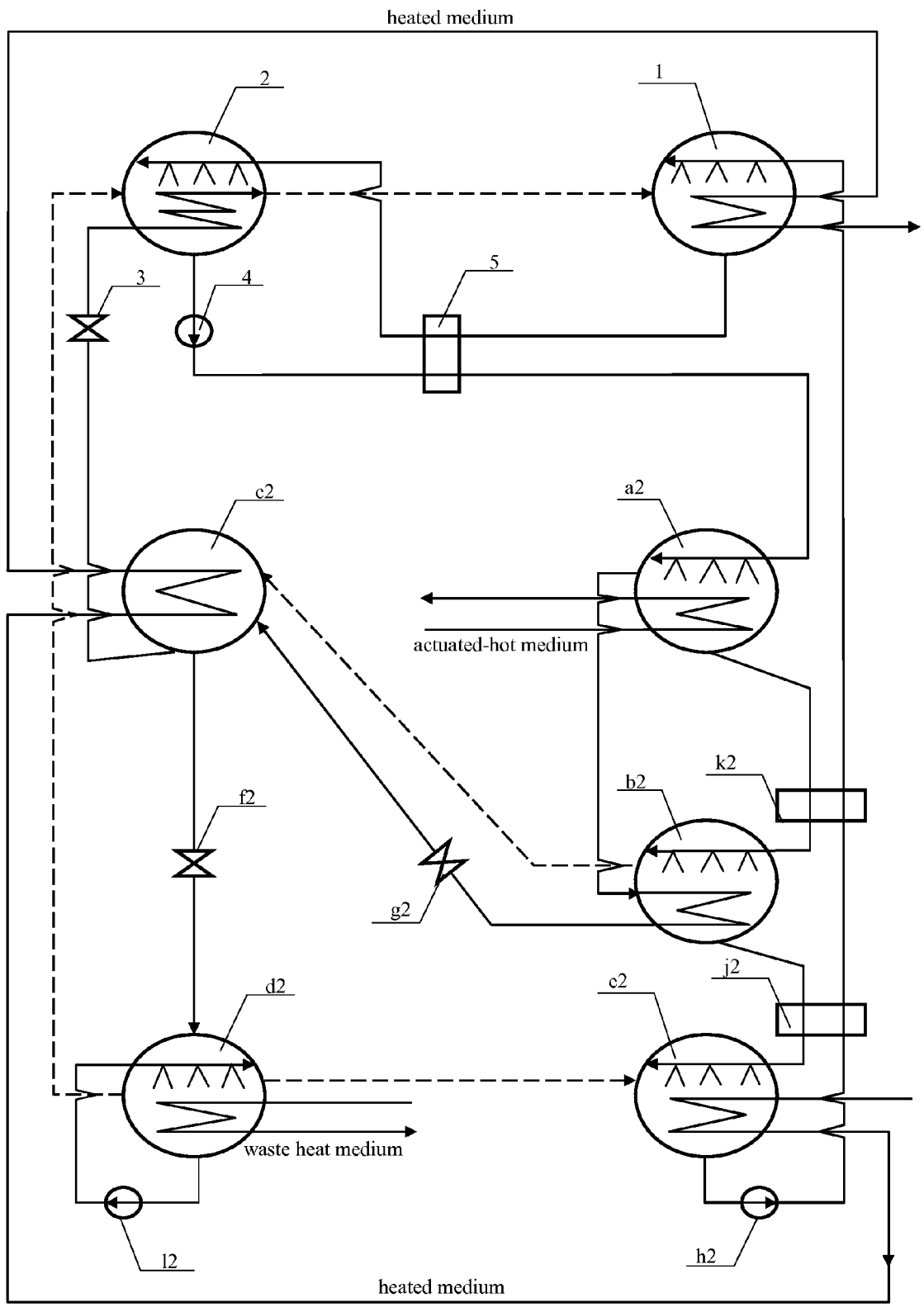

FIG. 15 provides the eighth construction and flow diagram of absorption heat pump with three-terminal heating that consists of adding an adjacent high-temperature heating-side to the concatenated loops single-stage double-effect absorption heat pump.

Figure 16:
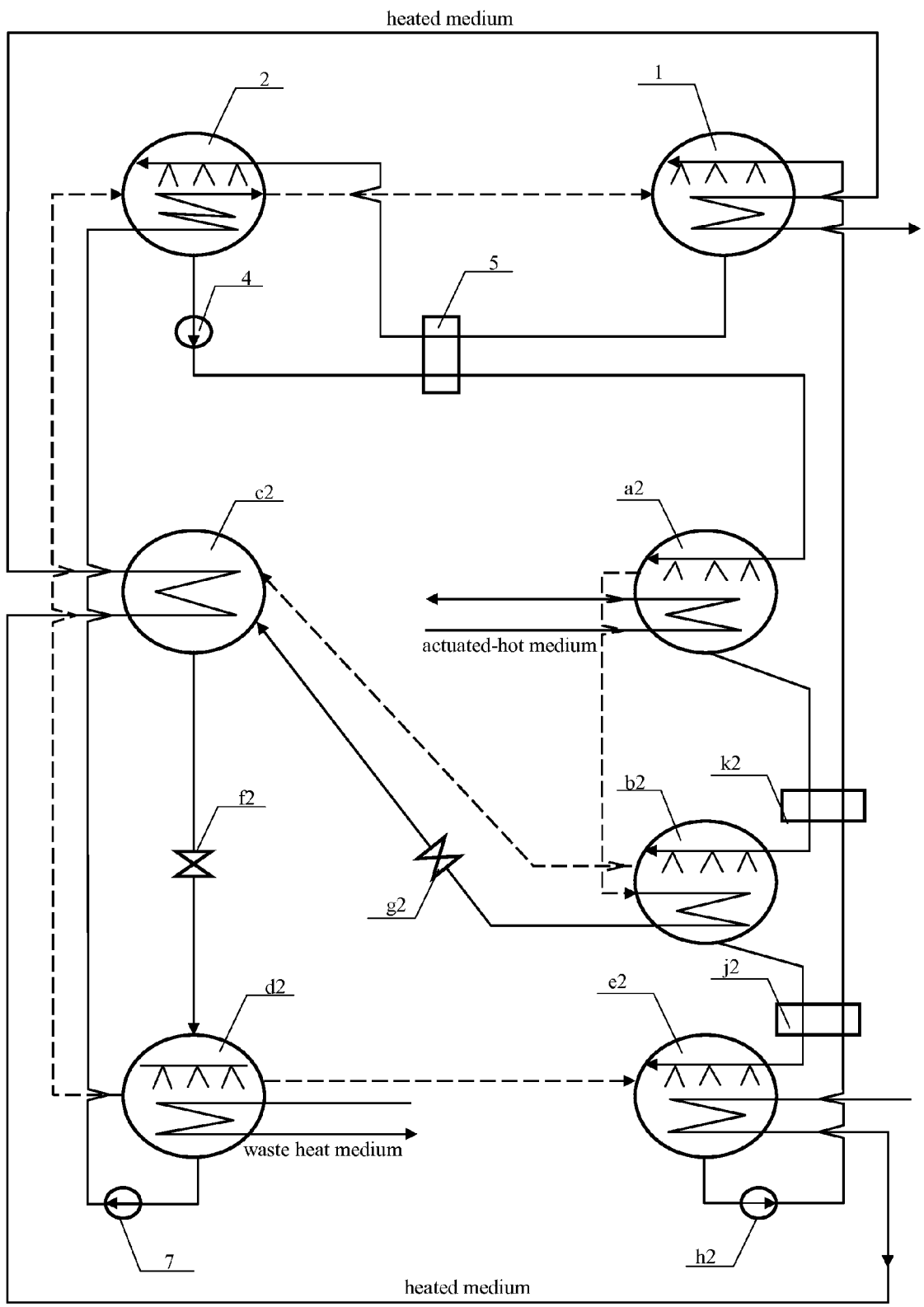

FIG. 16 provides the ninth construction and flow diagram of absorption heat pump with three-terminal heating that consists of adding an adjacent high-temperature heating-side to the concatenated loops single-stage double-effect absorption heat pump.

Figure 17:
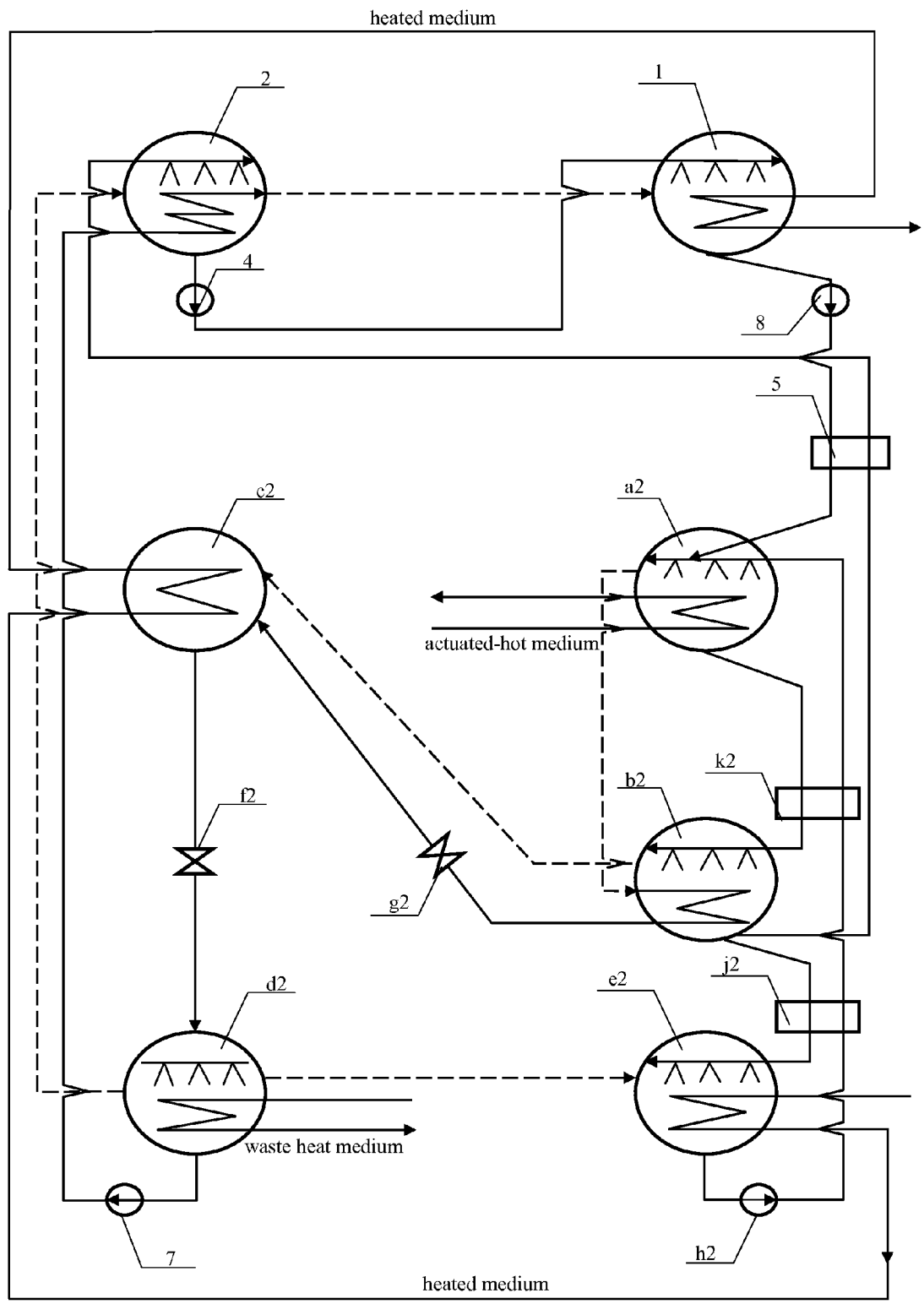

FIG. 17 provides the tenth construction and flow diagram of absorption heat pump with three-terminal heating that consists of adding an adjacent high-temperature heating-side to the concatenated loops single-stage double-effect absorption heat pump.

In the FIG. 14 to FIG. 17, the existing concatenated loops single-stage double-effect absorption heat pump adopt single solution pump, and the pipe from absorber connects solution pump, solution heat exchanger, the second solution heat exchanger and the high pressure generator one by one.

Figure 18:
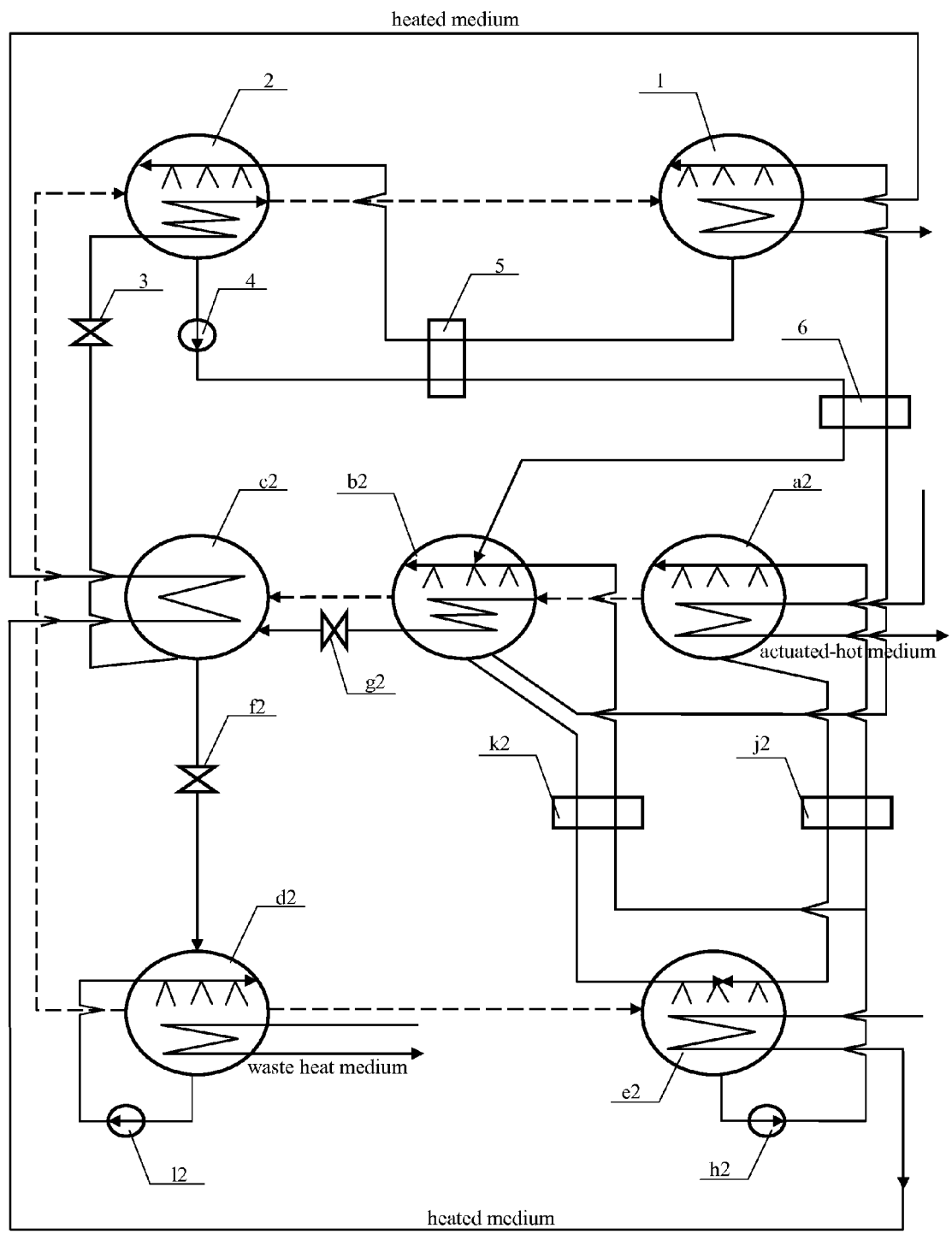

FIG. 18 provides the first construction and flow diagram of absorption heat pump with three-terminal heating that consists of adding an adjacent high-temperature heating-side to the solution parallel loop single-stage double-effect absorption heat pump.

Figure 19:
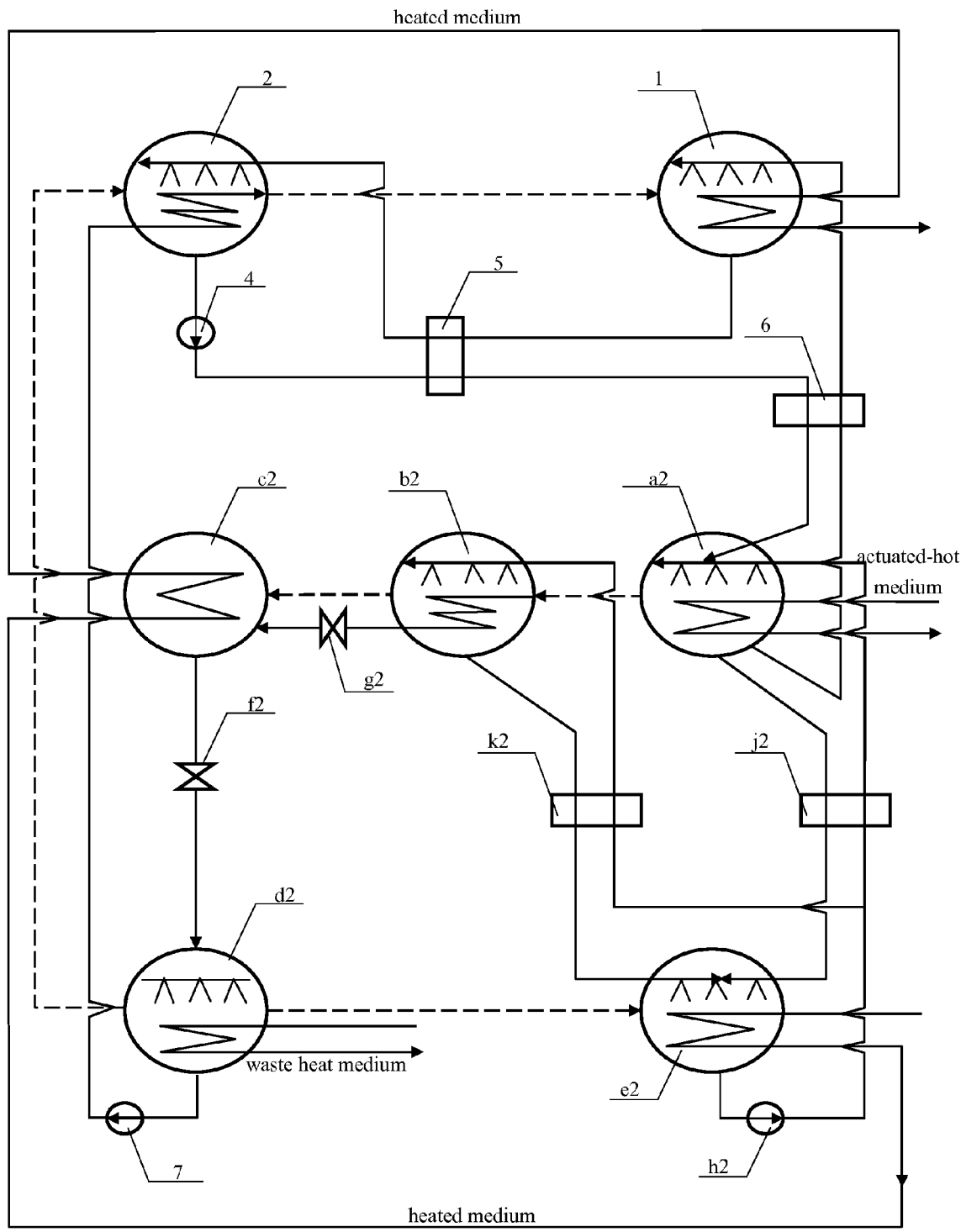

FIG. 19 provides the second construction and flow diagram of absorption heat pump with three-terminal heating that consists of adding an adjacent high-temperature heating-side to the solution parallel loop single-stage double-effect absorption heat pump.

Figure 20:
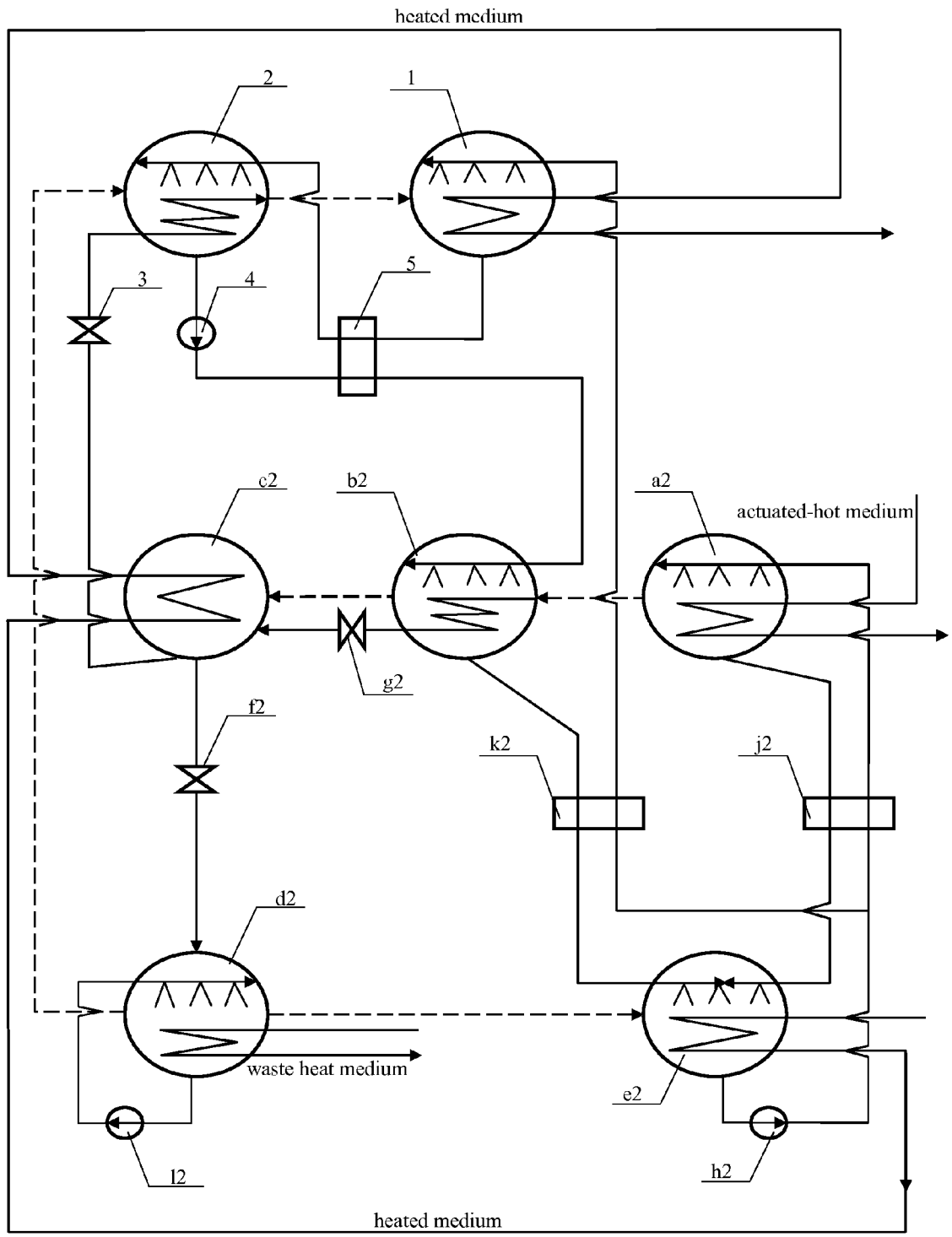

FIG. 20 provides the third construction and flow diagram of absorption heat pump with three-terminal heating that consists of adding an adjacent high-temperature heating-side to the solution parallel loop single-stage double-effect absorption heat pump.

Figure 21:
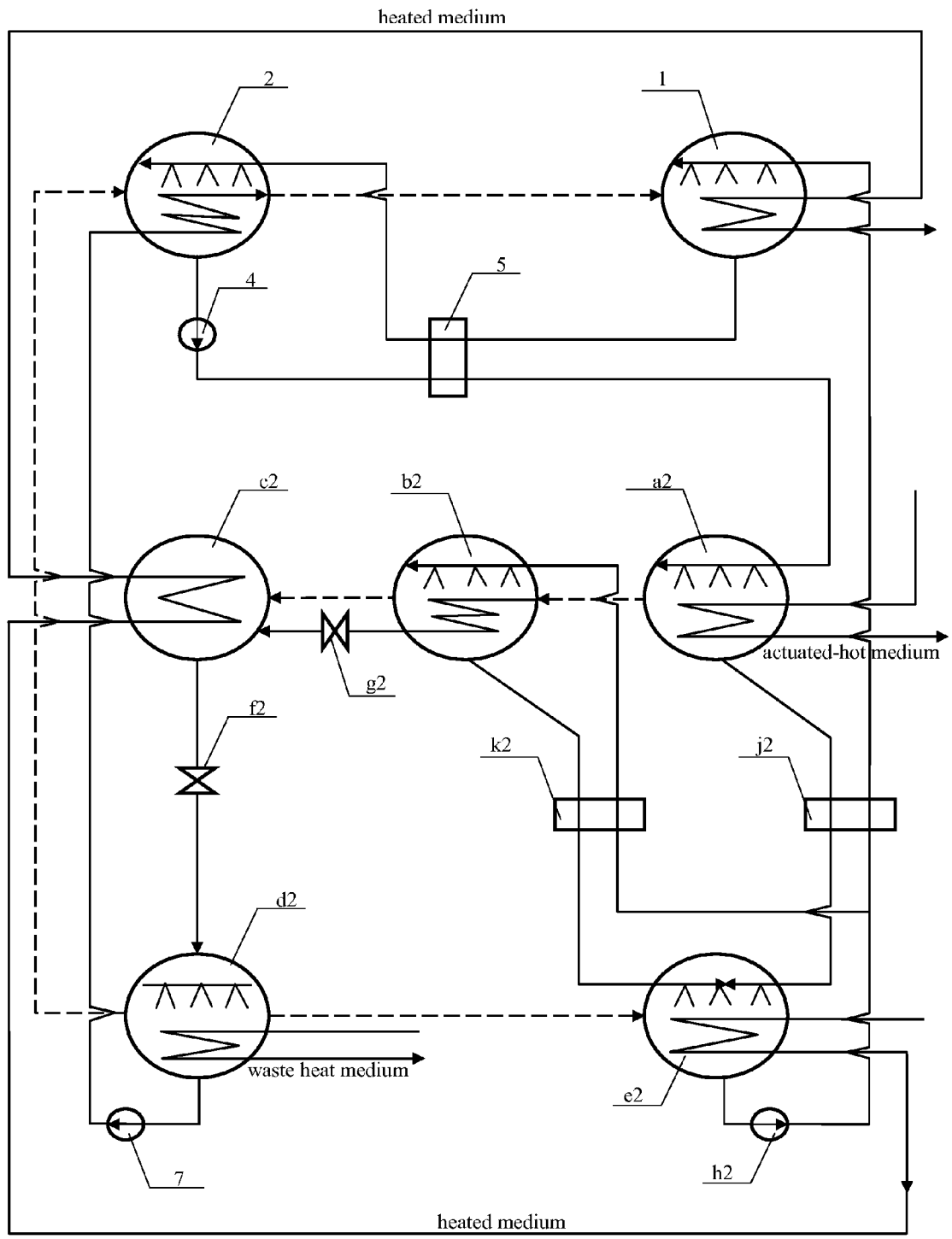

FIG. 21 provides the fourth construction and flow diagram of absorption heat pump with three-terminal heating that consists of adding an adjacent high-temperature heating-side to the solution parallel loop single-stage double-effect absorption heat pump.

Figure 22:
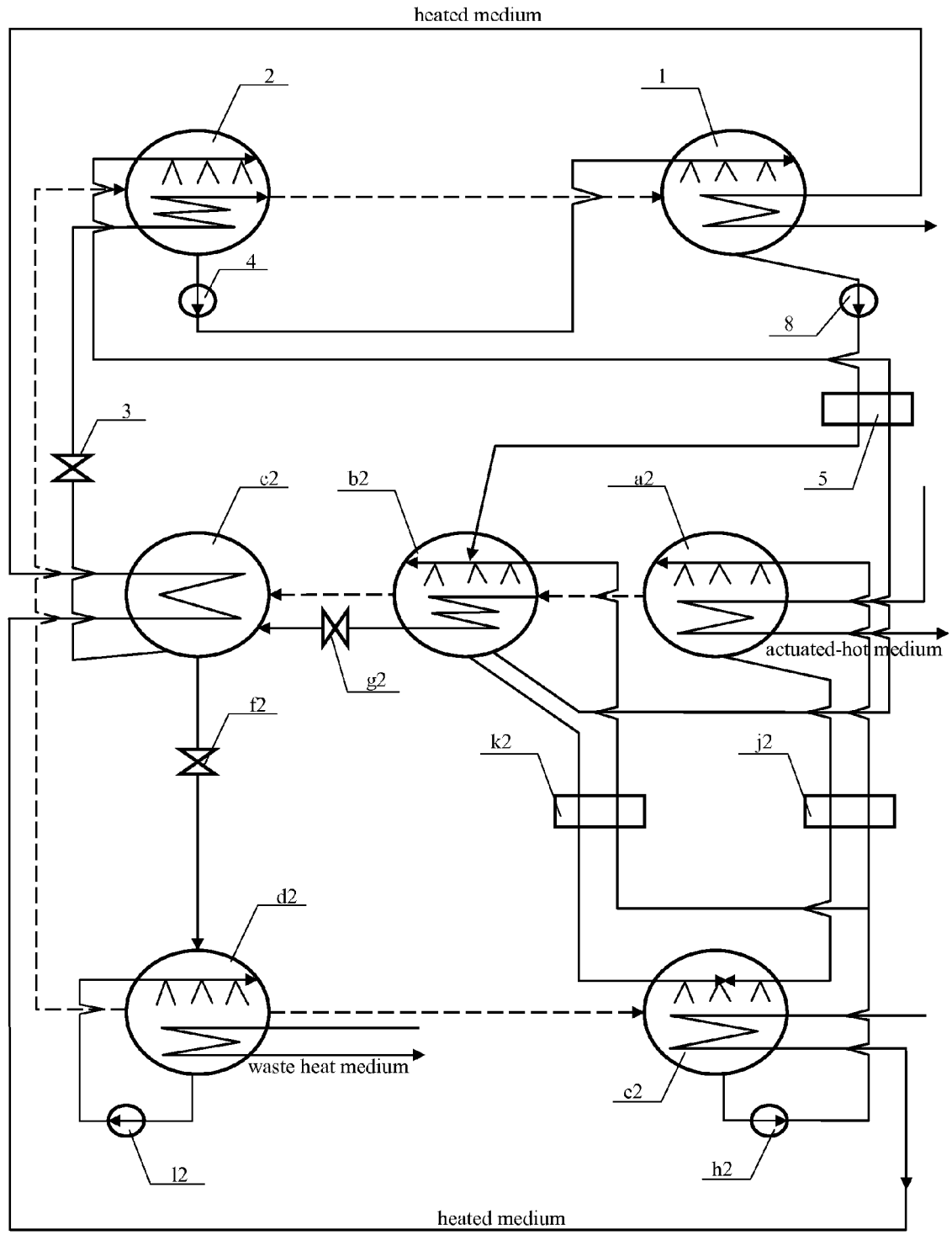

FIG. 22 provides the fifth construction and flow diagram of absorption heat pump with three-terminal heating that consists of adding an adjacent high-temperature heating-side to the solution parallel loop single-stage double-effect absorption heat pump.

Figure 23:
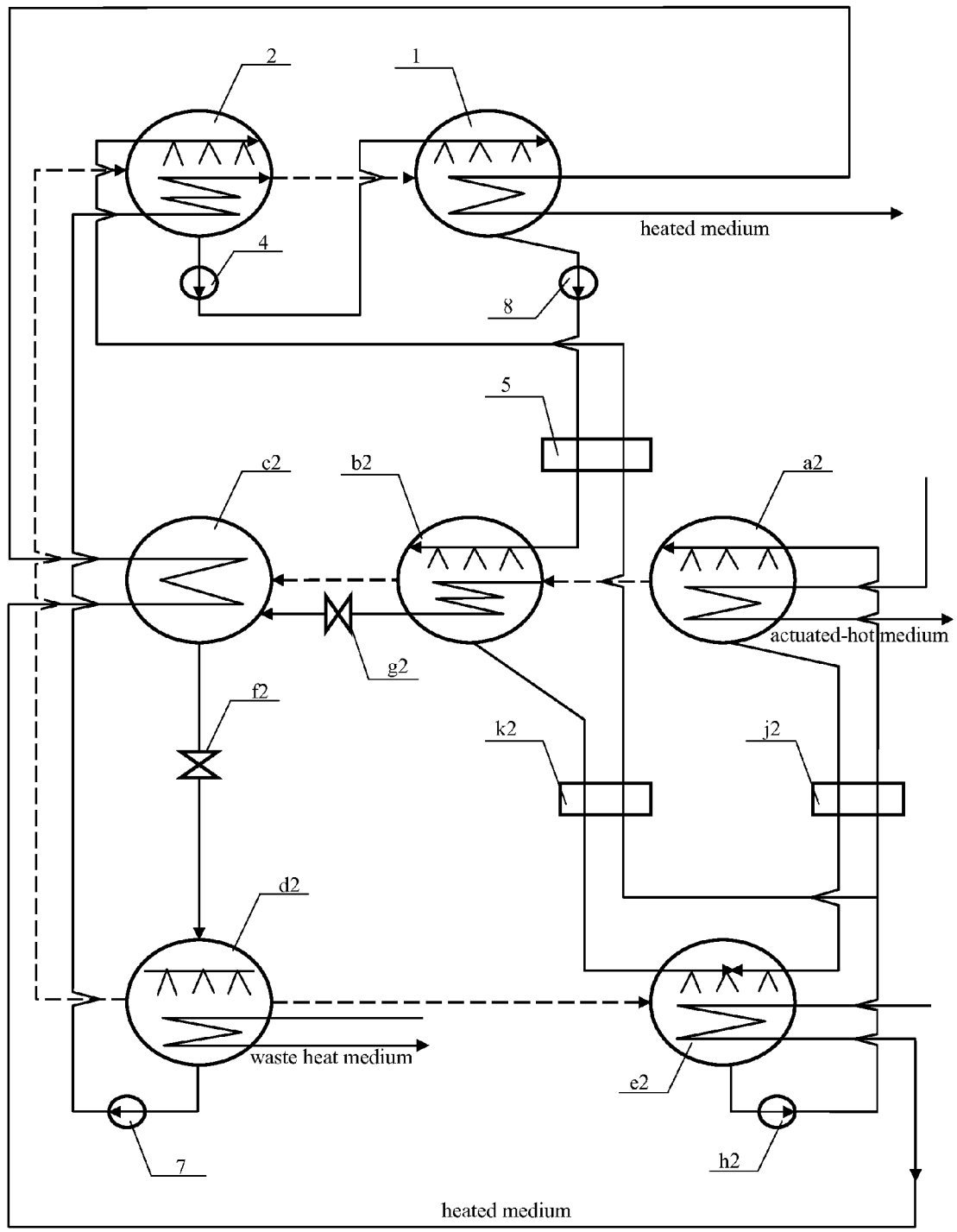

FIG. 23 provides the sixth construction and flow diagram of absorption heat pump with three-terminal heating that consists of adding an adjacent high-temperature heating-side to the solution parallel loop single-stage double-effect absorption heat pump.

Figure 24:
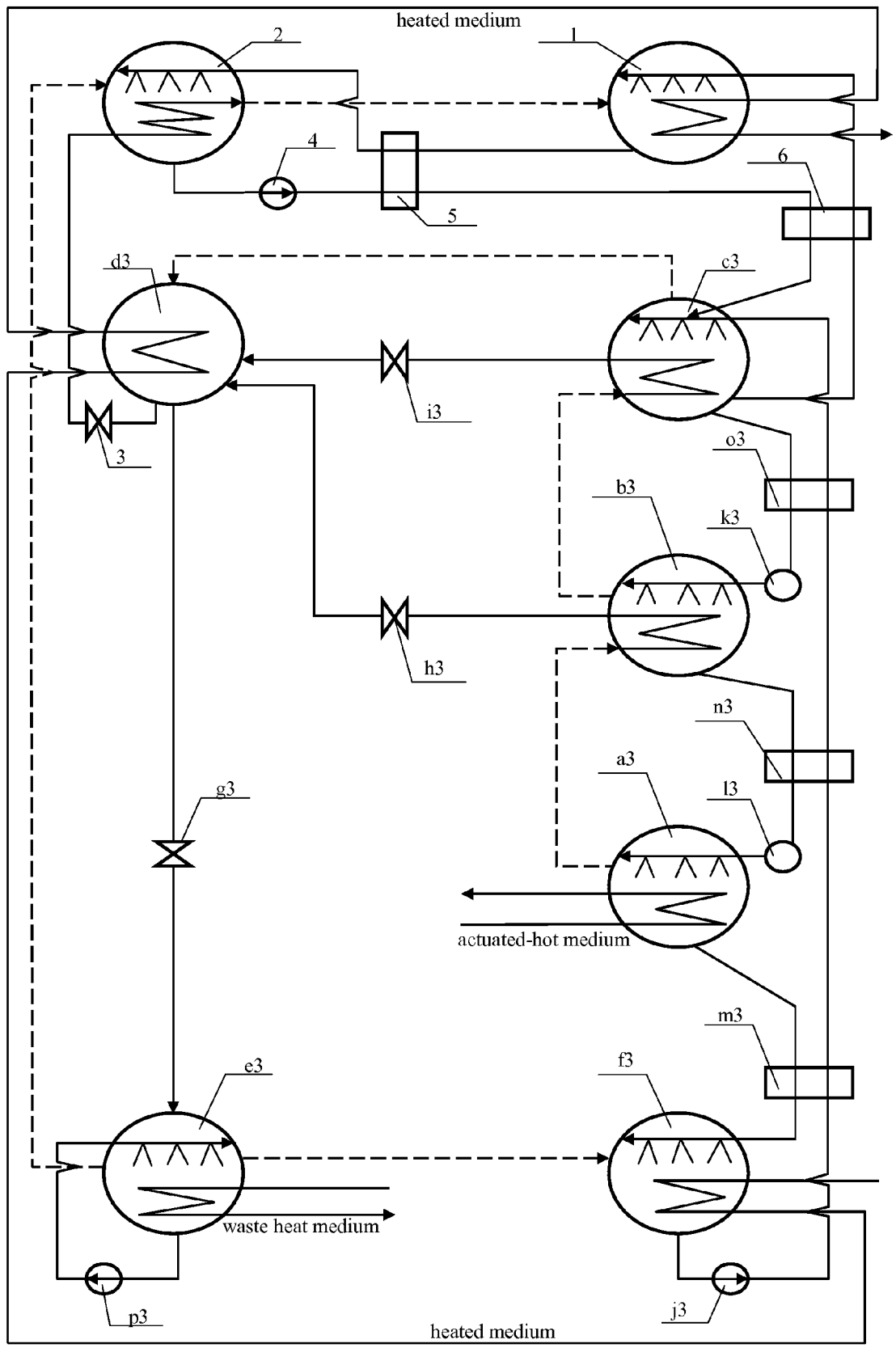

FIG. 24 provides the first construction and flow diagram of absorption heat pump with three-terminal heating that consists of adding an adjacent high-temperature heating-side to the concatenated loops single-stage three-effect absorption heat pump.

Figure 25:
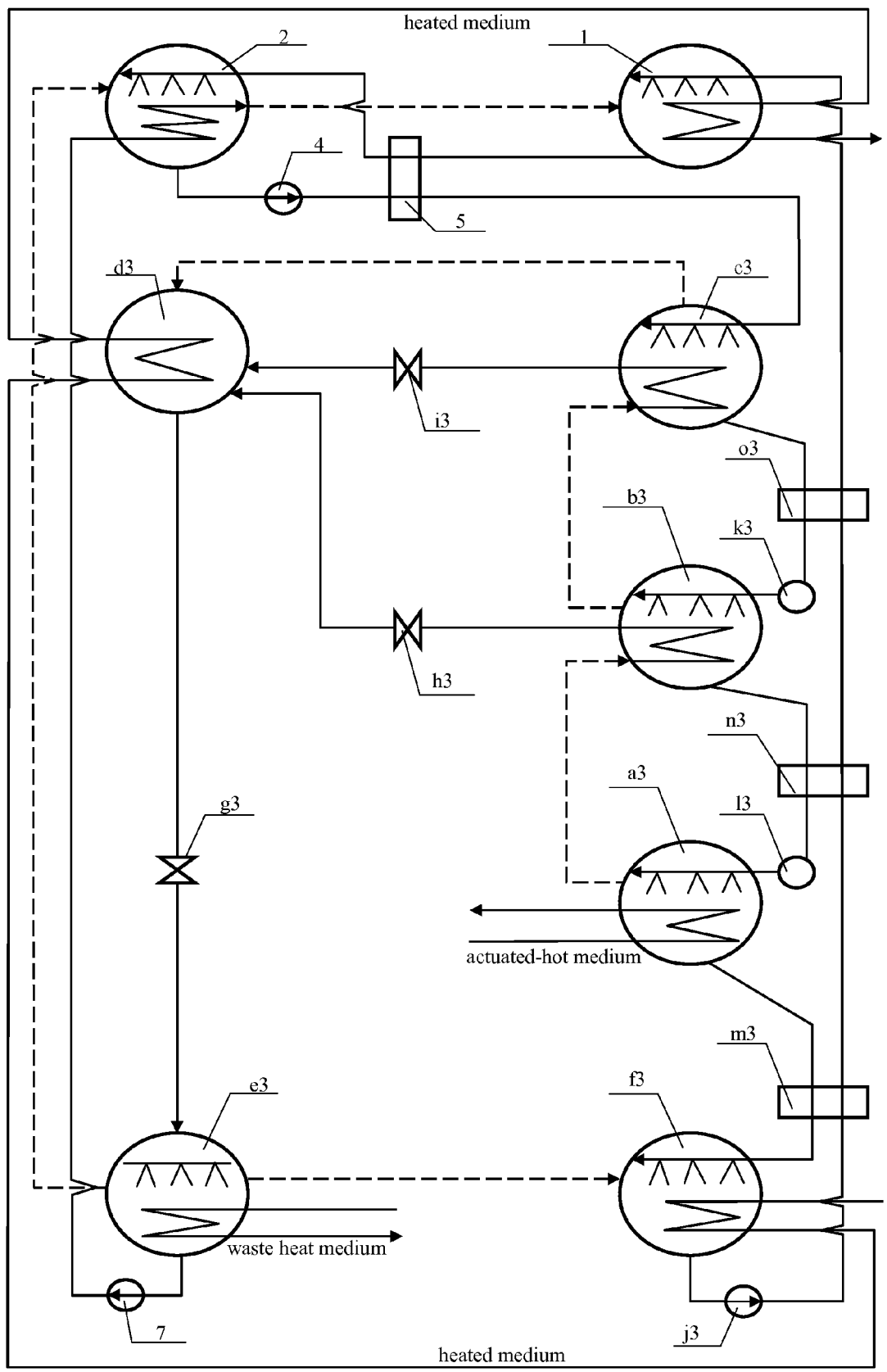

FIG. 25 provides the second construction and flow diagram of absorption heat pump with three-terminal heating that consists of adding an adjacent high-temperature heating-side to the concatenated loops single-stage three-effect absorption heat pump.

Figure 26:
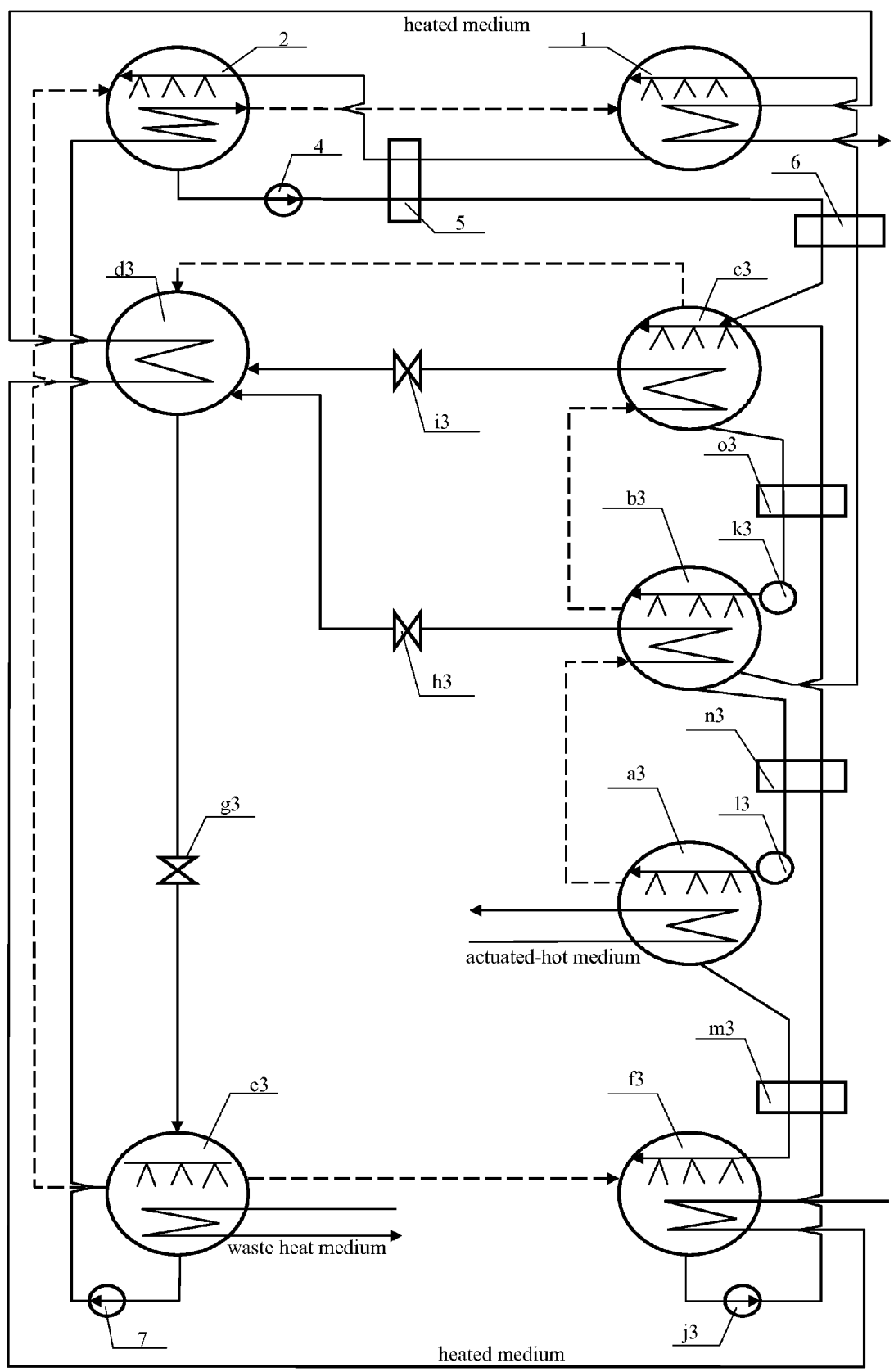

FIG. 26 provides the third construction and flow diagram of absorption heat pump with three-terminal heating that consists of adding an adjacent high-temperature heating-side to the concatenated loops single-stage three-effect absorption heat pump.

Figure 27:
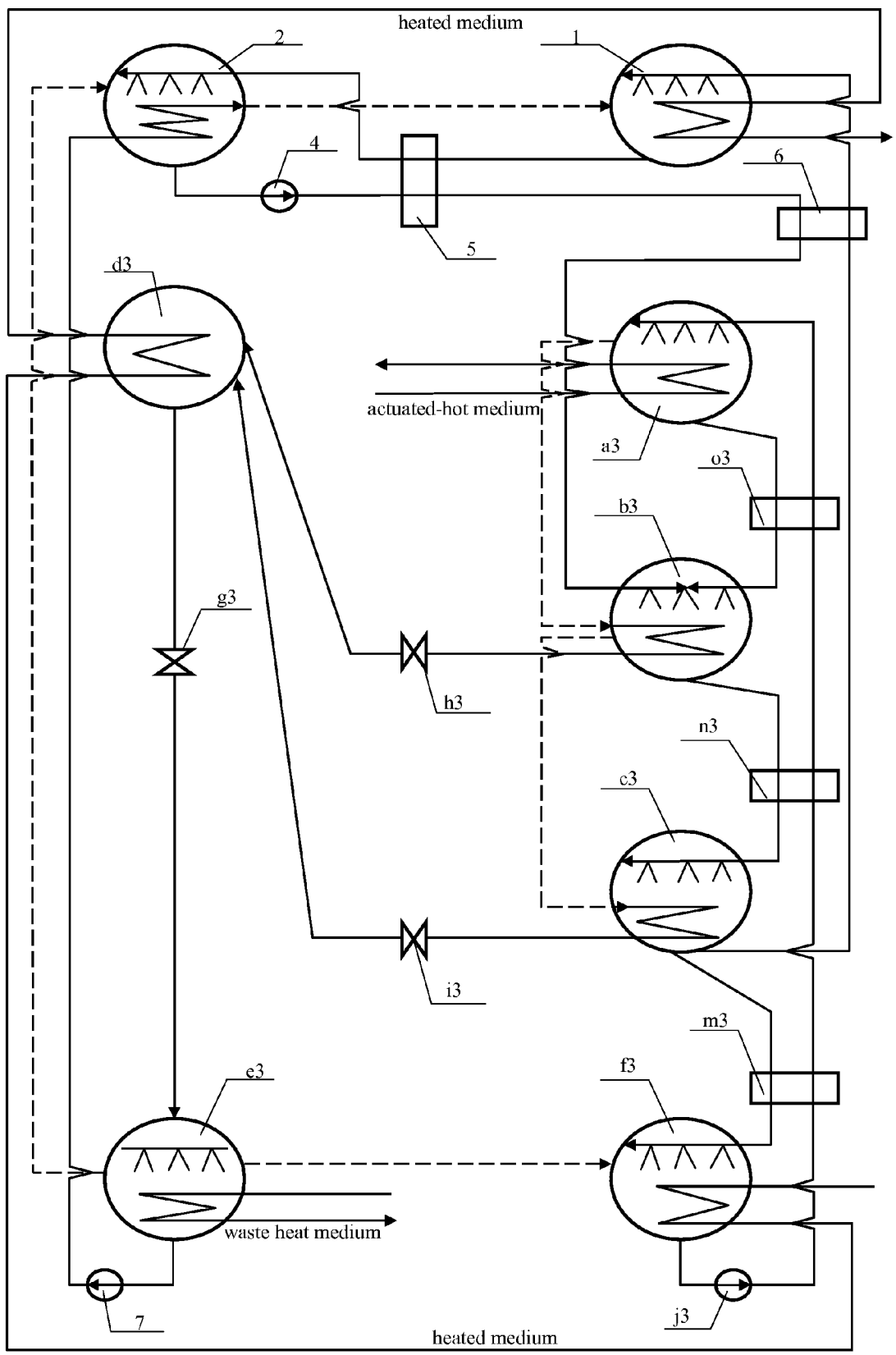

FIG. 27 provides the fourth construction and flow diagram of absorption heat pump with three-terminal heating that consists of adding an adjacent high-temperature heating-side to the concatenated loops single-stage three-effect absorption heat pump.

Figure 28:
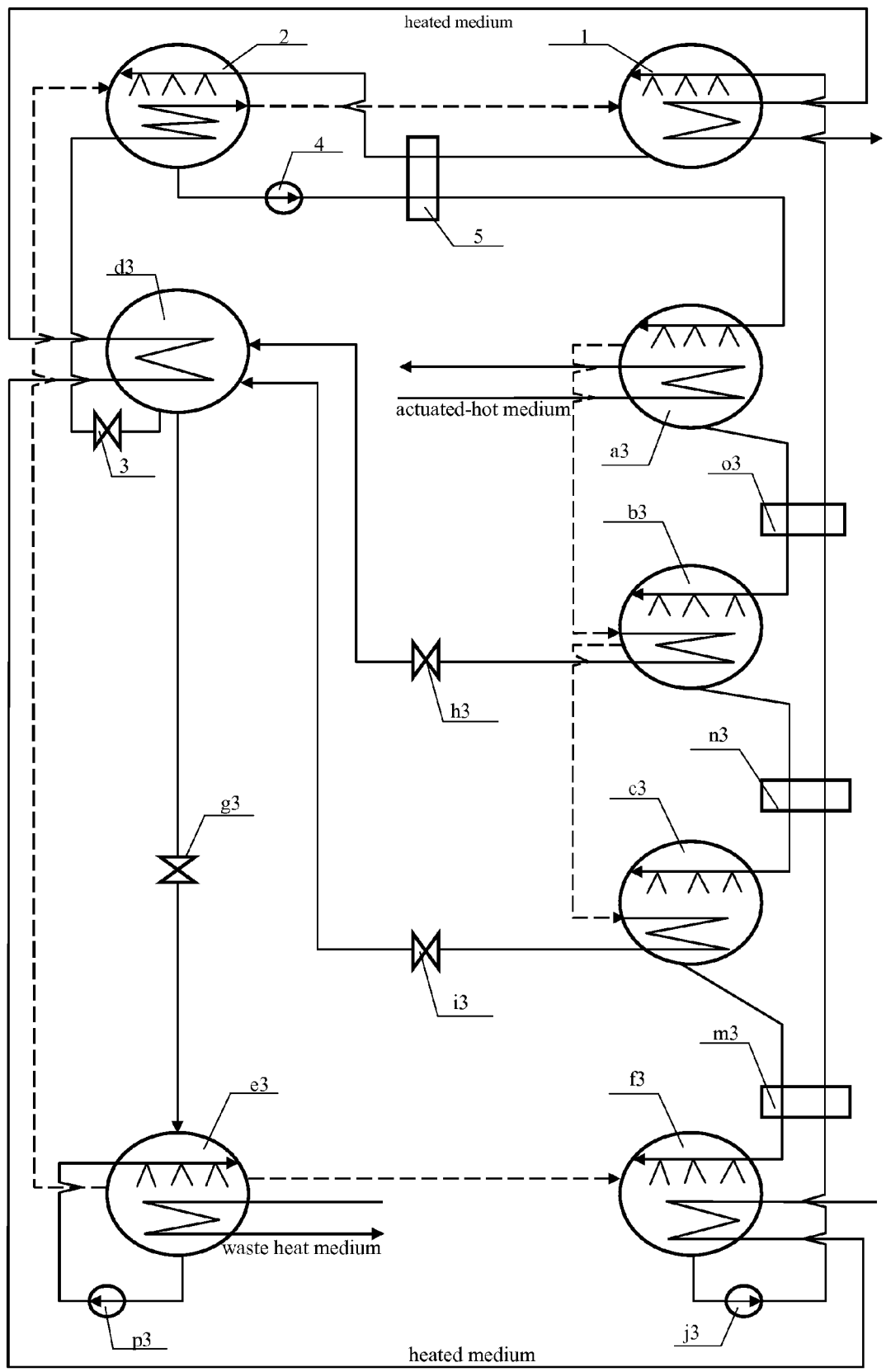

FIG. 28 provides the fifth construction and flow diagram of absorption heat pump with three-terminal heating that consists of adding an adjacent high-temperature heating-side to the concatenated loops single-stage three-effect absorption heat pump.

Figure 29:
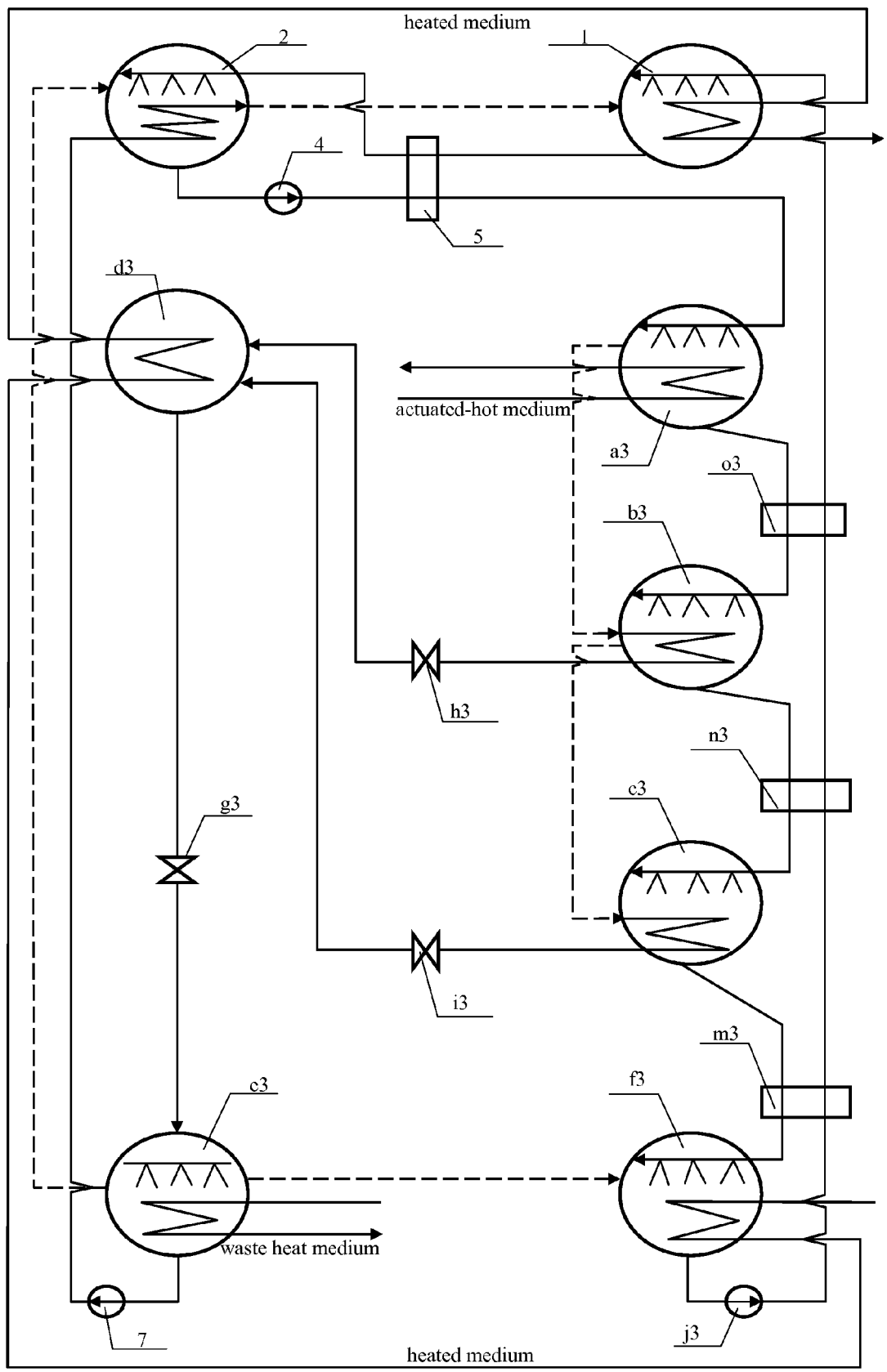

FIG. 29 provides the sixth construction and flow diagram of absorption heat pump with three-terminal heating that consists of adding an adjacent high-temperature heating-side to the concatenated loops single-stage three-effect absorption heat pump.

Figure 30:
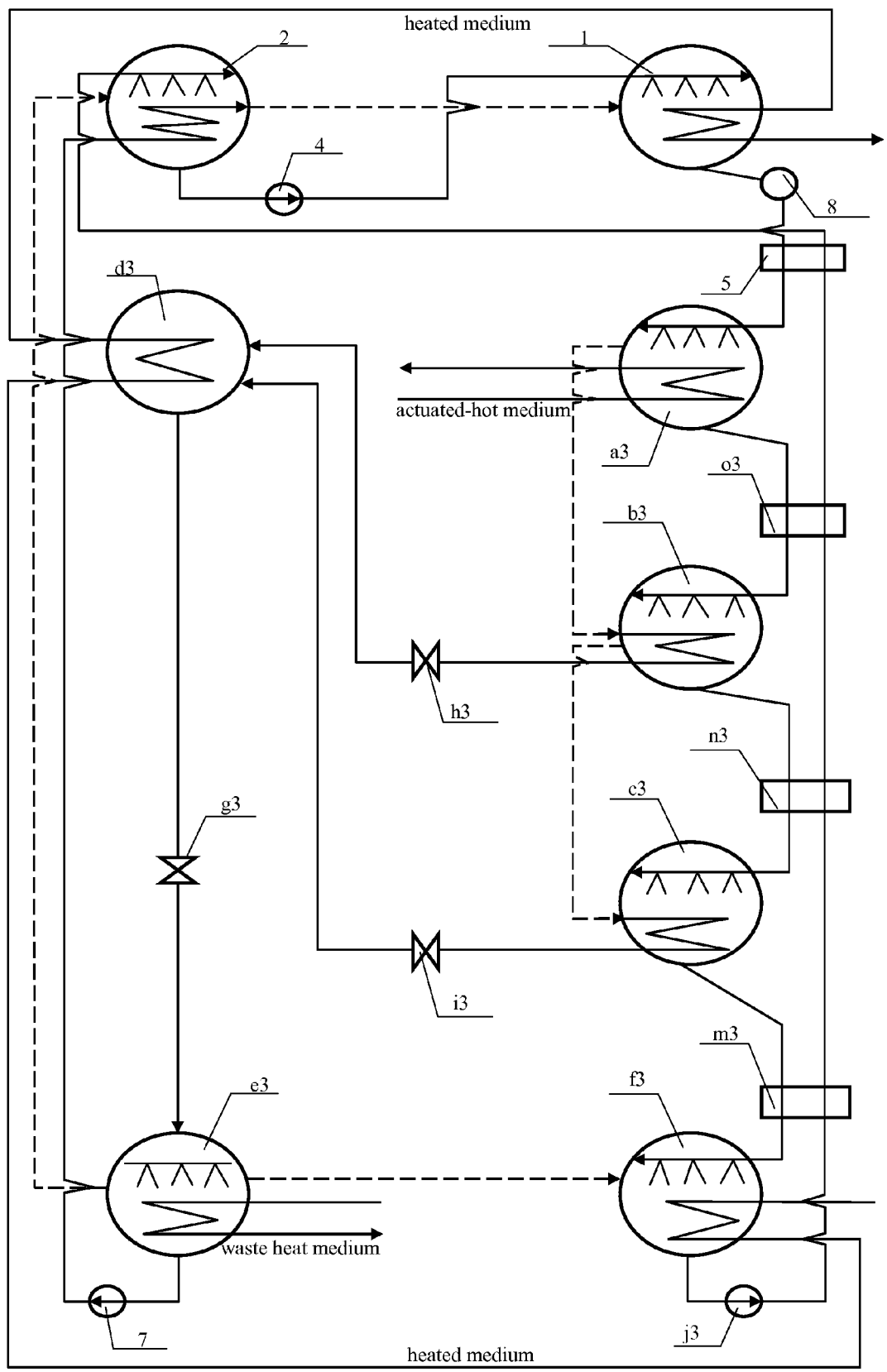

FIG. 30 provides the seventh construction and flow diagram of absorption heat pump with three-terminal heating that consists of adding an adjacent high-temperature heating-side to the concatenated loops single-stage three-effect absorption heat pump.

In the FIG. 24 to FIG. 30, FIG. 24 to FIG. 26 with the existing concatenated loops single-stage three-effect absorption heat pump adopt three solution pumps and the pipe from absorber connects solution pump, solution heat exchanger, the second solution heat exchanger, the third solution heat exchanger and the high pressure generator one by one.

Figure 31:
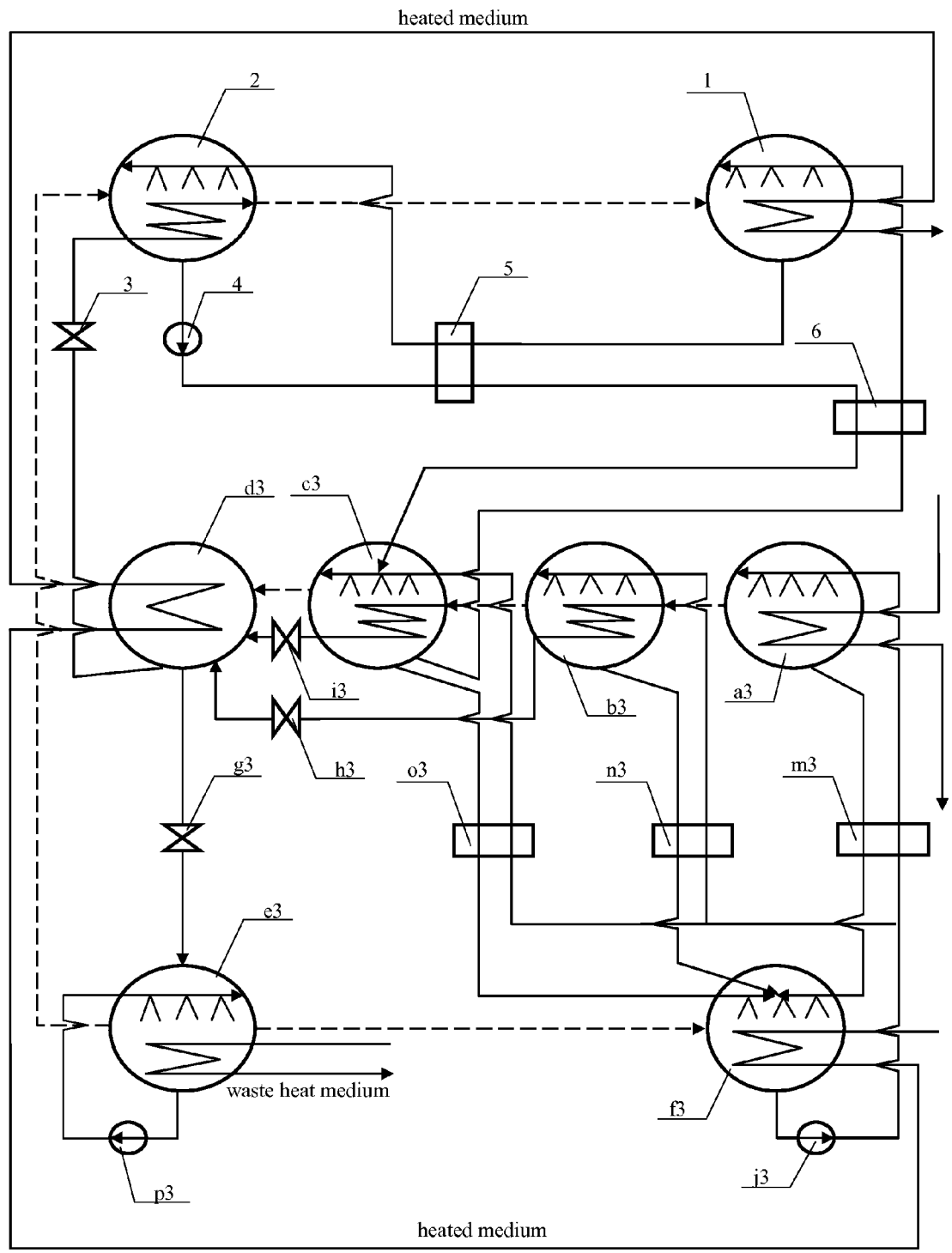

FIG. 31 provides the first construction and flow diagram of absorption heat pump with three-terminal heating that consists of adding an adjacent high-temperature heating-side to the solution parallel loop single-stage three-effect absorption heat pump.

Figure 32:
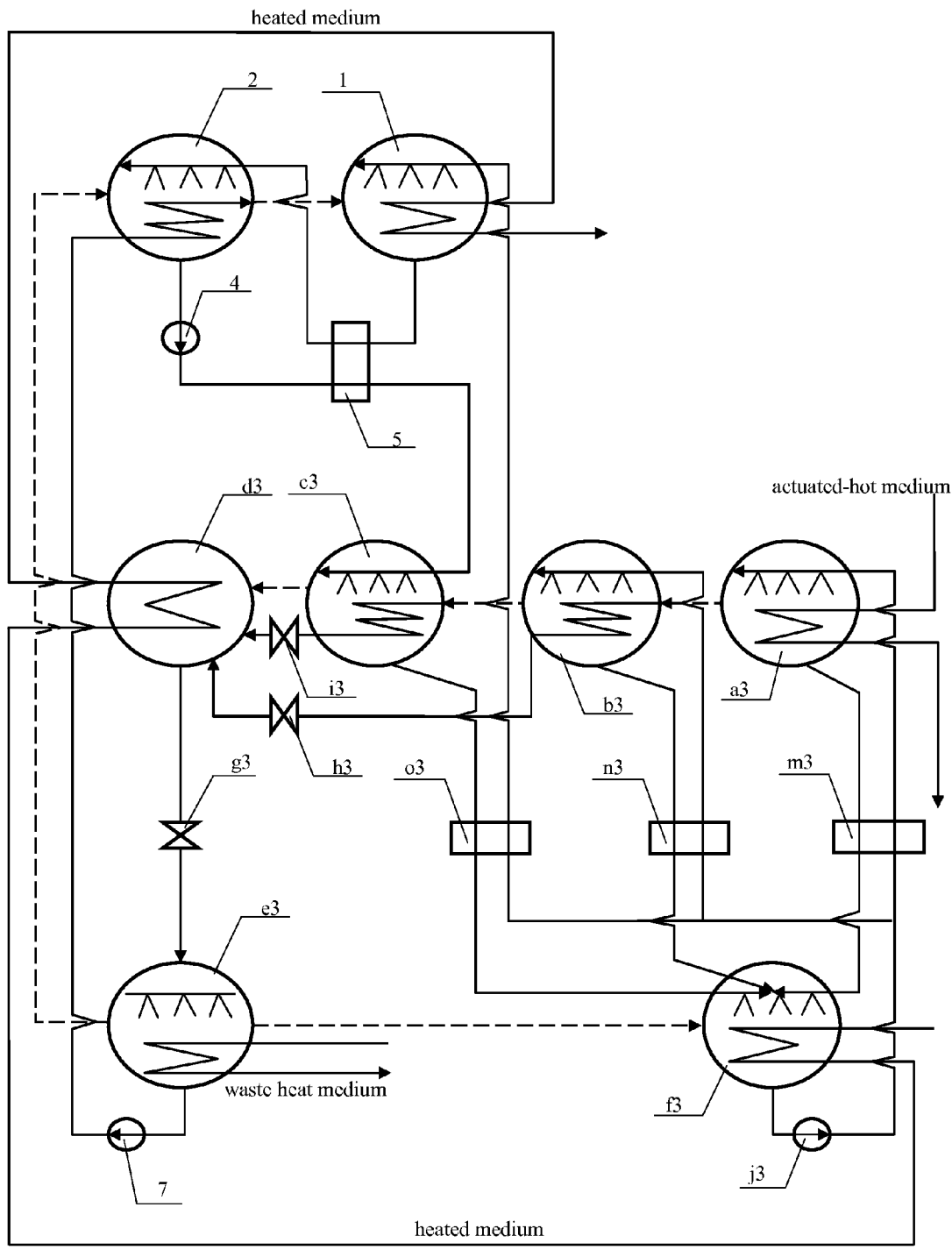

FIG. 32 provides the second construction and flow diagram of absorption heat pump with three-terminal heating that consists of adding an adjacent high-temperature heating-side to the solution parallel loop single-stage three-effect absorption heat pump.

Figure 33:
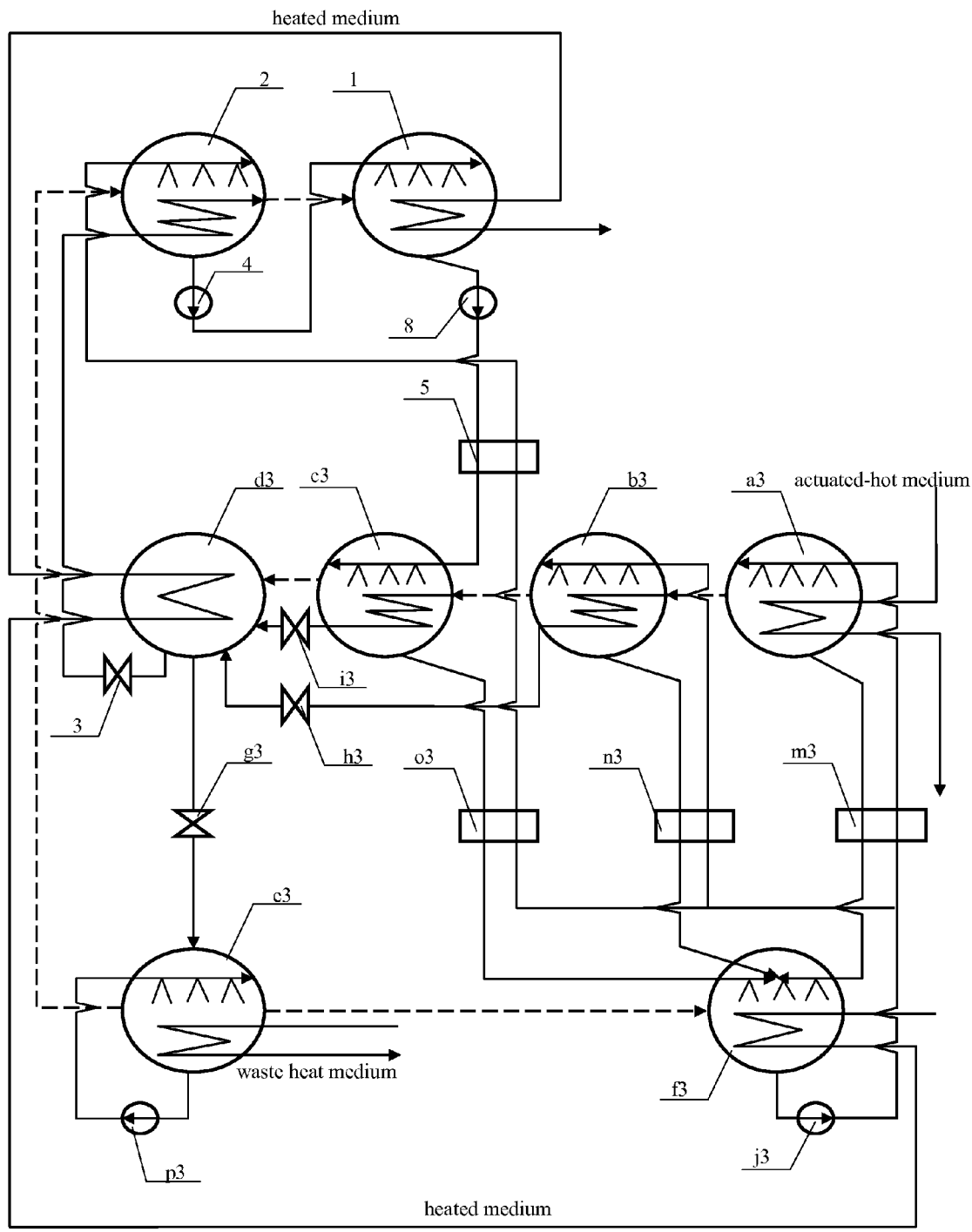

FIG. 33 provides the third construction and flow diagram of absorption heat pump with three-terminal heating that consists of adding an adjacent high-temperature heating-side to the solution parallel loop single-stage three-effect absorption heat pump.

Figure 34:
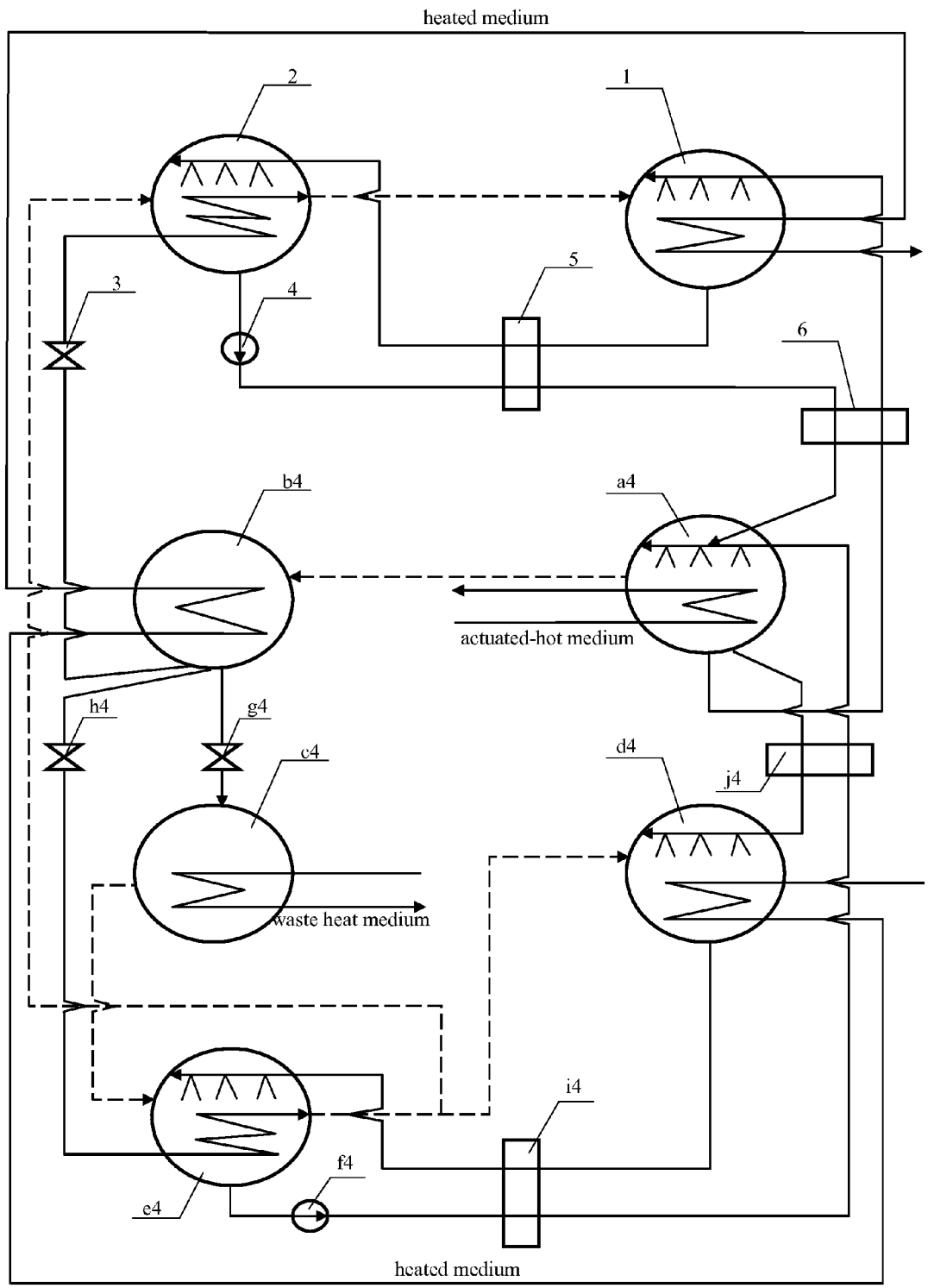

FIG. 34 provides the first construction and flow diagram of absorption heat pump with three-terminal heating that consists of adding an adjacent high-temperature heating-side to the single generator two-stage absorption heat pump in which the absorption-evaporator provides refrigerant vapor to absorber.

Figure 35:
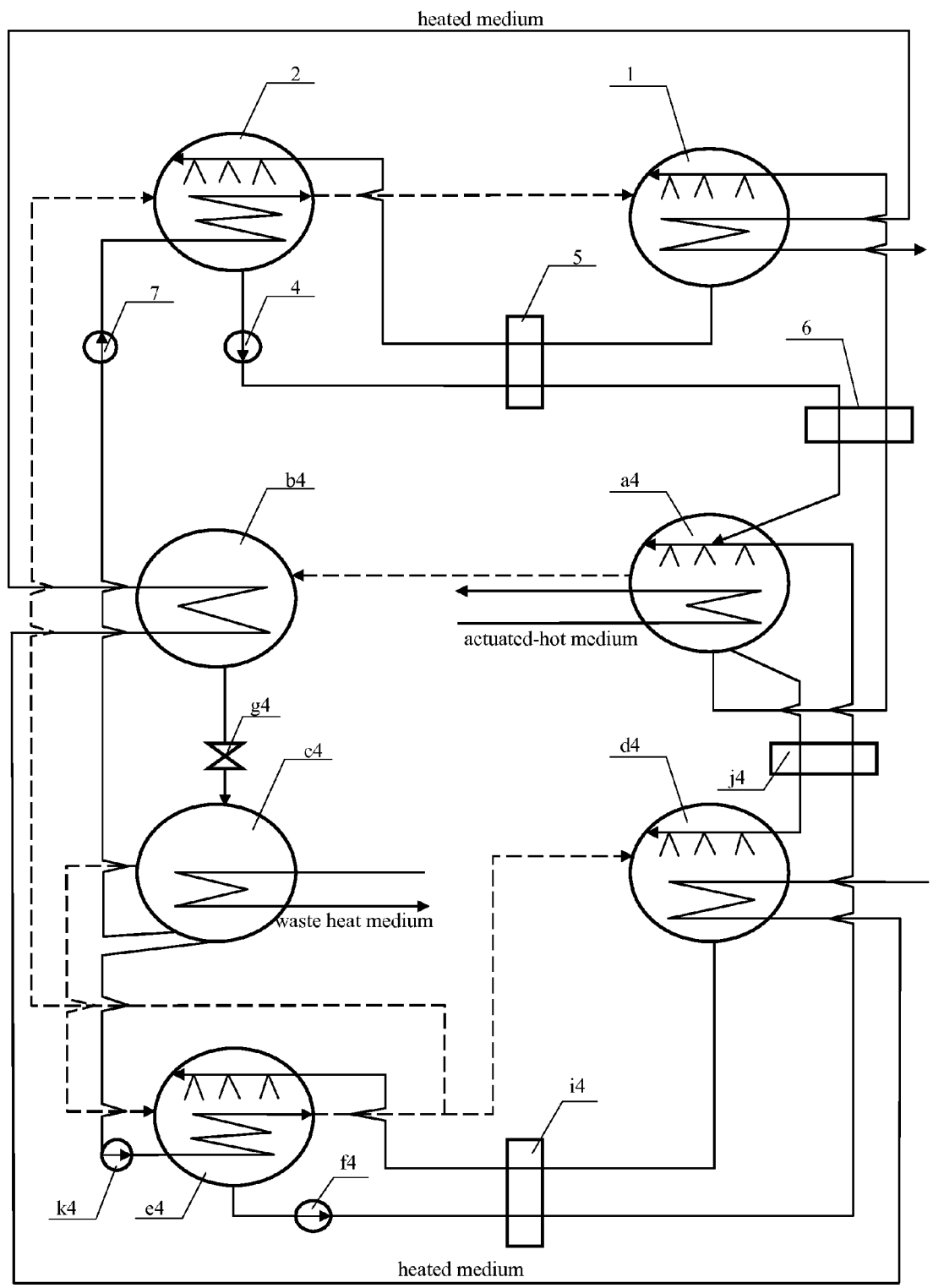

FIG. 35 provides the second construction and flow diagram of absorption heat pump with three-terminal heating that consists of adding an adjacent high-temperature heating-side to the single generator two-stage absorption heat pump in which the absorption-evaporator provides refrigerant vapor to absorber.

Figure 36:
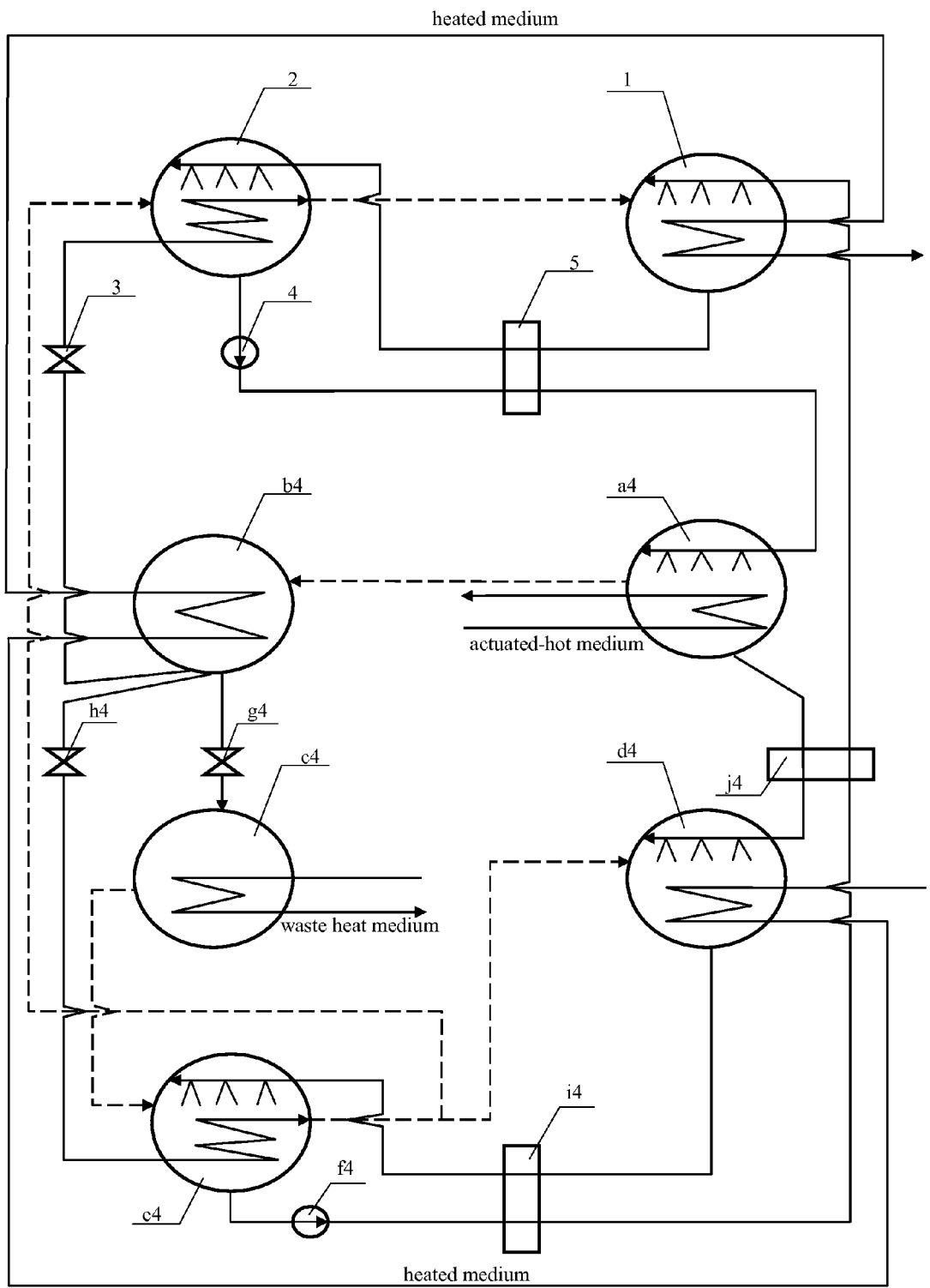

FIG. 36 provides the third construction and flow diagram of absorption heat pump with three-terminal heating that consists of adding an adjacent high-temperature heating-side to the single generator two-stage absorption heat pump in which the absorption-evaporator provides refrigerant vapor to absorber.

Figure 37:
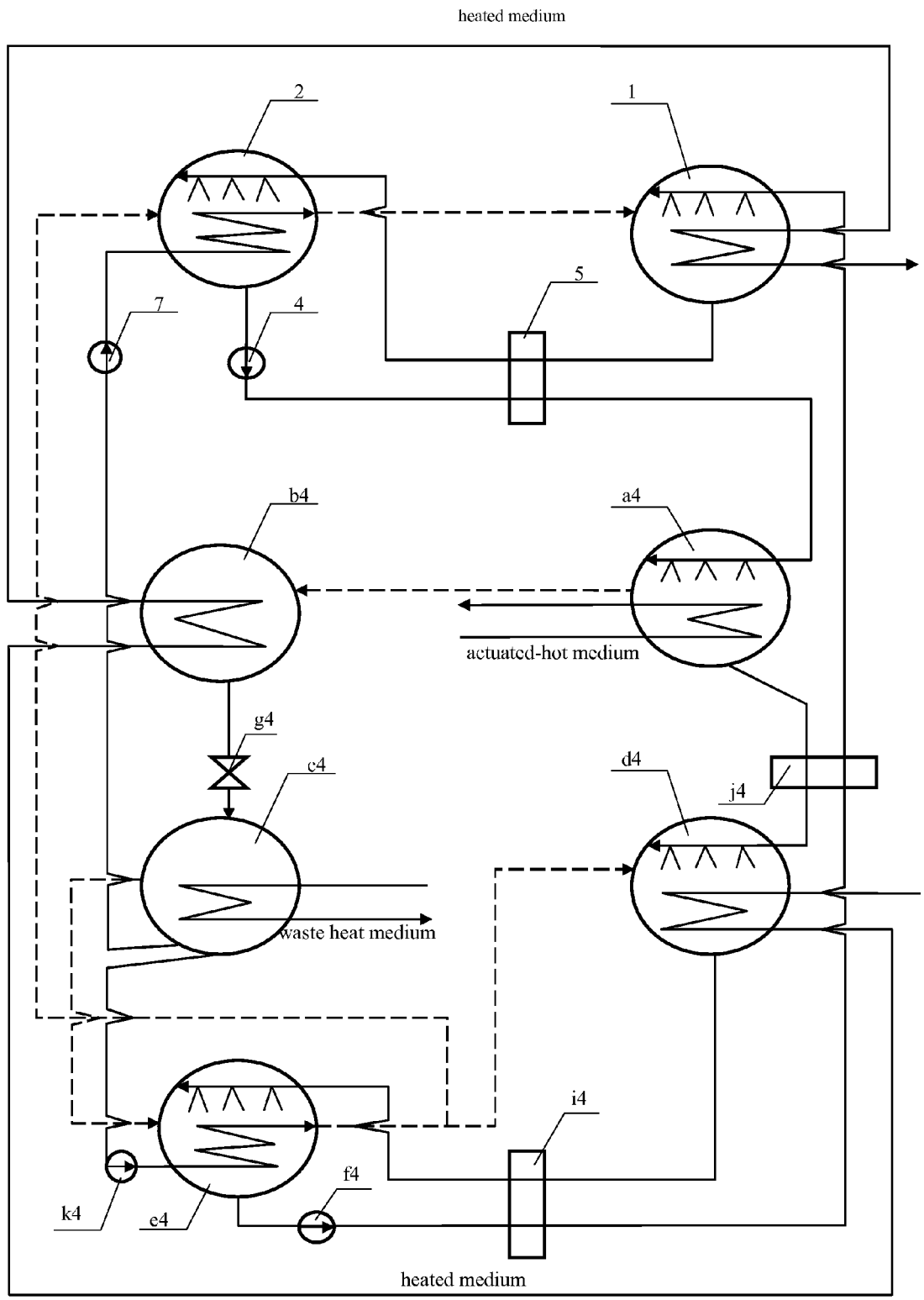

FIG. 37 provides the fourth construction and flow diagram of absorption heat pump with three-terminal heating that consists of adding an adjacent high-temperature heating-side to the single generator two-stage absorption heat pump in which the absorption-evaporator provides refrigerant vapor to absorber.

Figure 38:
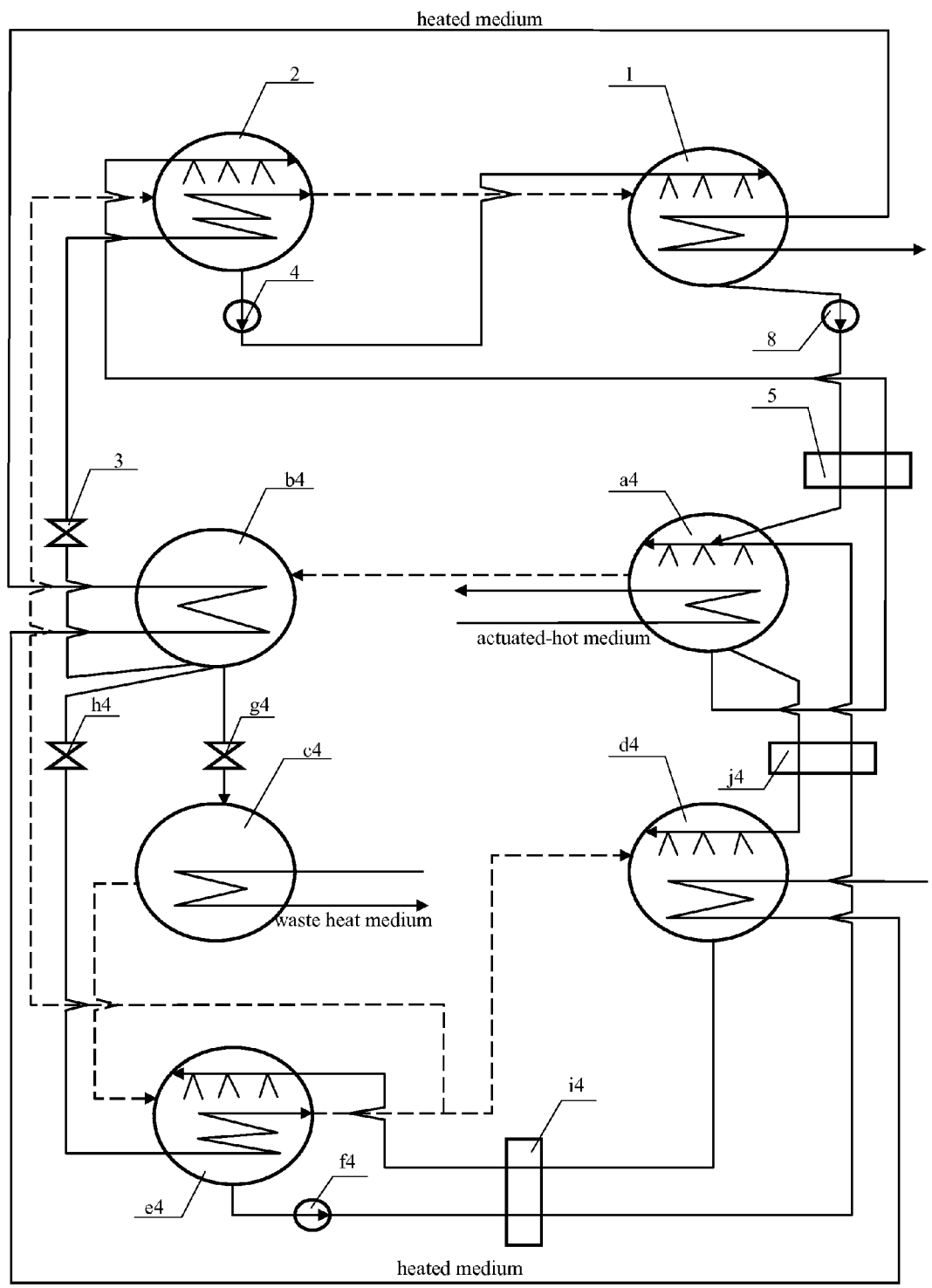

FIG. 38 provides the fifth construction and flow diagram of absorption heat pump with three-terminal heating that consists of adding an adjacent high-temperature heating-side to the single generator two-stage absorption heat pump in which the absorption-evaporator provides refrigerant vapor to absorber.

Figure 39:
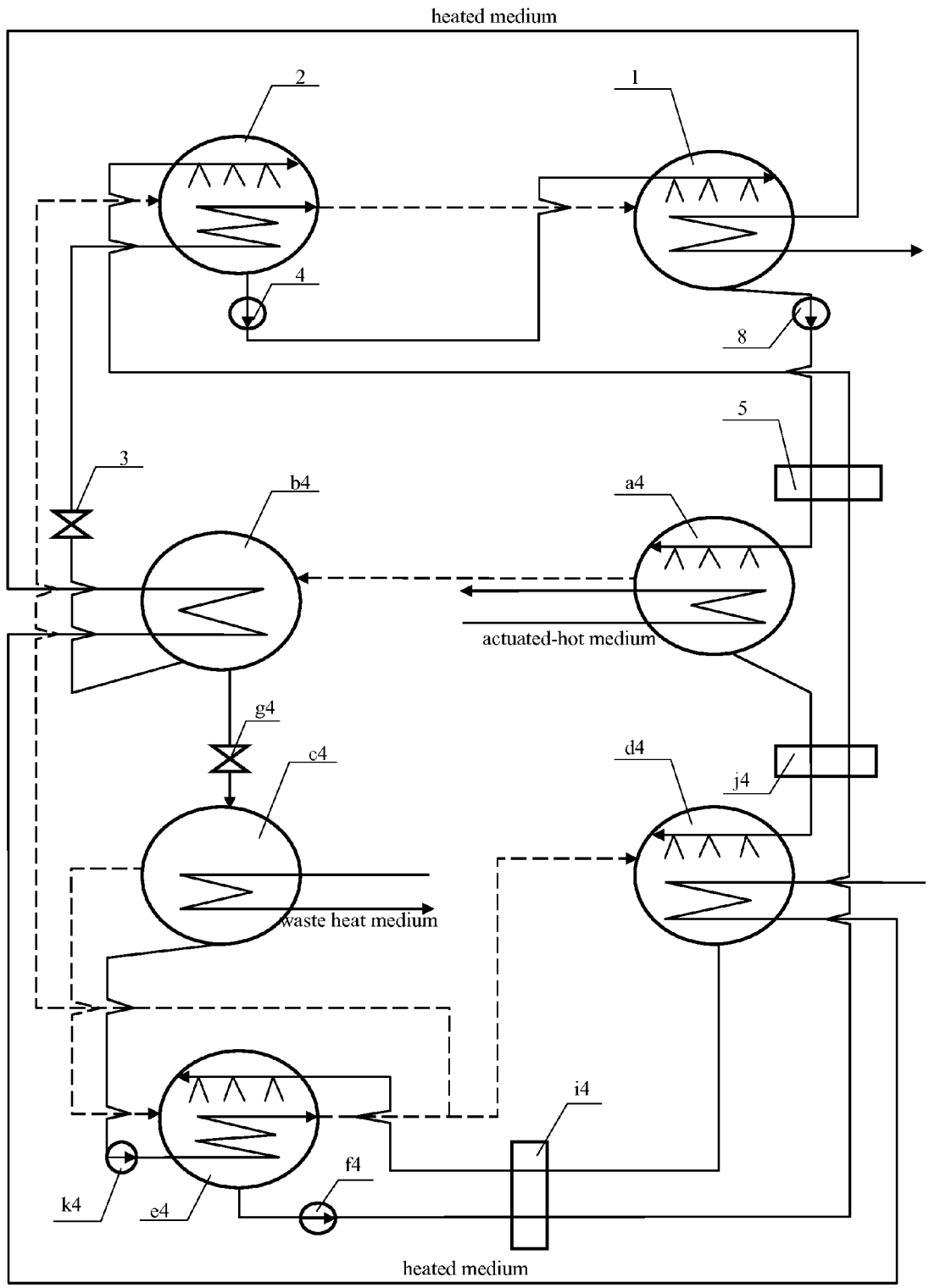

FIG. 39 provides the sixth construction and flow diagram of absorption heat pump with three-terminal heating that consists of adding an adjacent high-temperature heating-side to the single generator two-stage absorption heat pump in which the absorption-evaporator provides refrigerant vapor to absorber.

Figure 40:
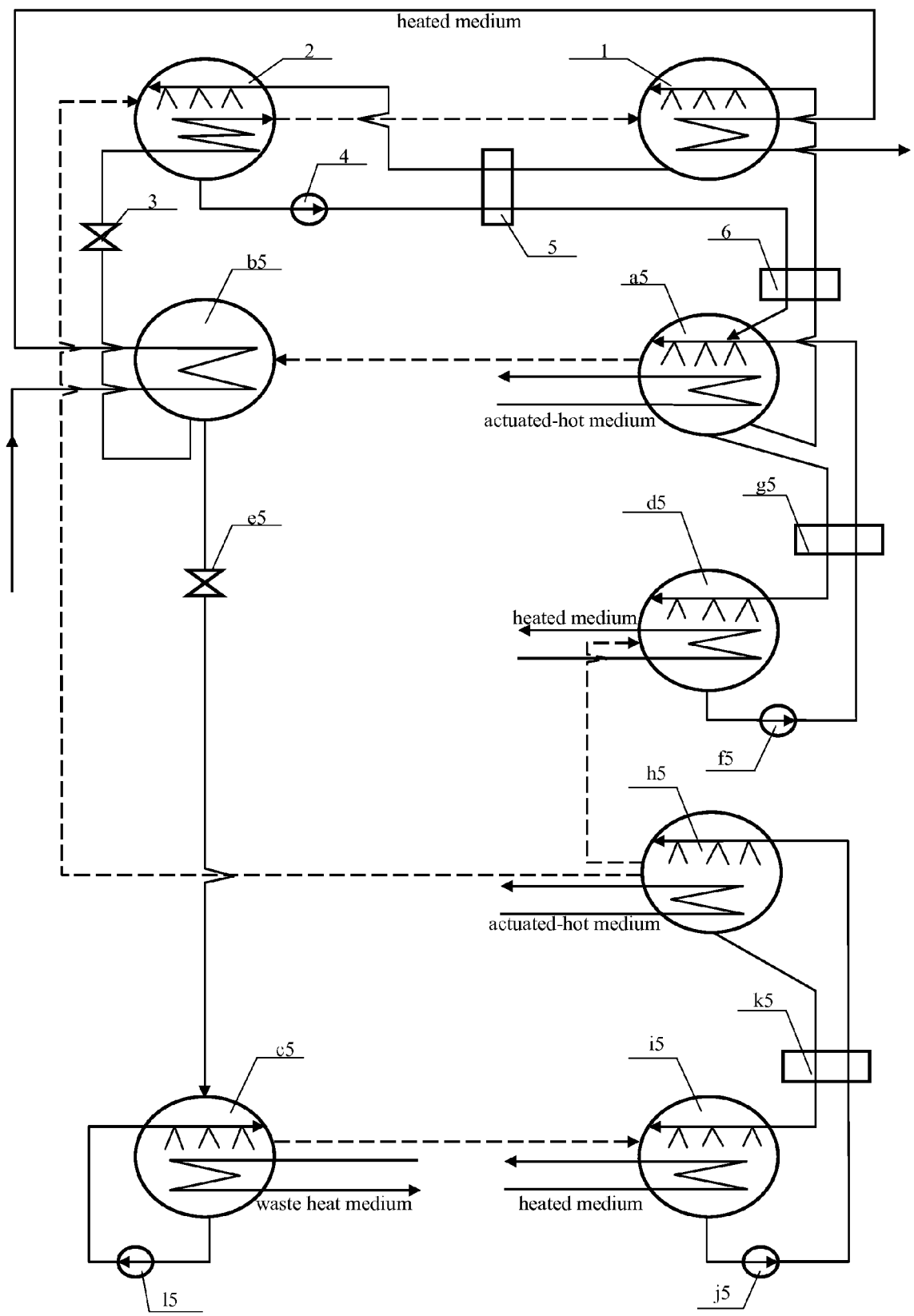

FIG. 40 provides the first construction and flow diagram of absorption heat pump with four-terminal heating that consists of adding an adjacent high-temperature heating-side to the double generator two-stage absorption heat pump in which the low pressure generator provides refrigerant vapor to the high pressure absorber.

Figure 41:
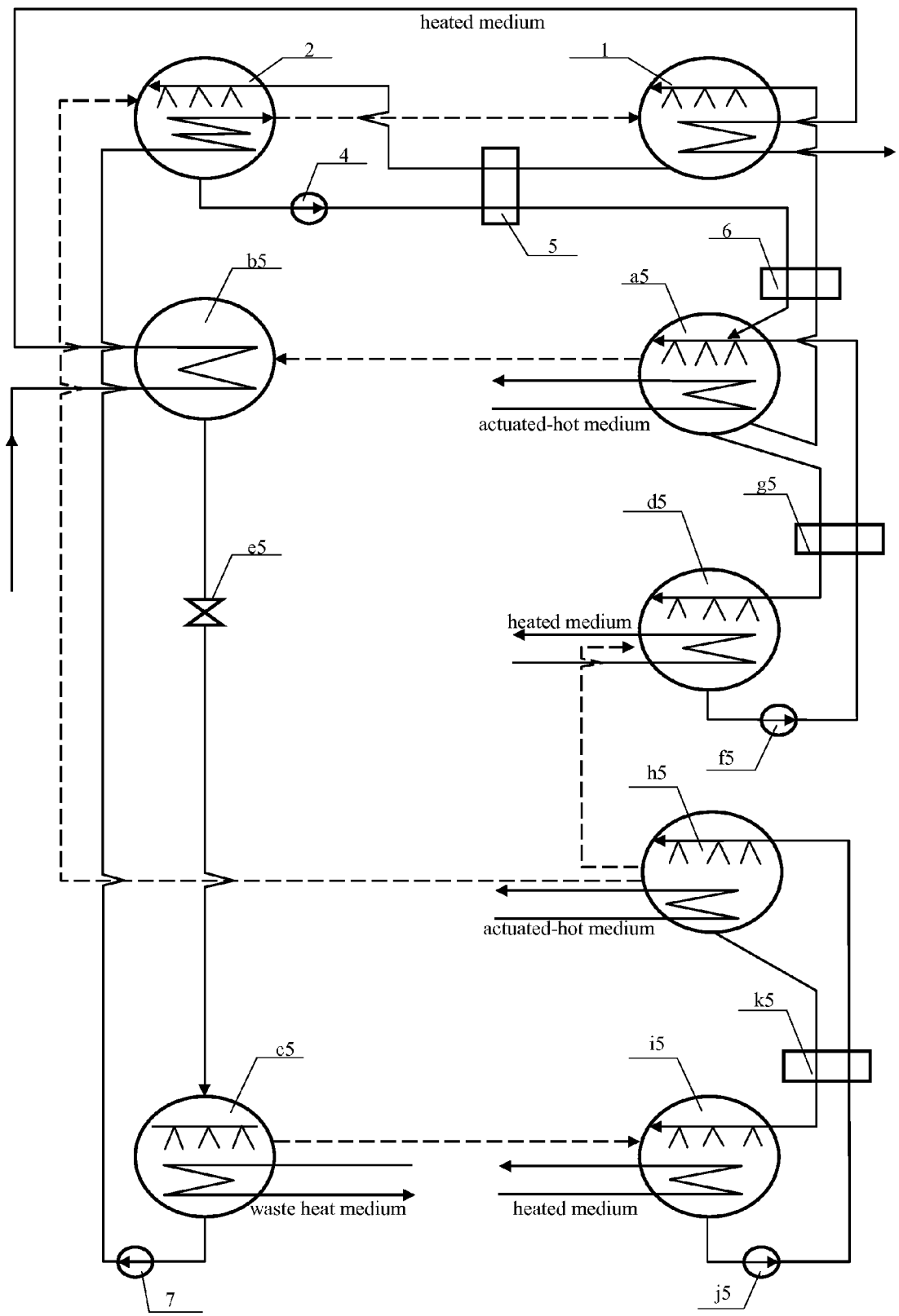

FIG. 41 provides the second construction and flow diagram of absorption heat pump with four-terminal heating that consists of adding an adjacent high-temperature heating-side to the double generator two-stage absorption heat pump in which the low pressure generator provides refrigerant vapor to the high pressure absorber.

Figure 42:
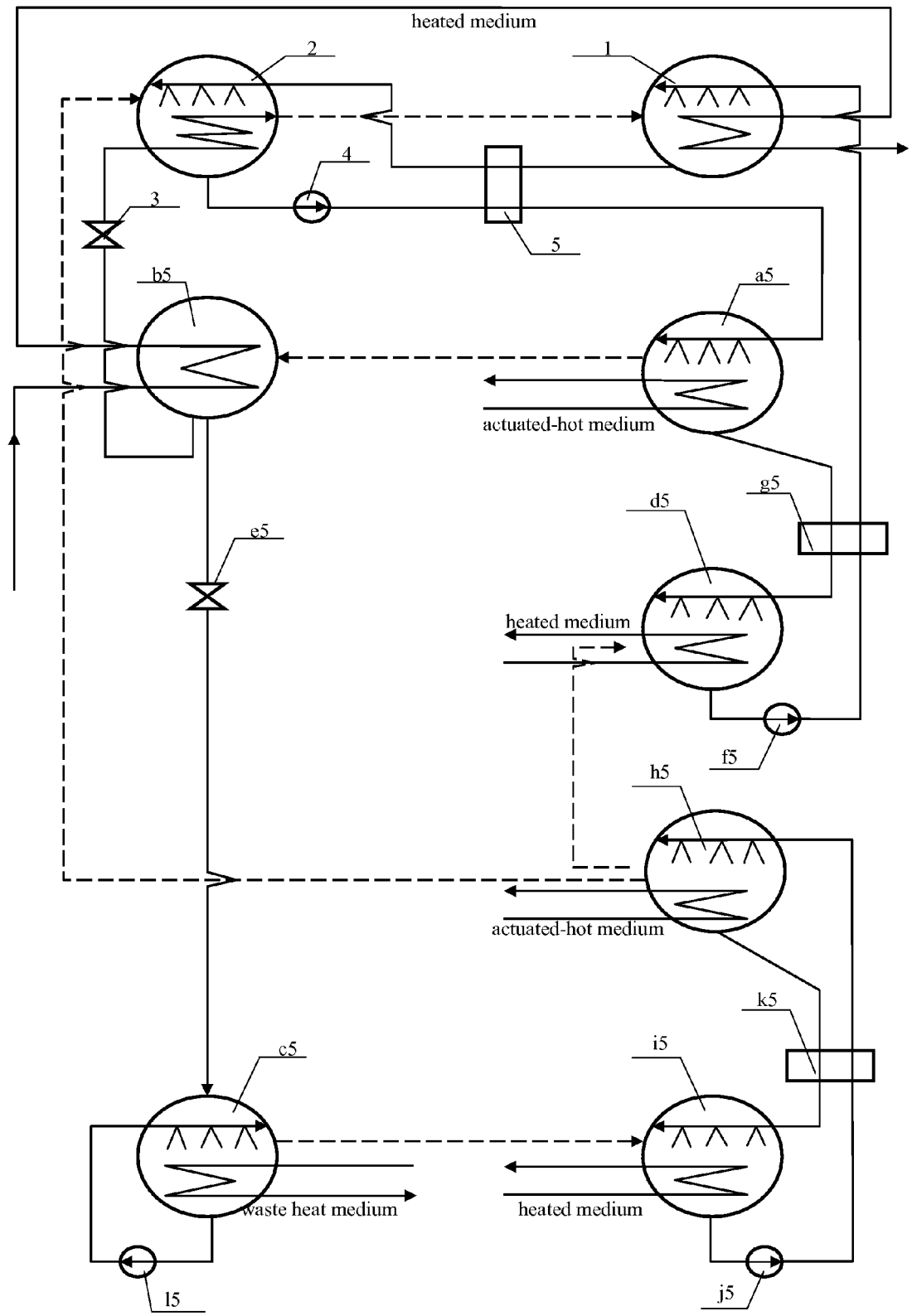

FIG. 42 provides the third construction and flow diagram of absorption heat pump with four-terminal heating that consists of adding an adjacent high-temperature heating-side to the double generator two-stage absorption heat pump in which the low pressure generator provides refrigerant vapor to the high pressure absorber.

Figure 43:
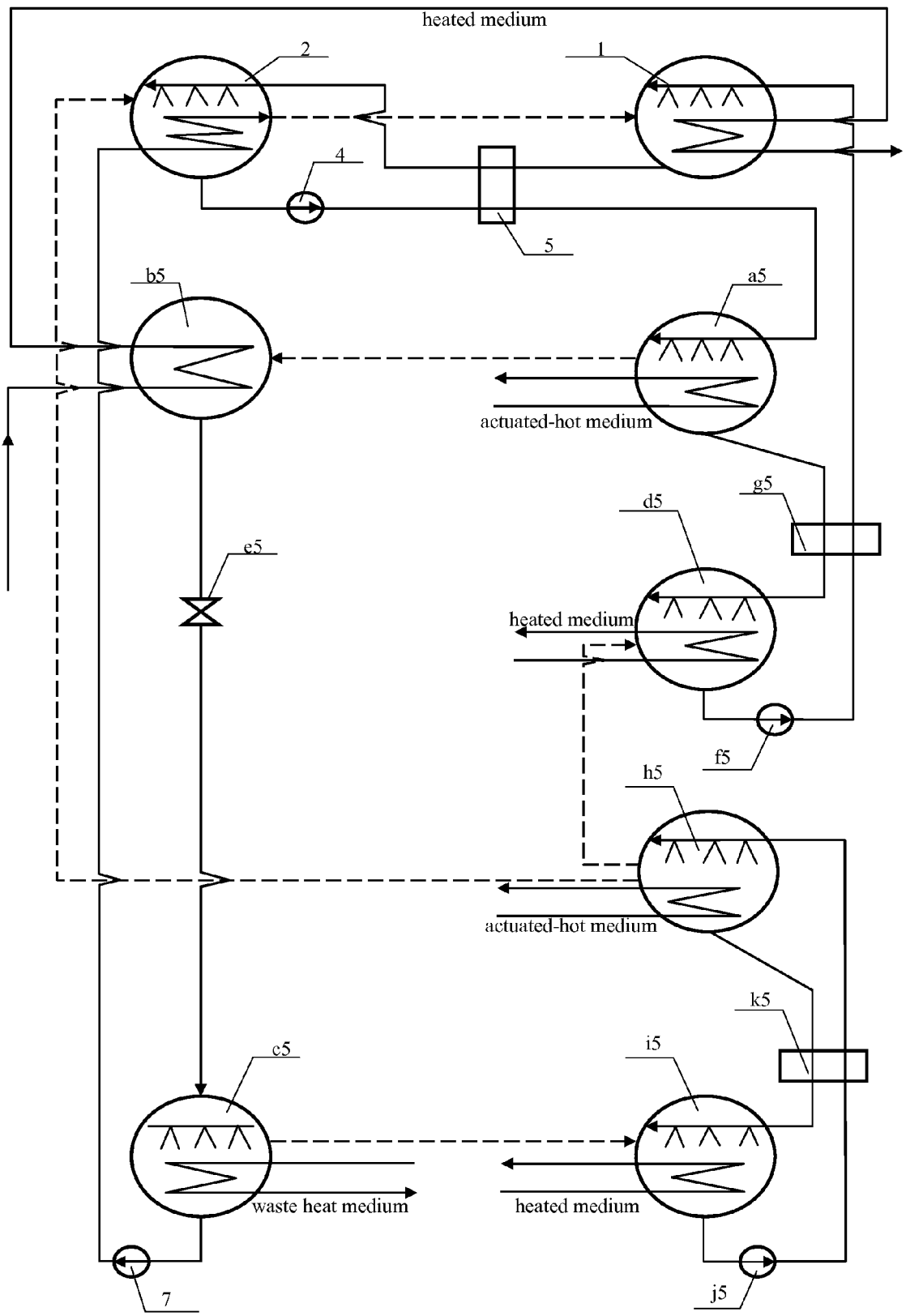

FIG. 43 provides the fourth construction and flow diagram of absorption heat pump with four-terminal heating that consists of adding an adjacent high-temperature heating-side to the double generator two-stage absorption heat pump in which the low pressure generator provides refrigerant vapor to the high pressure absorber.

Figure 44:
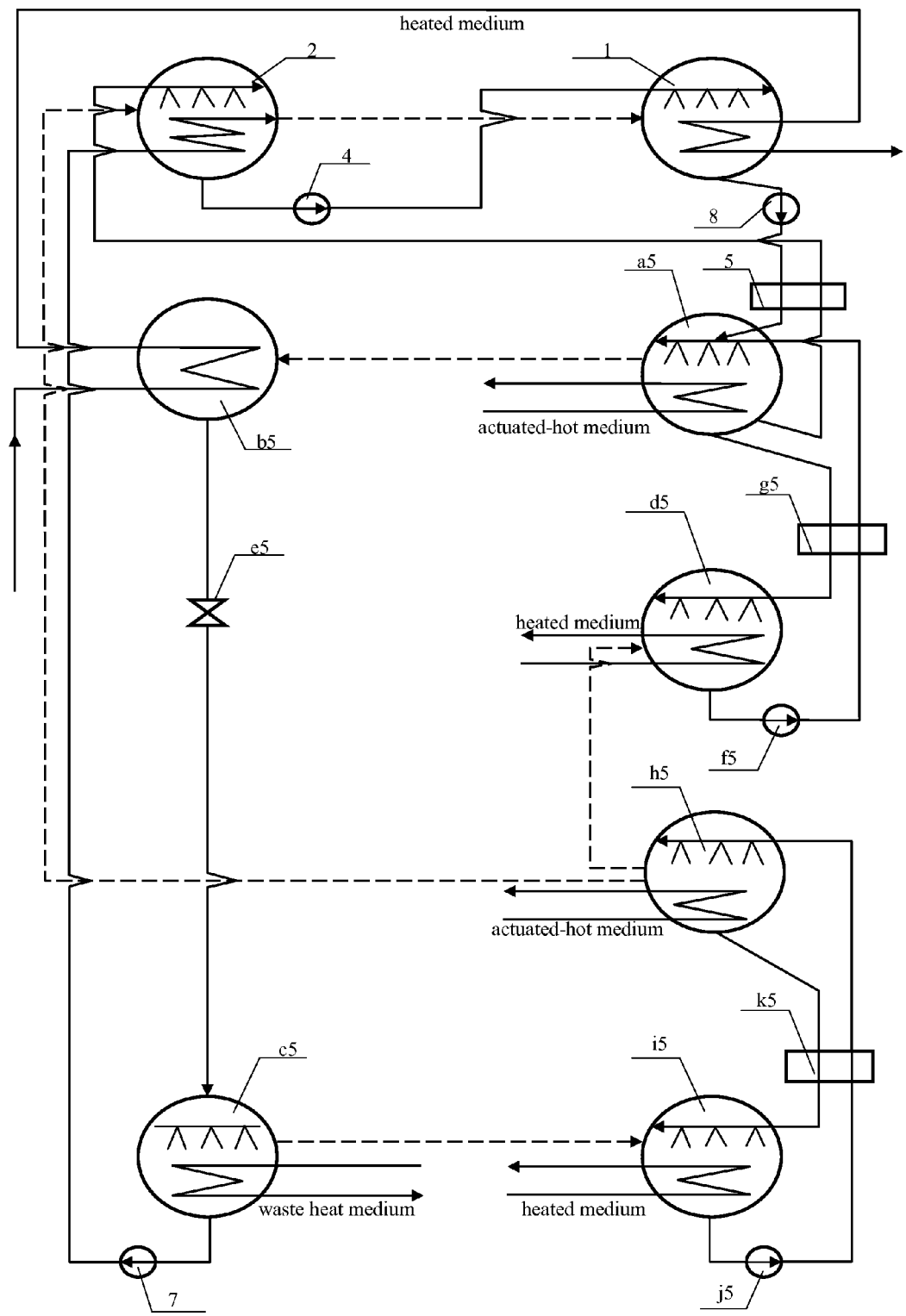

FIG. 44 provides the fifth construction and flow diagram of absorption heat pump with four-terminal heating that consists of adding an adjacent high-temperature heating-side to the double generator two-stage absorption heat pump in which the low pressure generator provides refrigerant vapor to the high pressure absorber.

Figure 45:
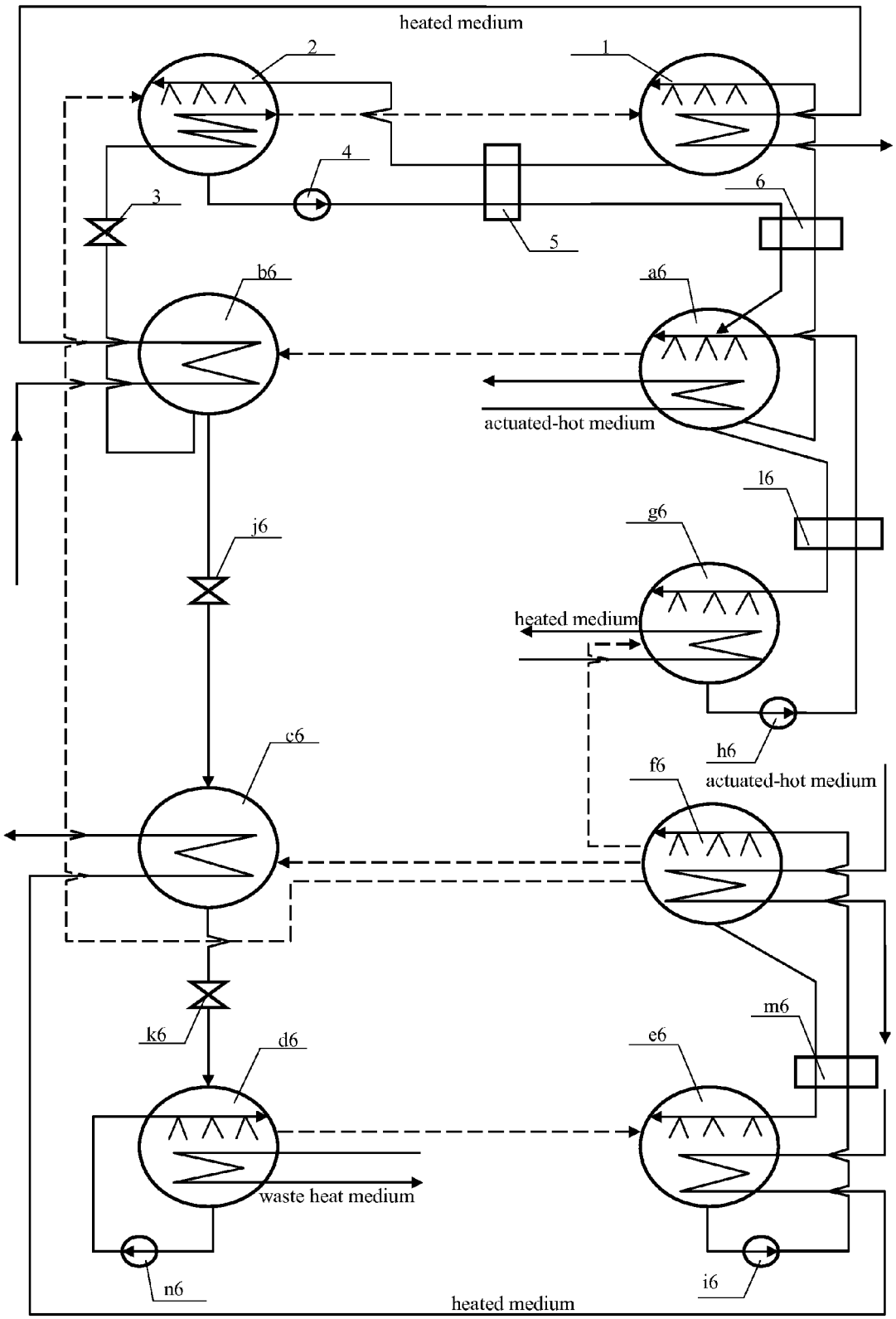

FIG. 45 provides the first construction and flow diagram of absorption heat pump with five-terminal heating that consists of adding an adjacent high-temperature heating-side to the double generator two-stage absorption heat pump in which the low pressure generator provides refrigerant vapor to the low pressure condenser and the high pressure absorber at the same time.

Figure 46:
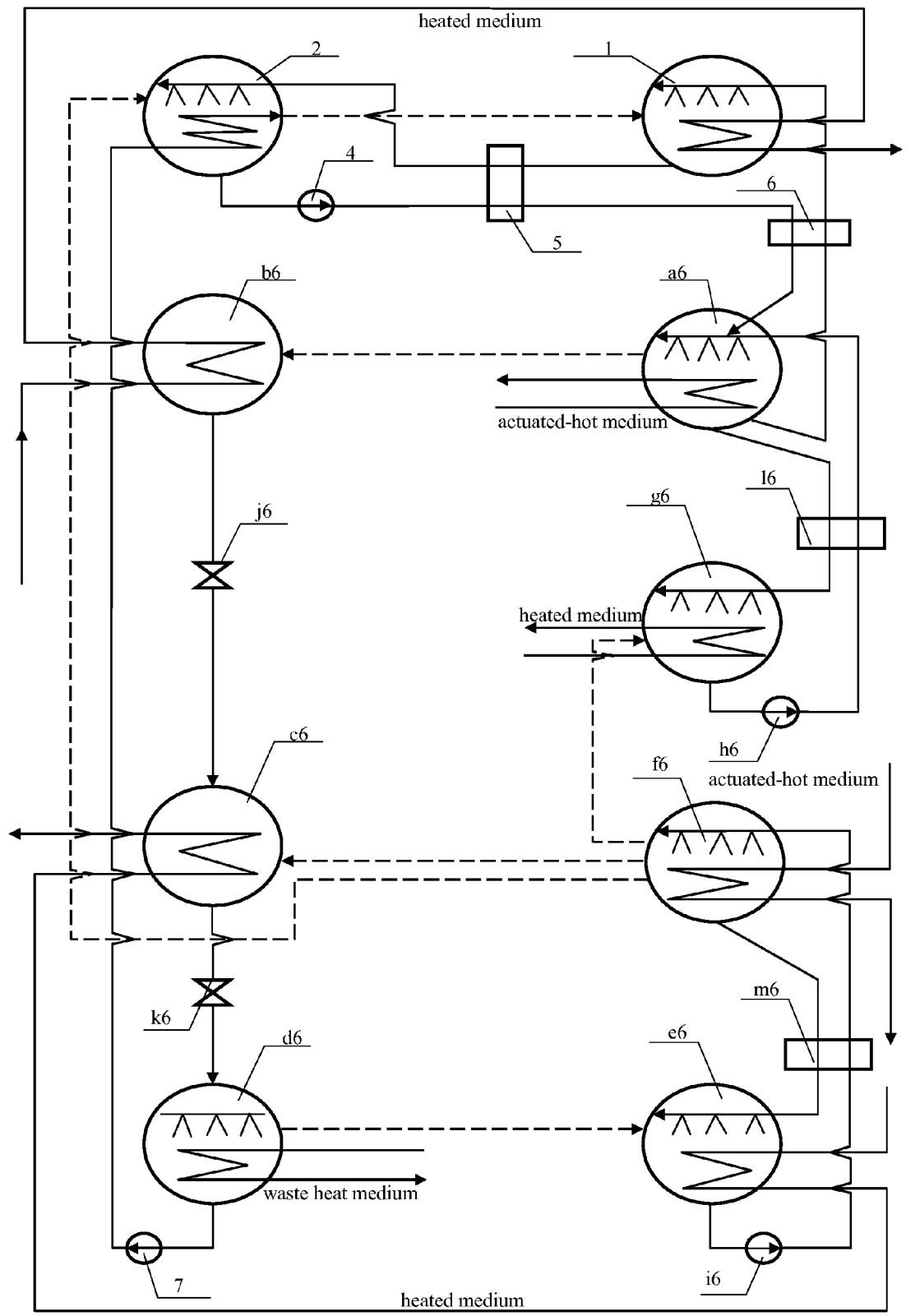

FIG. 46 provides the second construction and flow diagram of absorption heat pump with five-terminal heating that consists of adding an adjacent high-temperature heating-side to the double generator two-stage absorption heat pump in which the low pressure generator provides refrigerant vapor to the low pressure condenser and the high pressure absorber at the same time.

Figure 47:
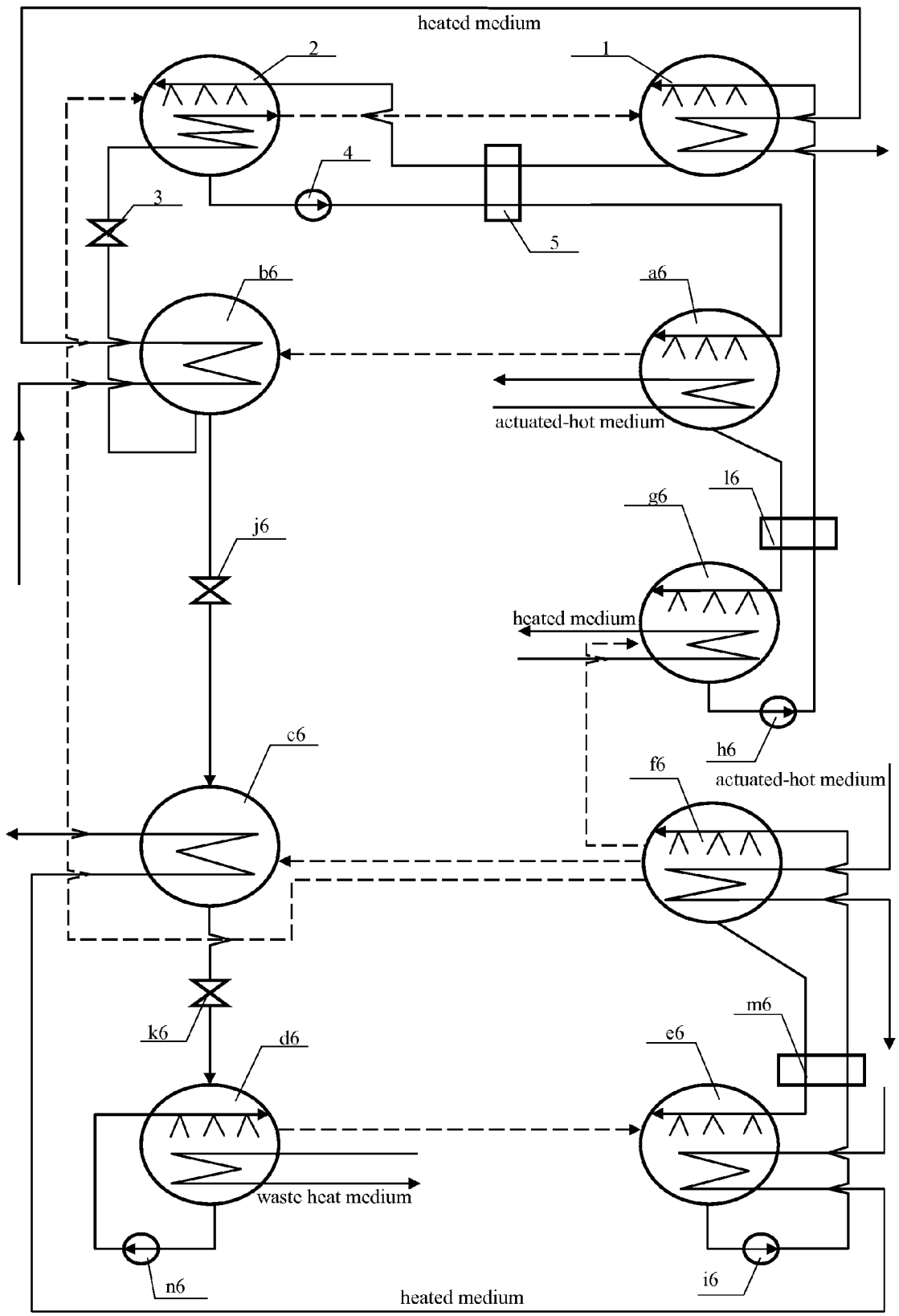

FIG. 47 provides the third construction and flow diagram of absorption heat pump with five-terminal heating that consists of adding an adjacent high-temperature heating-side to the double generator two-stage absorption heat pump in which the low pressure generator provides refrigerant vapor to the low pressure condenser and the high pressure absorber at the same time.

Figure 48:
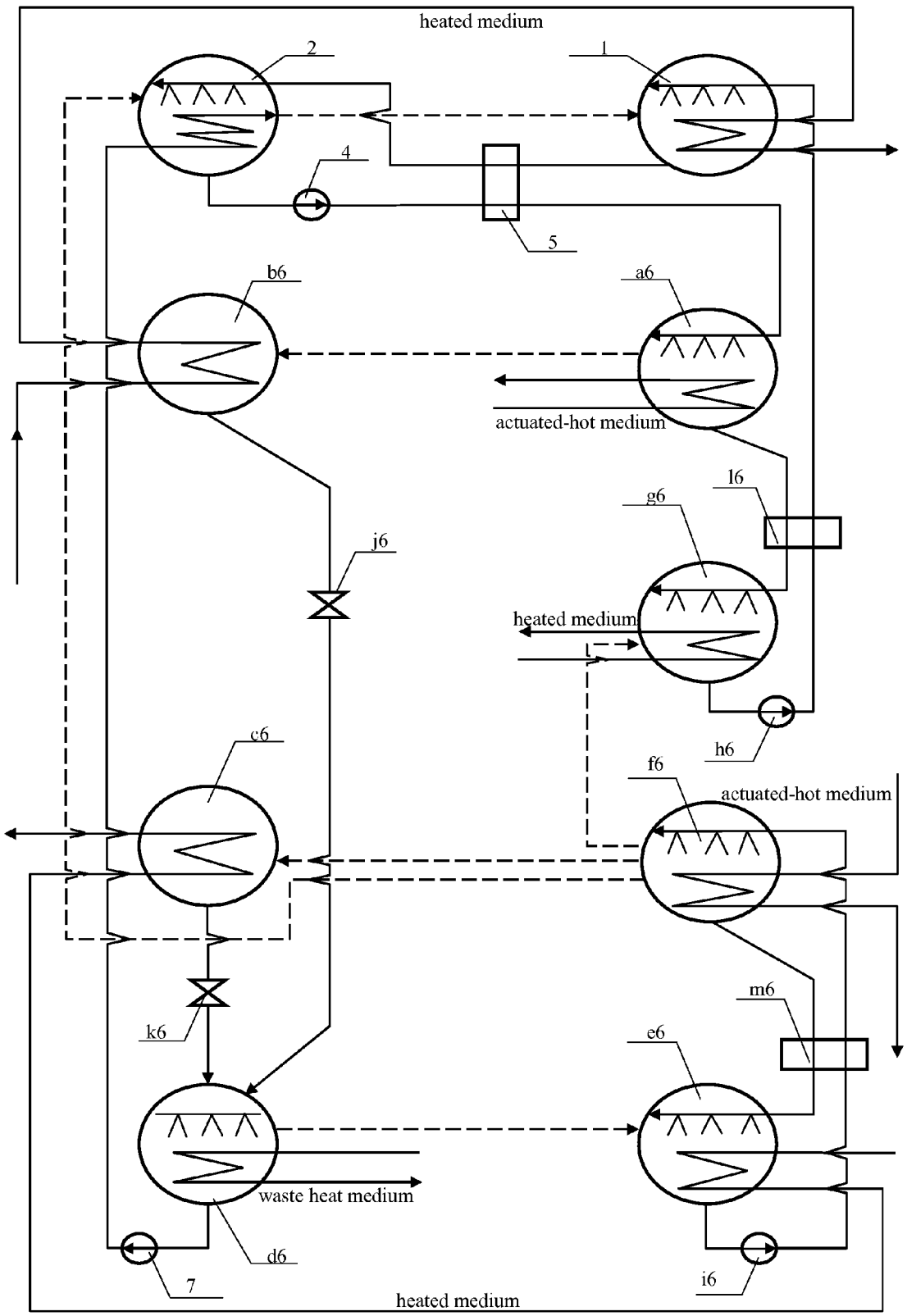

FIG. 48 provides the four construction and flow diagram of absorption heat pump with five-terminal heating that consists of adding a adjacent high-temperature heating-side to the double generator two-stage absorption heat pump in which the low pressure generator provides refrigerant vapor to the low pressure condenser and the high pressure absorber at the same time.

Figure 49:
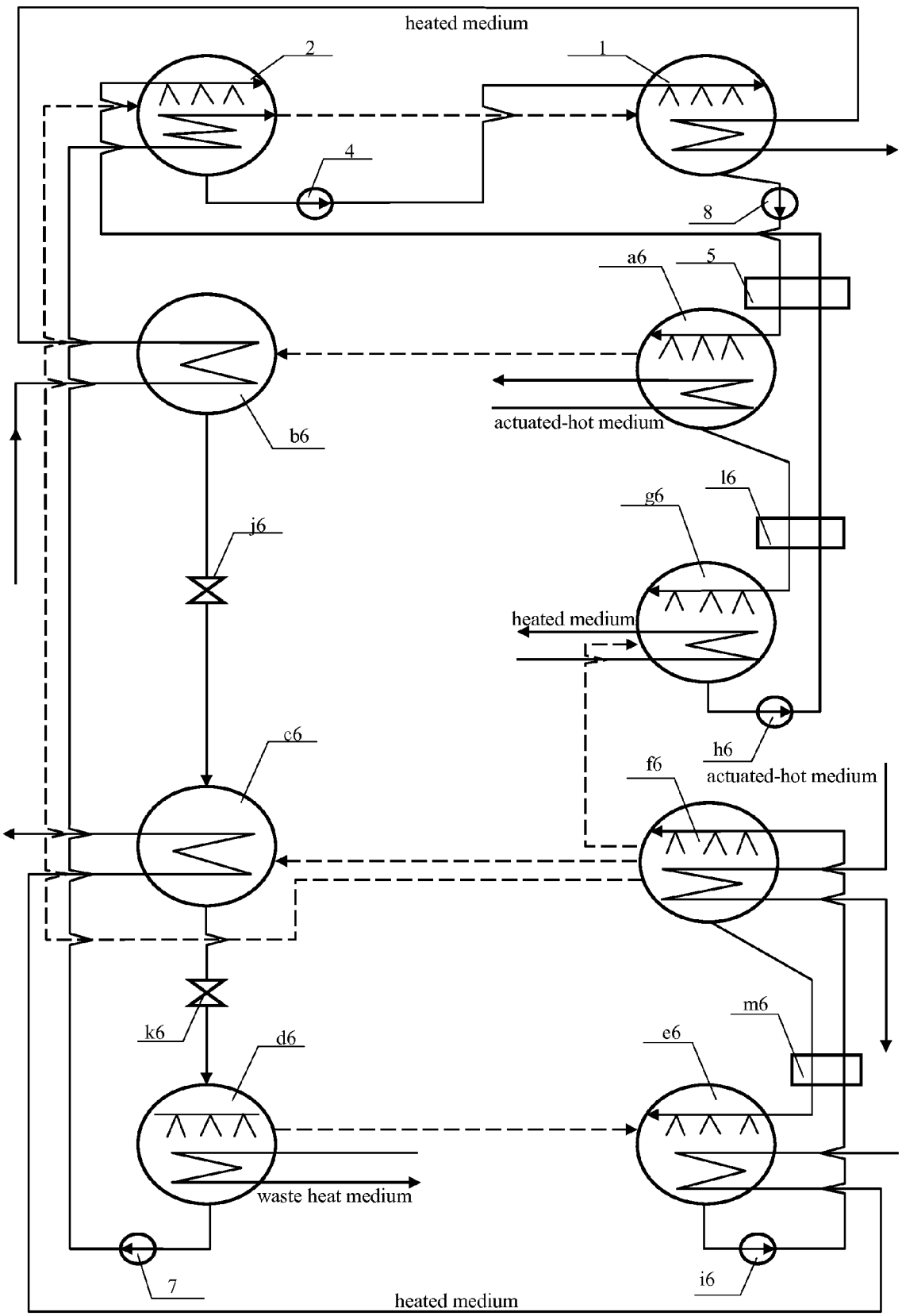

FIG. 49 provides the fifth construction and flow diagram of absorption heat pump with five-terminal heating that consists of adding an adjacent high-temperature heating-side to the double generator two-stage absorption heat pump in which the low pressure generator provides refrigerant vapor to the low pressure condenser and the high pressure absorber at the same time.

Figure 50:
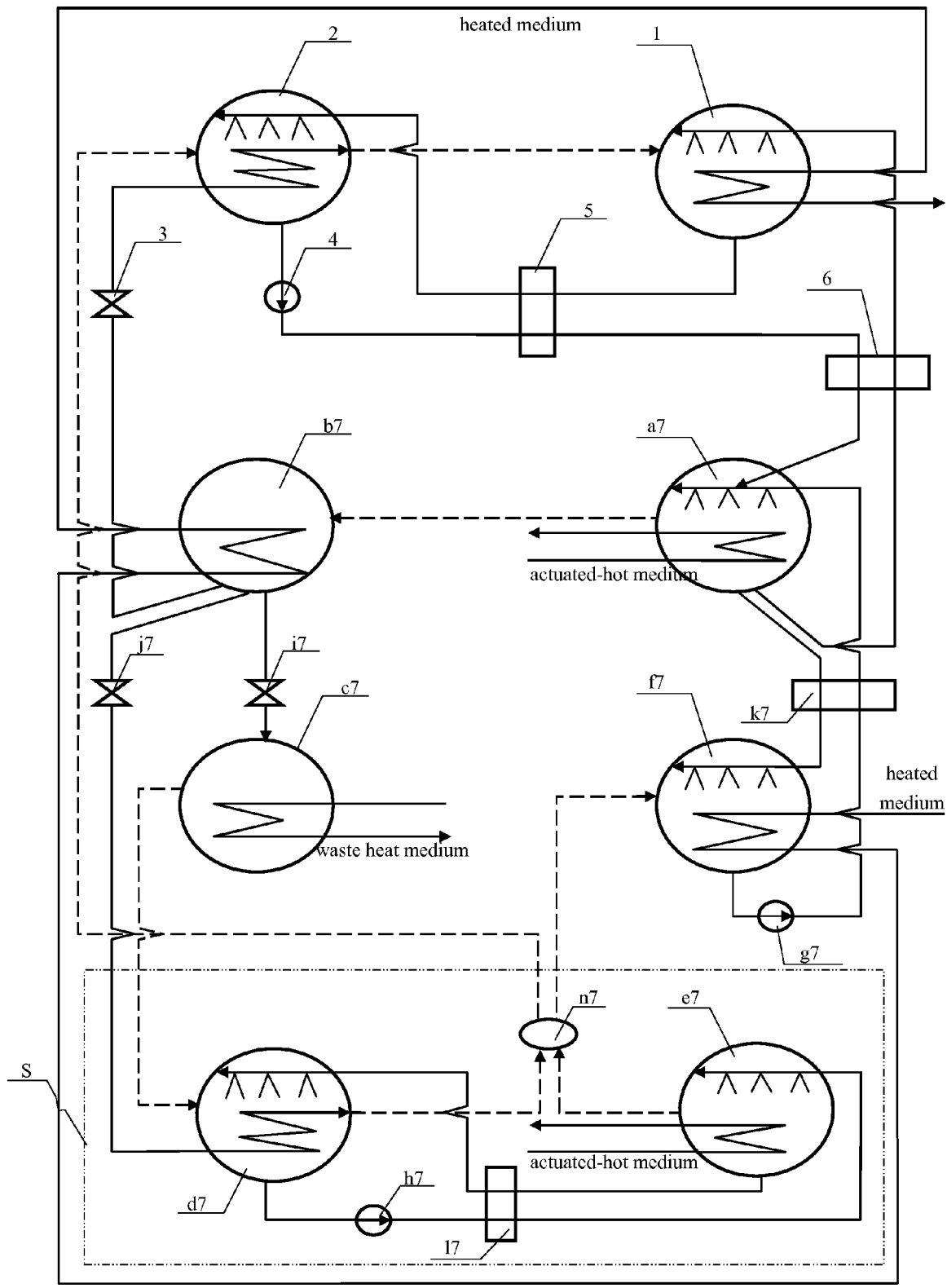

FIG. 50 provides the first construction and flow diagram of absorption heat pump with three-terminal heating that consists of adding an adjacent high-temperature heating-side to the double generator two-stage absorption heat pump in which the low pressure generator and the absorption-evaporator provides refrigerant vapor to the absorber at the same time.

Figure 51:
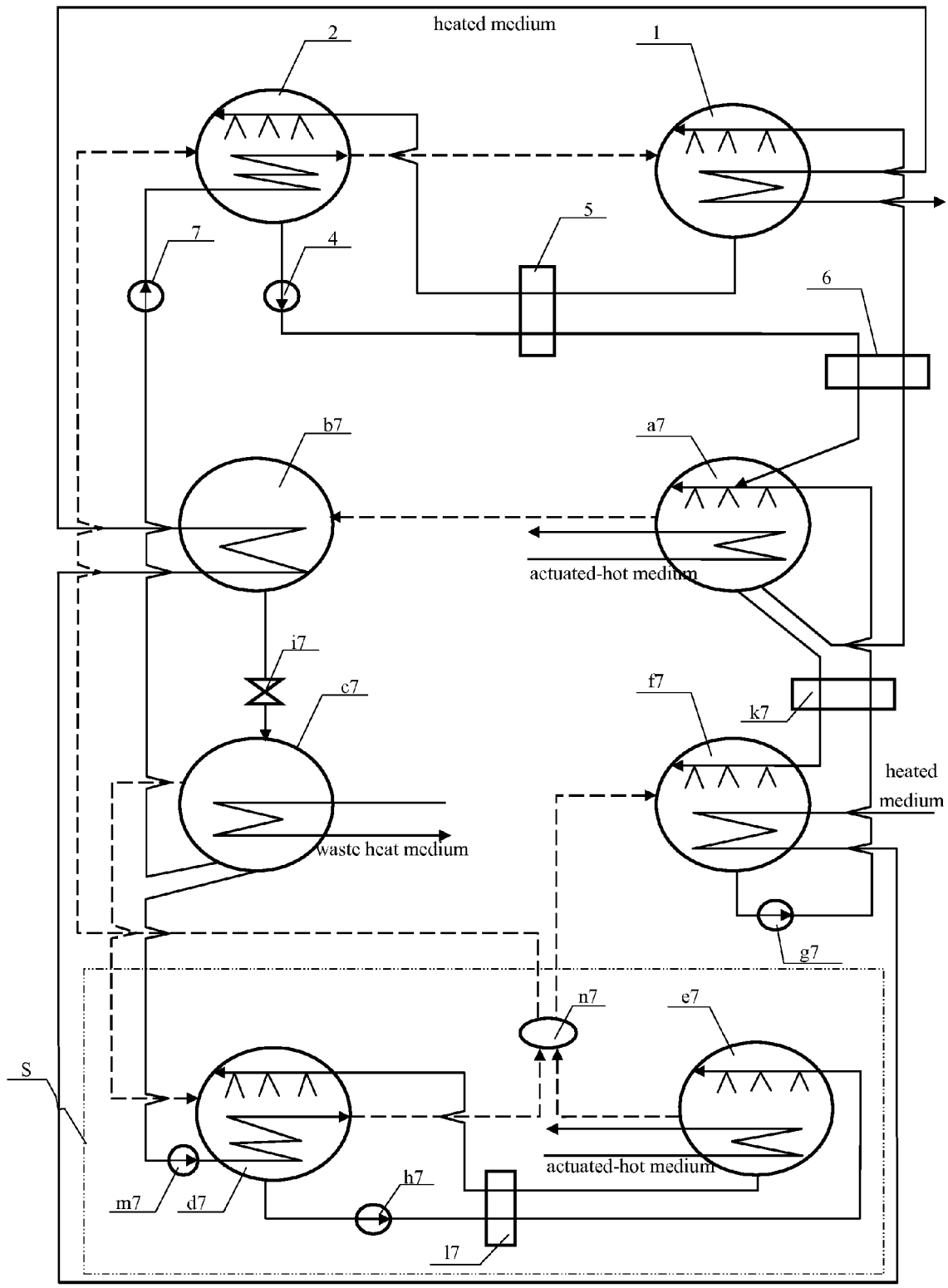

FIG. 51 provides the second construction and flow diagram of absorption heat pump with three-terminal heating that consists of adding an adjacent high-temperature heating-side to the double generator two-stage absorption heat pump in which the low pressure generator and the absorption-evaporator provides refrigerant vapor to the absorber at the same time.

Figure 52:
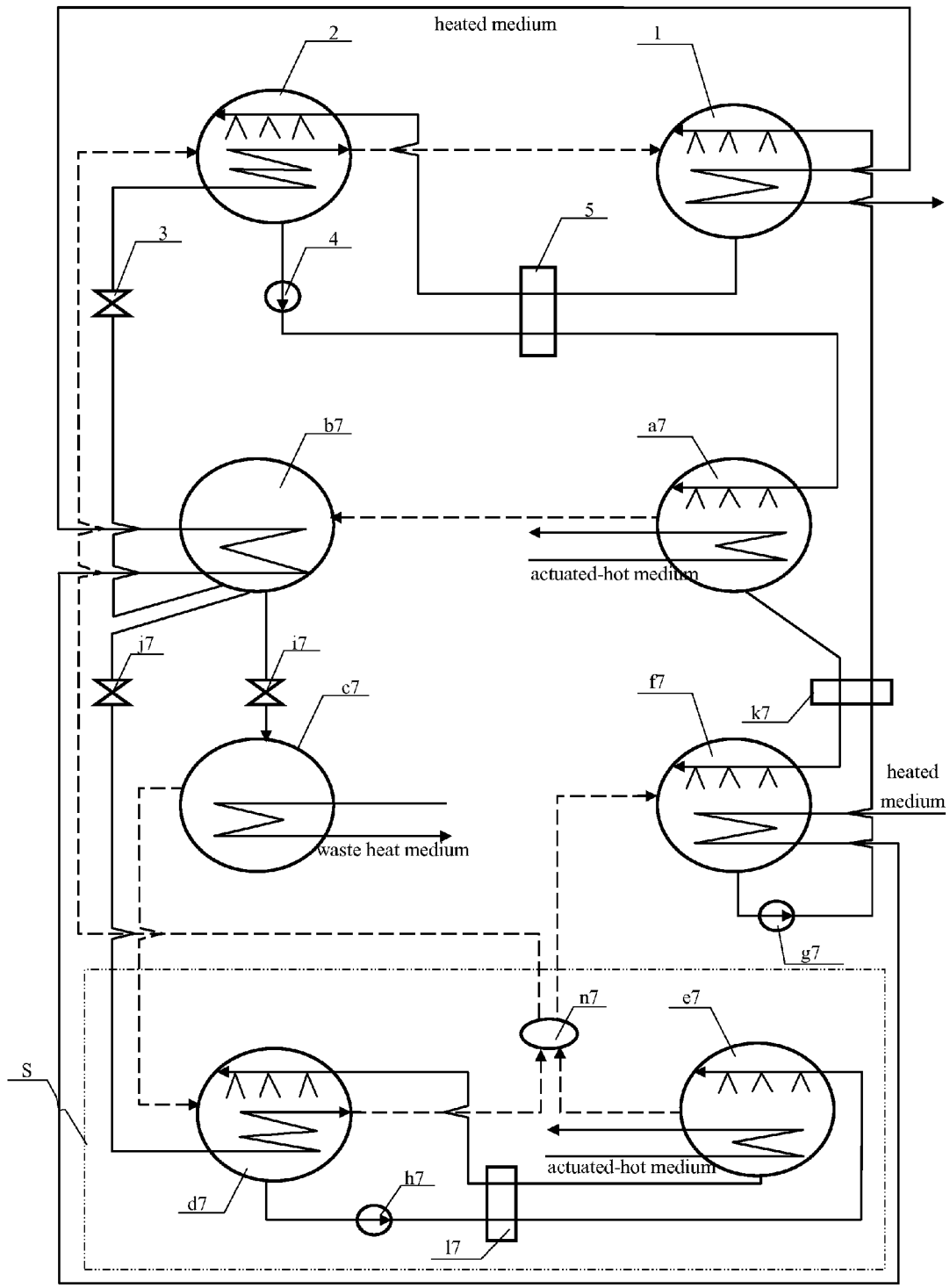

FIG. 52 provides the third construction and flow diagram of absorption heat pump with three-terminal heating that consists of adding an adjacent high-temperature heating-side to the double generator two-stage absorption heat pump in which the low pressure generator and the absorption-evaporator provides refrigerant vapor to the absorber at the same time.

Figure 53:
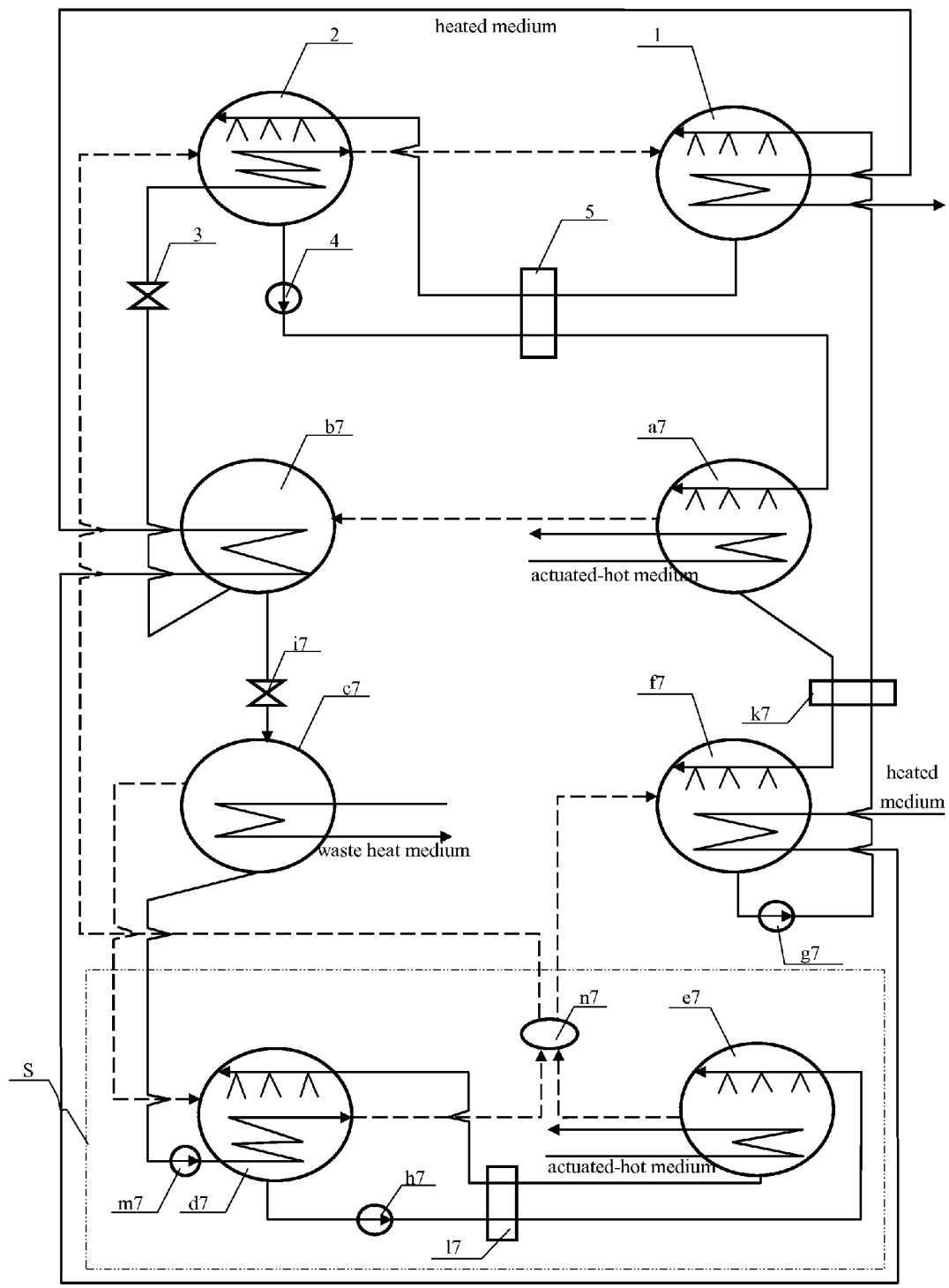

FIG. 53 provides the fourth construction and flow diagram of absorption heat pump with three-terminal heating that consists of adding an adjacent high-temperature heating-side to the double generator two-stage absorption heat pump in which the low pressure generator and the absorption-evaporator provides refrigerant vapor to the absorber at the same time.

Figure 54:
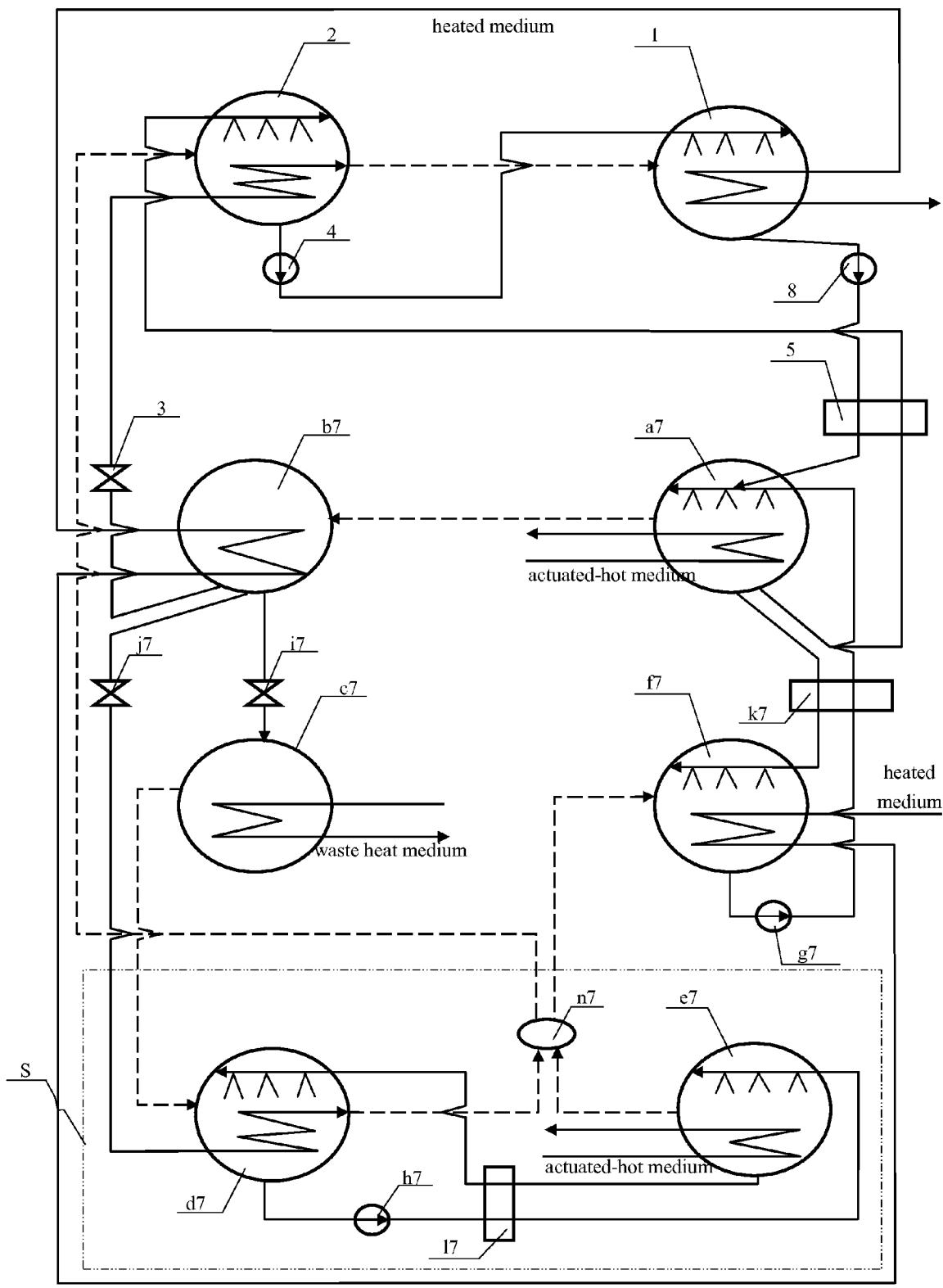

FIG. 54 provides the fifth construction and flow diagram of absorption heat pump with three-terminal heating that consists of adding an adjacent high-temperature heating-side to the double generator two-stage absorption heat pump in which the low pressure generator and the absorption-evaporator provides refrigerant vapor to the absorber at the same time.

Figure 55:
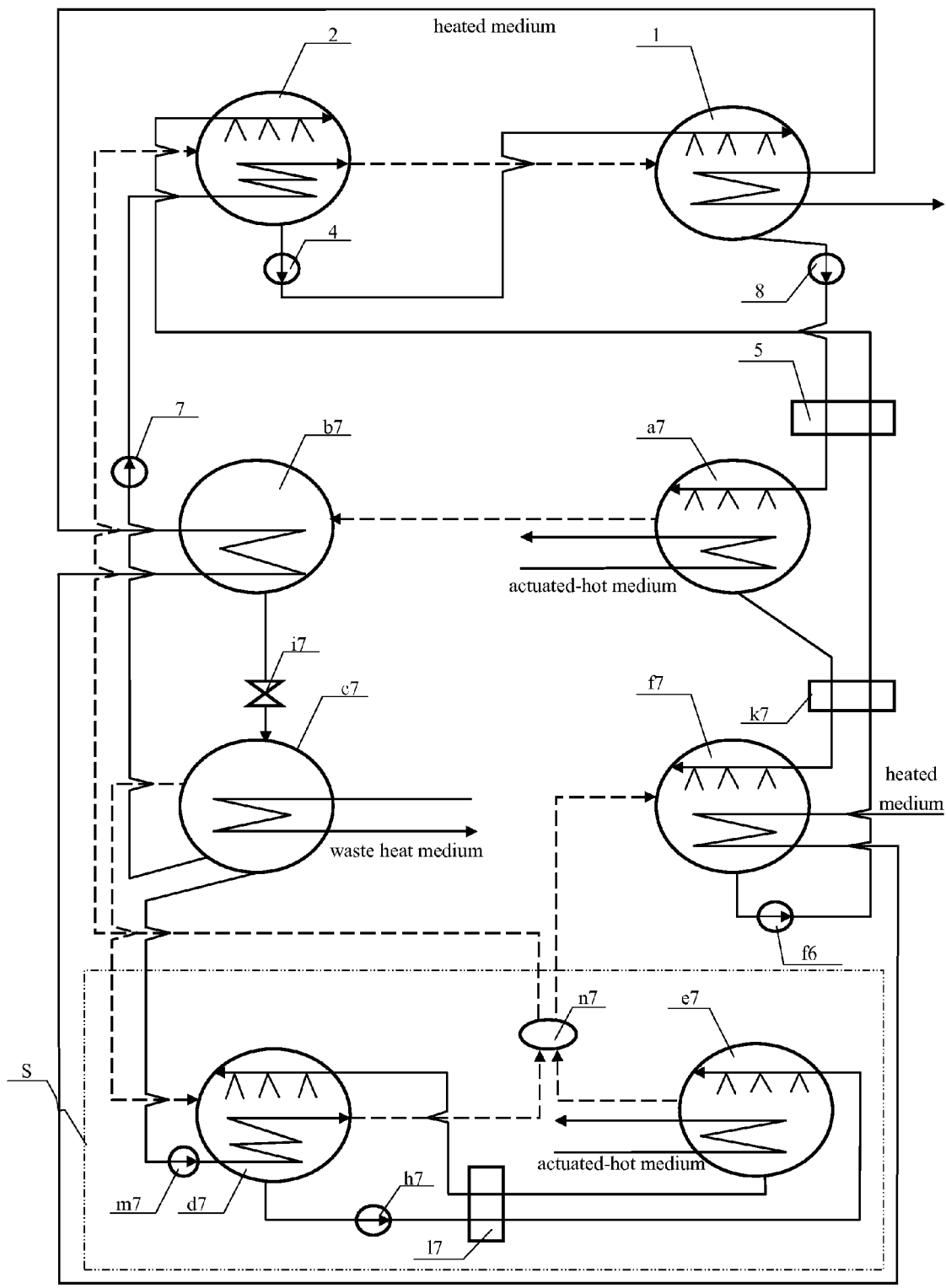

FIG. 55 provides the sixth construction and flow diagram of absorption heat pump with three-terminal heating that consists of adding an adjacent high-temperature heating-side to the double generator two-stage absorption heat pump in which the low pressure generator and the absorption-evaporator provides refrigerant vapor to the absorber at the same time.

Figure 56:
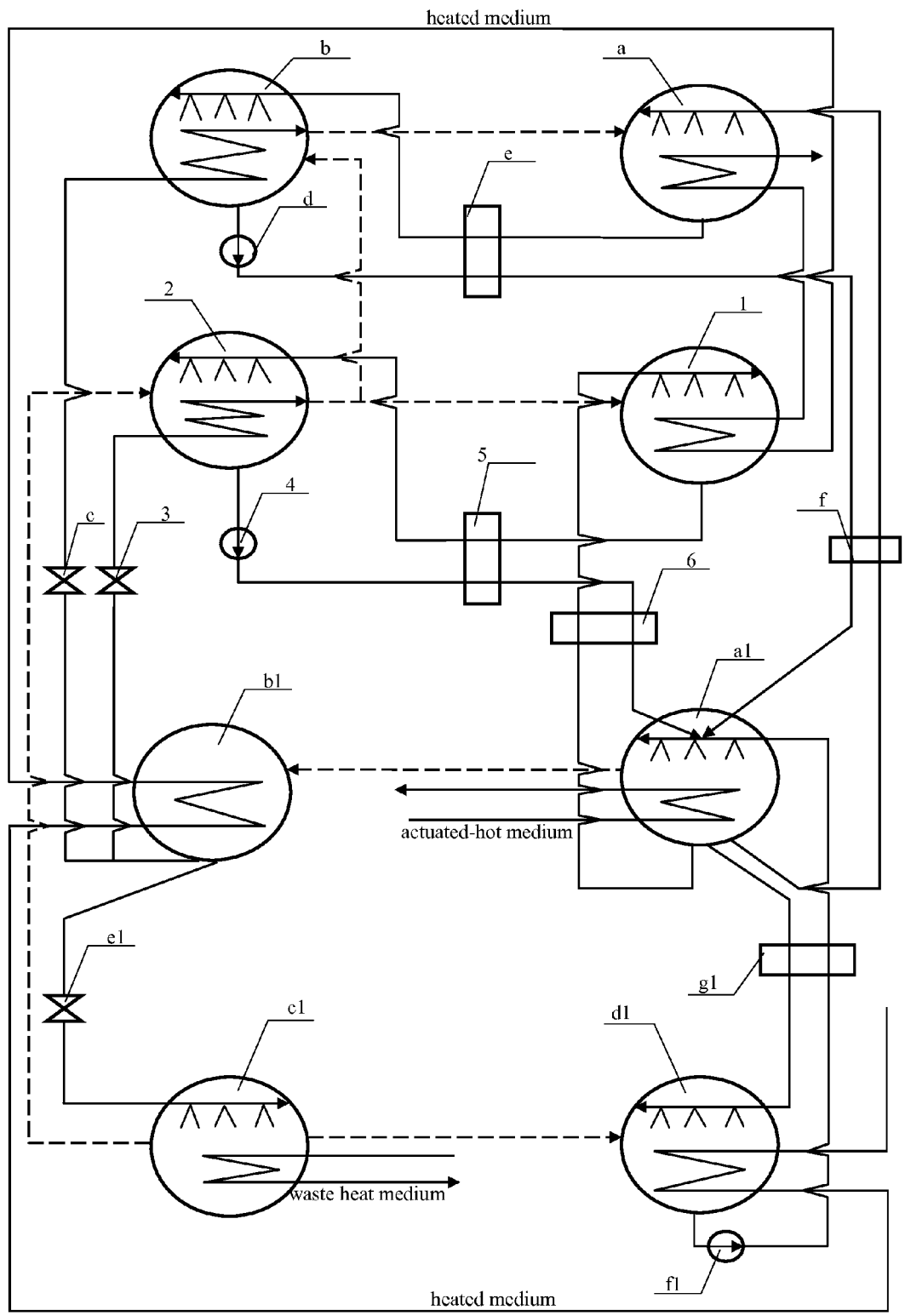

FIG. 56 provides the first construction and flow diagram of absorption heat pump with four-terminal heating that consists of adding two high-temperature heating-sides to single-stage single-effect absorption heat pump.

Figure 57:
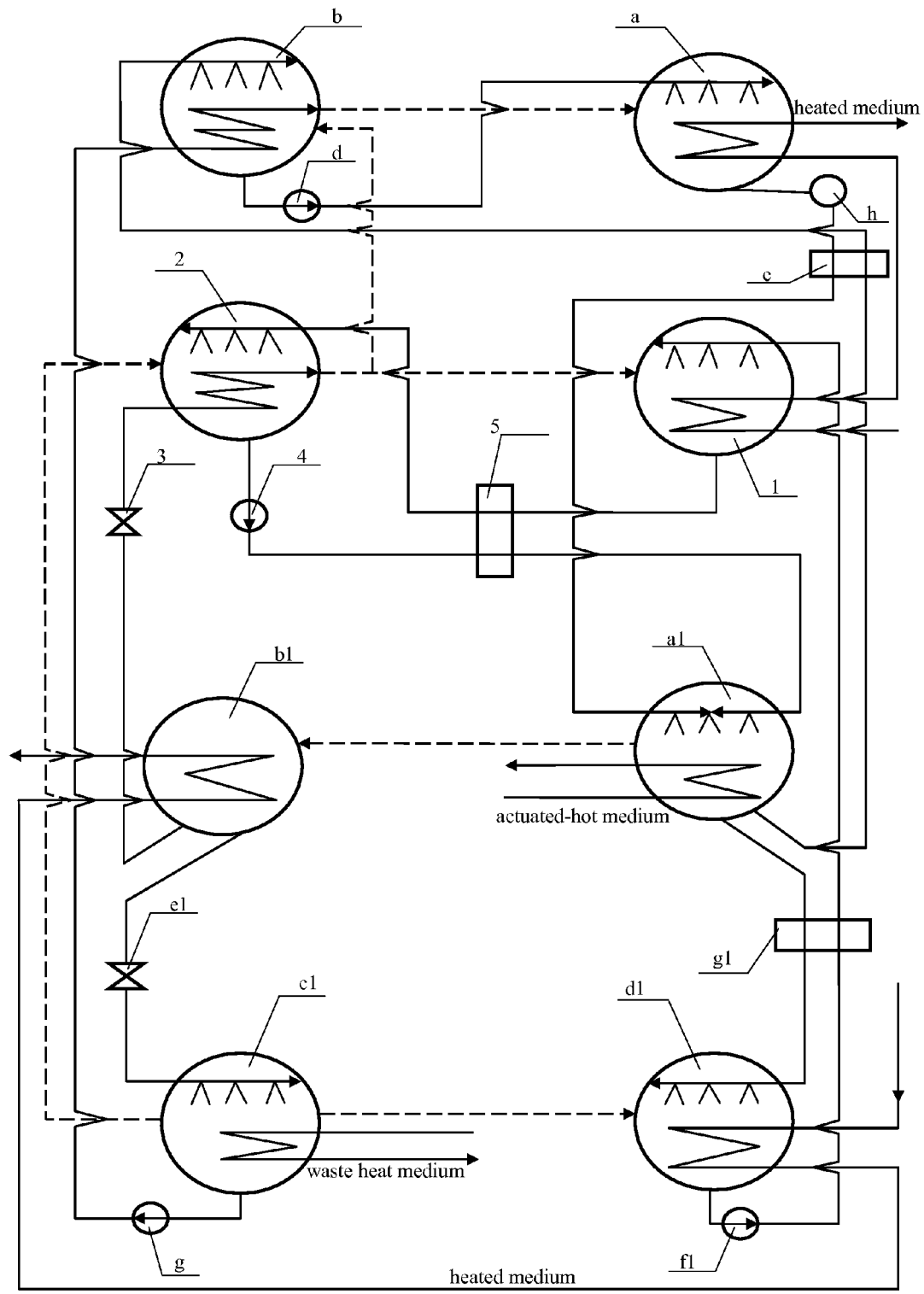

FIG. 57 provides the second construction and flow diagram of absorption heat pump with four-terminal heating that consists of adding two high-temperature heating-sides to single-stage single-effect absorption heat pump.

Figure 58:
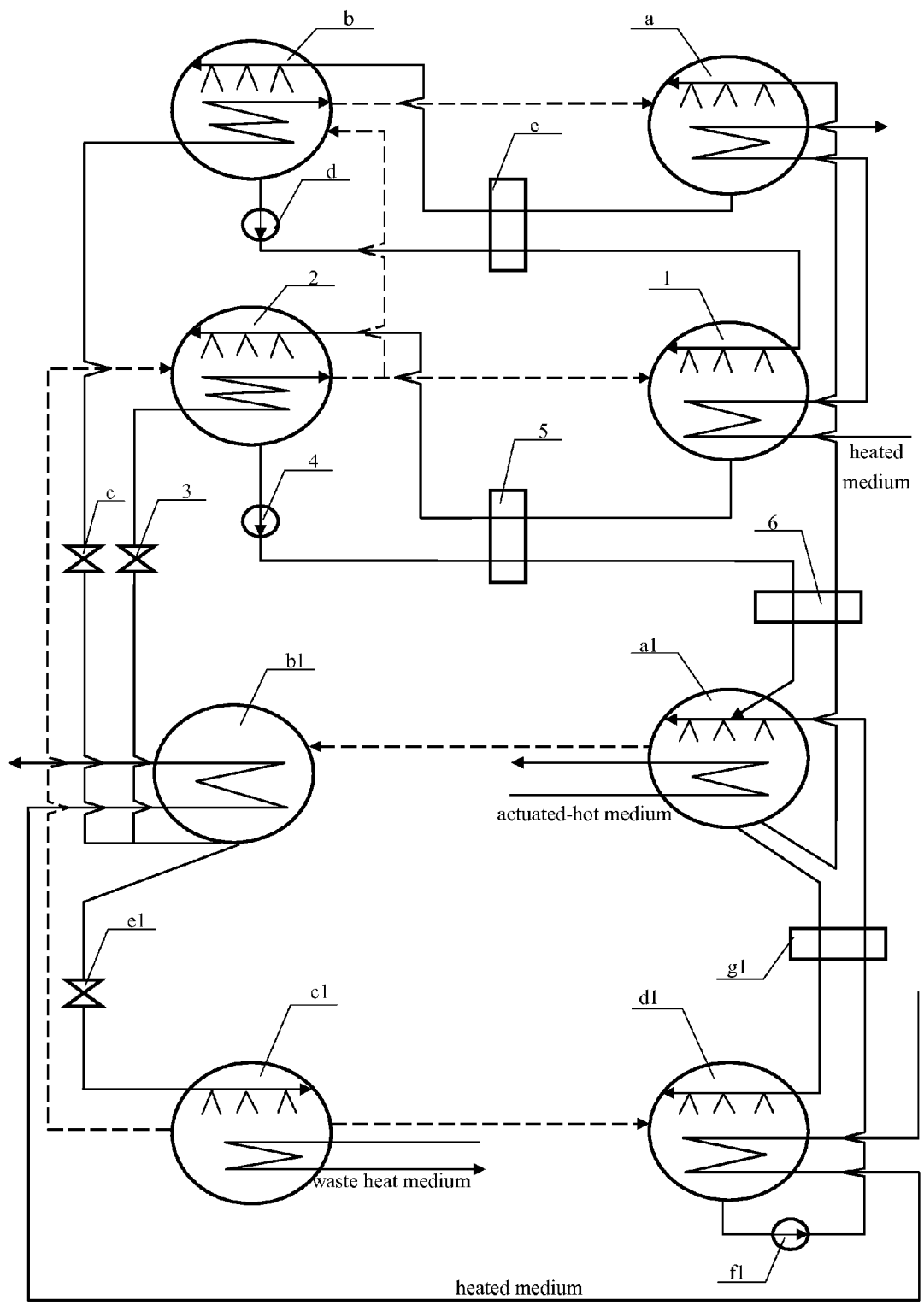

FIG. 58 provides the third construction and flow diagram of absorption heat pump with four-terminal heating that consists of adding two high-temperature heating-sides to single-stage single-effect absorption heat pump.

Figure 59:
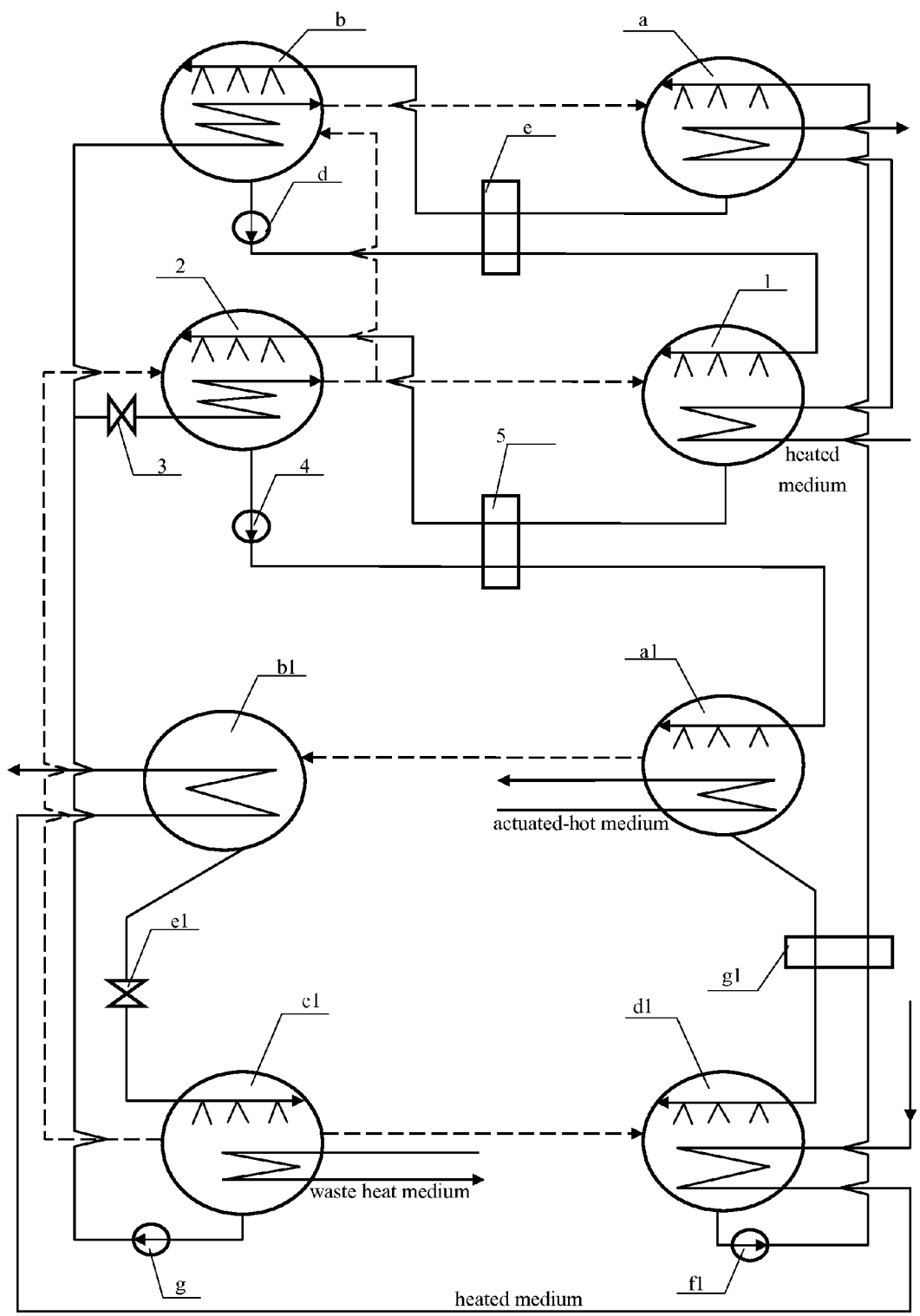

FIG. 59 provides the fourth construction and flow diagram of absorption heat pump with four-terminal heating that consists of adding two high-temperature heating-sides to single-stage single-effect absorption heat pump.

Particularly, FIG. 56-FIG. 59 is the delegate of multiterminal heating absorption heat pump which consists of adding two high-temperature heating-sides to single-stage single-effect absorption heat pump. At the same time, they are the delegate of adding two high-temperature heating-sides to form multiterminal heating based on the existing absorption heat pump according to method of the invention.

In the figure, 1—the new absorber, 2—the new absorption-evaporator, 3—the new throttle, 4—the new solution pump, 5—the new solution heat exchanger, 6—the second new solution heat exchanger, 7—the new refrigerant liquid pump, 8—the second new solution pump; a—the adding absorber, b—the adding absorption-evaporator, c—the adding throttle, d—the adding solution pump, e—the adding solution heat exchanger, f—the second adding solution heat exchanger, g—the adding refrigerant liquid pump.

In the FIG. 1-7, FIG. 56-59, a1—the generator, A1—the rectifying tower, b1—the condenser, c1—the evaporator, d1—the absorber, e1—the throttle, f1—the solution pump, g1—the solution heat exchanger.

In the FIG. 8-23, a2—the high pressure generator, b2—the low pressure generator, c2—the condenser, d2—the evaporator, e2—the absorber, f2—the throttle, g2—the second throttle, h2—the solution pump, i2—the second solution pump, j2—the solution heat exchanger, k2—the second solution heat exchanger, l2—the liquid refrigerant recirculation pump.

In the FIG. 24-33, a3—the high pressure generator, b3—the medium pressure generator, c3—the low pressure generator, d3—the condenser, e3—the evaporator, f3—the absorber, g3—the throttle, h3—the second throttle, i3—the third throttle, j3—the solution pump, k3—the second solution pump, i3—the third solution pump, m3—the solution heat exchanger, n3—the second solution heat exchanger, o3—the third solution heat exchanger, p3—the liquid refrigerant recirculation pump.

In the FIG. 34-39, a4—the generator, b4—the condenser, c4—the evaporator, d4—the absorber, e4—the absorption-evaporator, f4—the solution pump, g4—the throttle, h4—the second throttle, i4—the solution heat exchanger, j4—the second solution heat exchanger, k4—the liquid refrigerant pump.

In the FIG. 40-FIG. 44, a5—the high pressure generator, b5—the condenser, c5—the evaporator, d5—the high pressure absorber, e5—the throttle, f5—the solution pump, g5—the solution heat exchanger, h5—the low pressure generator, i5—the low pressure absorber, j5—the second solution pump, k5—the second solution heat exchanger, l5—the liquid refrigerant recirculation pump.

In the FIG. 45-FIG. 49, a6—the high pressure generator, b6—the high pressure condenser, c6—the low pressure condenser, d6—the evaporator, e6—the low pressure absorber, f6—the low pressure generator, g6—the high pressure absorber, h6—the solution pump, i6—the second solution pump, j6—the throttle, k6—the second throttle, l6—the solution heat exchanger, m6—the second solution heat exchanger, n6—the liquid refrigerant recirculation pump.

In the FIG. 50-FIG. 55, a7—the high pressure generator, b7—the condenser, c7—the evaporator, d7—the absorption-evaporator, e7—the low pressure generator, f7—the absorber, g7—the solution pump, h7—the second solution pump, i7—the throttle, j7—the second throttle, k7—the solution heat exchanger, l7—the second solution heat exchanger, m7—the liquid refrigerant pump, n7—the collection steam-steam separator, S—the generation system of refrigerant vapor which consists of the low pressure generator e7, the absorption-evaporator d7, the second solution pump h7 and the second solution heat exchanger l7.

For convenience, defines the following content:

① Concentrated solution generator—in the figure, a1—the generator, b2—the low pressure generator, c3—the low pressure generator, a4—the generator, a5—the high pressure generator, a6—the high pressure generator, a7—the high pressure generator, all of them is called the concentrated solution generator with the first one adjacent heating-side ② Refrigerant vapor provider—c1—the evaporator, d2—the evaporator, e3—the evaporator, c4—the evaporator, h5—the low pressure generator, f6—the low pressure generator, d7—the absorption-evaporator, e7—the low pressure generator.

③ Dilute solution provider—d1—the absorber, e2—the absorber, f3—the absorber, e4—the absorption-evaporator, d5—the high pressure absorber, g6—the high pressure absorber, f7—the absorber.

DETAILED DESCRIPTION OF THE PREFERRED EMBODIMENT

The detail way of carrying out:

What is needed to explain is that the existing units involved in this invention are public content in this field. After specifying the components and essential characteristics—such as single-stage single-effect, single-stage double-effect, single generator two-stage which provides the liquid refrigerant vapor from absorption-evaporator to absorber, its concrete structure and working process is been decided too. The present invention does not describe on detail and explanation. According to the components and briefly essential characteristics of the existing heat pump and the given appended drawings, the technical personnel in this field can completely clear the concrete structure and process of the existing units.

Now combining the appended drawings and examples, we described in detail the present invention.

Shown in FIG. 1, according to the method provided by the invention, the process of adding a high-temperature heating-side to the single-stage single-effect absorption heat pump which provides refrigerant vapor from evaporator to absorber is as follows:

On the existing single-stage single-effect absorption heat pump which consists of the generator a1, the condenser b1, the evaporator c1, the absorber d1, the throttle e1, the solution pump f1 and the solution heat exchanger g1 and provides refrigerant vapor from the evaporator e1 to the absorber d1, we add the new absorber 1, the new absorption-evaporator 2, the new throttle 3, the new solution pump 4, the new solution heat exchanger 5 and the second new solution heat exchanger 6.

The added pipe of concentrated solution from generator a1 passes through the second new solution heat exchanger 6 and then connects the new absorber 1. The pipe of dilute solution from absorber 1 passes through the new solution heat exchanger 5 and then connects the new absorption-evaporator 2. The pipe of dilute solution from the new absorption-evaporator 2 passes through the new solution pump 4, the new solution heat exchanger 5, the second new solution heat exchanger 6 and then connects generator a1.

The added pipe of refrigerant vapor from the evaporator c1 connects the new absorption-evaporator 2. The added pipe of the liquid refrigerant from the condenser b1 passes through the new throttle 3 and then connects the new absorption-evaporator 2. After that, the pipe of refrigerant vapor from the new absorption-evaporator 2 connects the new absorber 1. At the same time, the pipe of heated medium from the new absorber 1 connects external.

So we get a new process of heat pump. The concentrated solution of generator a1 passes through the second new solution heat exchanger 6 and then enters the new absorber 1. In the absorber 1, it absorbs the refrigerant vapor came from the new absorption-evaporator 2 and then releases heat to the heated medium. After the concentration in the new absorber 1 decreased, the dilute solution passes through the new solution heat exchanger 5 and then enters the new absorption-evaporator 2. In the new absorption-evaporator 2, it absorbs the refrigerant vapor came from the evaporator c1 and releases heat to the refrigerant medium which passes through it. After the concentration in the new absorption-evaporator 2 decreased again, the solution passes through the new solution heat exchanger 5, the second new solution heat exchanger 6 and then enters the generator a1.

Then the dilute solution releases refrigerant vapor into the condenser b1 under the action of actuated-hot resources and then it releases heat to heated medium and changes into the liquid refrigerant. The liquid refrigerant in the condenser b1 can be divided into two parts. On of the parts passes through throttle 3 and then enters the evaporator c1 and absorbs the refrigerant vapor and enters the new absorber 1. The other part passes through the throttle e1 and then enters the evaporator c1 and absorbs waste heat changing into refrigerant vapor. And the vapor is provided to the new absorption-evaporator 2. The absorber d1, the condenser b1, and the new absorber 1 supply heat to the heated medium separately. The new absorber 1 becomes the high adjacent high-temperature heating-side of the absorber d1 or the condenser b1. At last we get the three-terminal heating absorption heat pump with high-temperature heating-side based on two-terminal heating single-stage single-effect heat pump.

Figure 2:
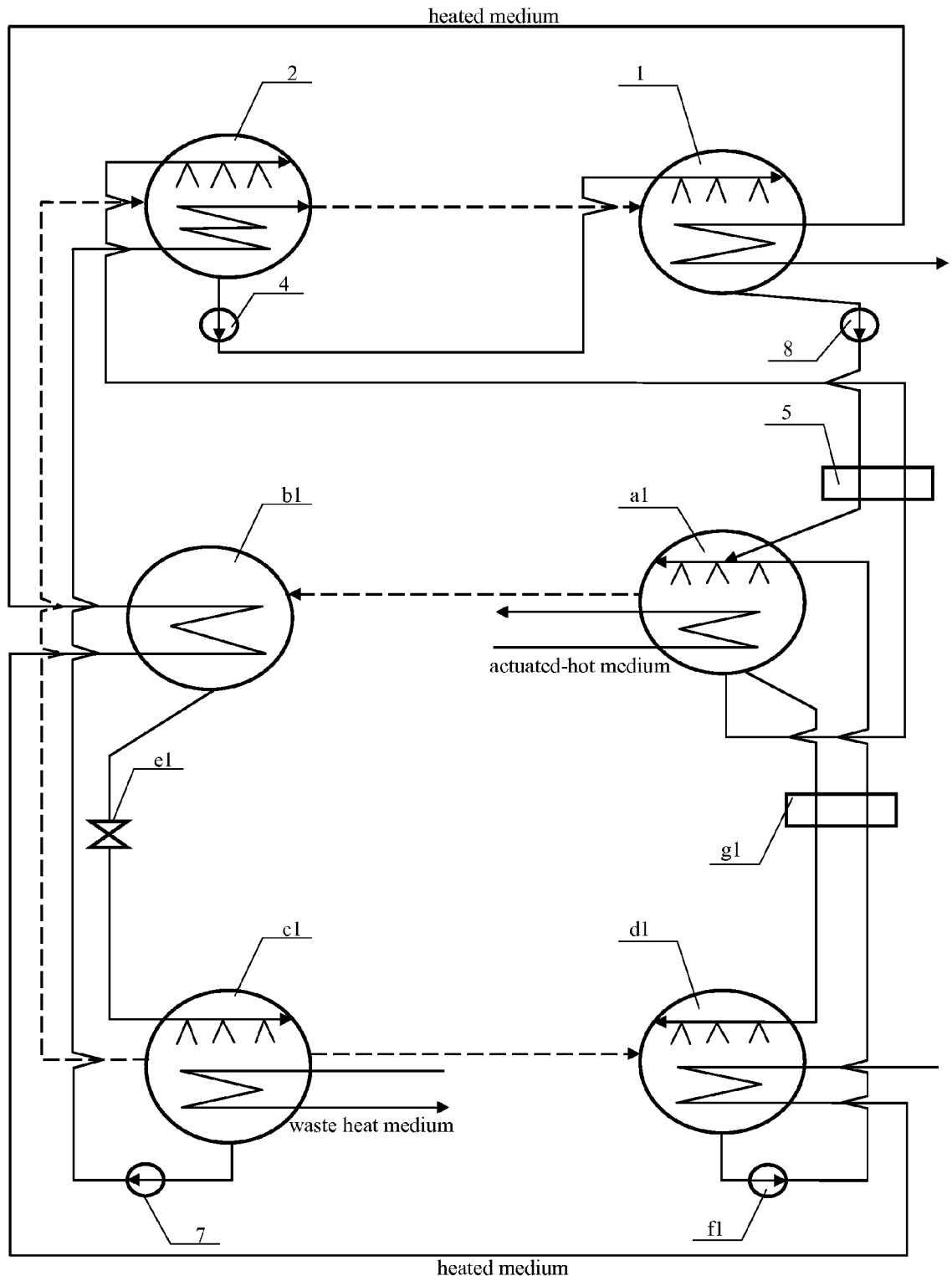
FIG. 2 provides the second construction and flow diagram of absorption heat pump with three-terminal heating that consists of adding an adjacent high-temperature heating-side to the single-stage single-effect absorption heat pump.

Shown in FIG. 2, according to the method provided by the invention, the process of adding a high-temperature heating-side to the single-stage single-effect absorption heat pump which provides refrigerant vapor from evaporator to absorber can also be as follows:

On the existing single-stage single-effect absorption heat pump which consists of the generator a1, the condenser b1, the evaporator c1, the absorber d1, the throttle e1, the solution pump f1 and the solution heat exchanger g1 and provides refrigerant vapor from evaporator e1 to the absorber d1, we add the new absorber 1, the new absorption-evaporator 2, the new liquid refrigerant pump 7, the new solution pump 4, the new solution heat exchanger 5 and the second new solution pump 8.

The added pipe of concentrated solution from generator a1 passes through the new solution heat exchanger 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8, the new solution heat exchanger 5 and then connects generator a1.

The added pipe of refrigerant vapor from the evaporator c1 connects the new absorption-evaporator 2. The added pipe of the liquid refrigerant from the evaporator c1 passes through the new liquid refrigerant pump 7 and then connects the new absorption-evaporator 2. After that, the pipe of refrigerant vapor from the new absorption-evaporator 2 connects the new absorber 1. At the same time, the pipe of heated medium from the new absorber 1 connects external.

So we get a new process of heat pump. The concentrated solution of generator a1 passes through the new solution heat exchanger 5 and then enters the new absorption-evaporator 2. In the absorber 1, it absorbs the refrigerant vapor came from the evaporator c1 and then releases heat to the heated medium. After the concentration in the new absorption-evaporator 2 decreased, the dilute solution passes through the new solution pump 4 and then enters the new absorber 1. In the new absorption-evaporator, it absorbs the refrigerant vapor came from the new absorption-evaporator 2 and releases heat to the refrigerant medium which passes through it. After the concentration in the new absorber 1 decreased again, the solution passes through the second new solution pump 8, the new solution heat exchanger 5 and then enters the generator a1.

Then the dilute solution releases refrigerant vapor into the condenser b1 under the action of actuated-hot resources and then it releases heat to heated medium changing into the liquid refrigerant. After the liquid refrigerant in the condenser b1 passes through the throttle e1 and then enters the evaporator c1, the liquid refrigerant can be decided into two parts. One of the parts absorbs waste heat changing into refrigerant vapor and enters the new absorption-evaporator 2. The other part is improved its pressure by the new liquid refrigerant pump 7 and then enters absorption-evaporator 2 and absorbs heat changing into refrigerant vapor. And the vapor is provided to the new absorber 1. The absorber d1, the condenser b1 and the new absorber 1 supply heat to the heated medium separately. The new absorber 1 becomes the adjacent high-temperature heating-side of the absorber d1 or the condenser b1. At last we get the three-terminal heating absorption heat pump with high-temperature heating-side based on two-terminal heating single-stage single-effect heat pump.

Shown in FIG. 3, according to the method provided by the invention, the process of adding a high-temperature heating-side to the single-stage single-effect absorption heat pump which provides refrigerant vapor from evaporator to absorber can also be as follows:

On the existing single-stage single-effect absorption heat pump which consists of the generator a1, the condenser b1, the evaporator c1, the absorber d1, the throttle e1, the solution pump f1 and the solution heat exchanger g1 and provides refrigerant vapor from evaporator e1 to the absorber d1, we add the new absorber 1, the new absorption-evaporator 2, the new throttle 3, the new solution pump 4, the new solution heat exchanger 5.

Change the pipe of dilute solution from the new the absorber d1 passes through the solution pump f1, the solution heat exchanger g1 and then connects generator a1 into that the pipe of dilute solution from the new the absorber d1 passes through the solution pump f1, the solution heat exchanger g1 and then connects the new absorber 1. The pipe of dilute solution from the new the absorber d1 passes through the new solution heat exchanger 5 and then connects the new absorption-evaporator 2. The pipe of dilute solution from the new absorption-evaporator 2 passes through the new solution pump 4, the new solution heat exchanger 5 and then connects generator a1.

The added pipe of refrigerant vapor from the evaporator c1 connects the new absorption-evaporator 2. The added pipe of the liquid refrigerant from the condenser b1 passes through throttle 3 and then connects the new absorption-evaporator 2. After that, the pipe of refrigerant vapor from the new absorption-evaporator 2 connects the new absorber 1. At the same time, the pipe of heated medium from the new absorber 1 connects external.

So we get a new process of heat pump. The dilute solution of the absorber d1 passes through the solution pump f1, the solution heat exchanger g1 and then enters the new absorber 1. After absorbed the refrigerant vapor came from the new absorption-evaporator 2, it releases heat to heated medium. After the concentration in the new absorber 1 decreased, the solution passes through the new solution heat exchanger 5 and then enters the new absorption-evaporator 2. In the new absorption-evaporator, it absorbs the refrigerant vapor came from the evaporator c1 and releases heat to the refrigerant medium which passes through it. After the concentration in the new absorption-evaporator 2 decreased again, the solution passes through the new solution pump 4, the new solution heat exchanger 5 and then enters the generator a1.

Then the dilute solution releases refrigerant vapor into the condenser b1 under the action of actuated-hot resources and then it releases heat to heated medium changing into the liquid refrigerant. One part of the liquid refrigerant in the condenser b1 passes through the throttle e1 and then enters the evaporator c1. It absorbs waste heat changing into refrigerant vapor and enters the new absorption-evaporator 2. The other part passes through the new throttle 3 and then enters the new absorption-evaporator 2. It absorbs heat changing into refrigerant vapor and then enters the new absorber 1. One part of the poor solution concentration between the import and export of generator a1 is used in the process of single-stage single-effect heat pump. And the other part of the poor solution concentration between the import solution of absorber and the export solution of the new absorption-evaporator is used in the above new process of heat pump. The absorber d1, the condenser b1, and the new absorber 1 supply heat to the heated medium separately. The new absorber 1 becomes the high adjacent high-temperature heating-side of the absorber d1 or the condenser b1. At last we get the three-terminal heating absorption heat pump with high-temperature heating-side based on two-terminal heating single-stage single-effect heat pump.

Shown in FIG. 4, according to the method provided by the invention, the process of adding a high-temperature heating-side to the single-stage single-effect absorption heat pump which provides refrigerant vapor from evaporator to absorber can also be as follows:

On the existing single-stage single-effect absorption heat pump which consists of the generator a1, the condenser b1, the evaporator c1, the absorber d1, the throttle e1, the solution pump f1 and the solution heat exchanger g1 and provides refrigerant vapor from evaporator e1 to the absorber d1.

We change the solution pipe from the absorber d1 which passes through the solution pump f1, the solution heat exchanger g1 and then connects generator a1 into the solution pipe from the absorber d1 which passes through the solution pump f1, the solution heat exchanger g1, the new solution heat exchanger 6 and then connects the new absorber 1. The pipe of dilute solution from the new the absorber d1 passes through the new solution heat exchanger 5 and then connects the new absorption-evaporator 2. The pipe of dilute solution from the new absorption-evaporator 2 passes through the new solution pump 4, the new solution heat exchanger 5, the second new solution heat exchanger 6 and then connects generator a1.

The added pipe of refrigerant vapor from the evaporator c1 connects the new absorption-evaporator 2. The added pipe of the liquid refrigerant from the evaporator c1 passes through the new liquid refrigerant pump 7 and then connects the new absorption-evaporator 2. After that, the pipe of refrigerant vapor from the new absorption-evaporator 2 connects the new absorber 1. At the same time, the pipe of heated medium from the new absorber 1 connects external. The absorber d1, the condenser b1, and the new absorber 1 supply heat to the heated medium separately. The new absorber 1 becomes the high adjacent high-temperature heating-side of the absorber d1 or the condenser b1. At last we get the three-terminal heating absorption heat pump with high-temperature heating-side based on two-terminal heating single-stage single-effect heat pump.

Figure 3:
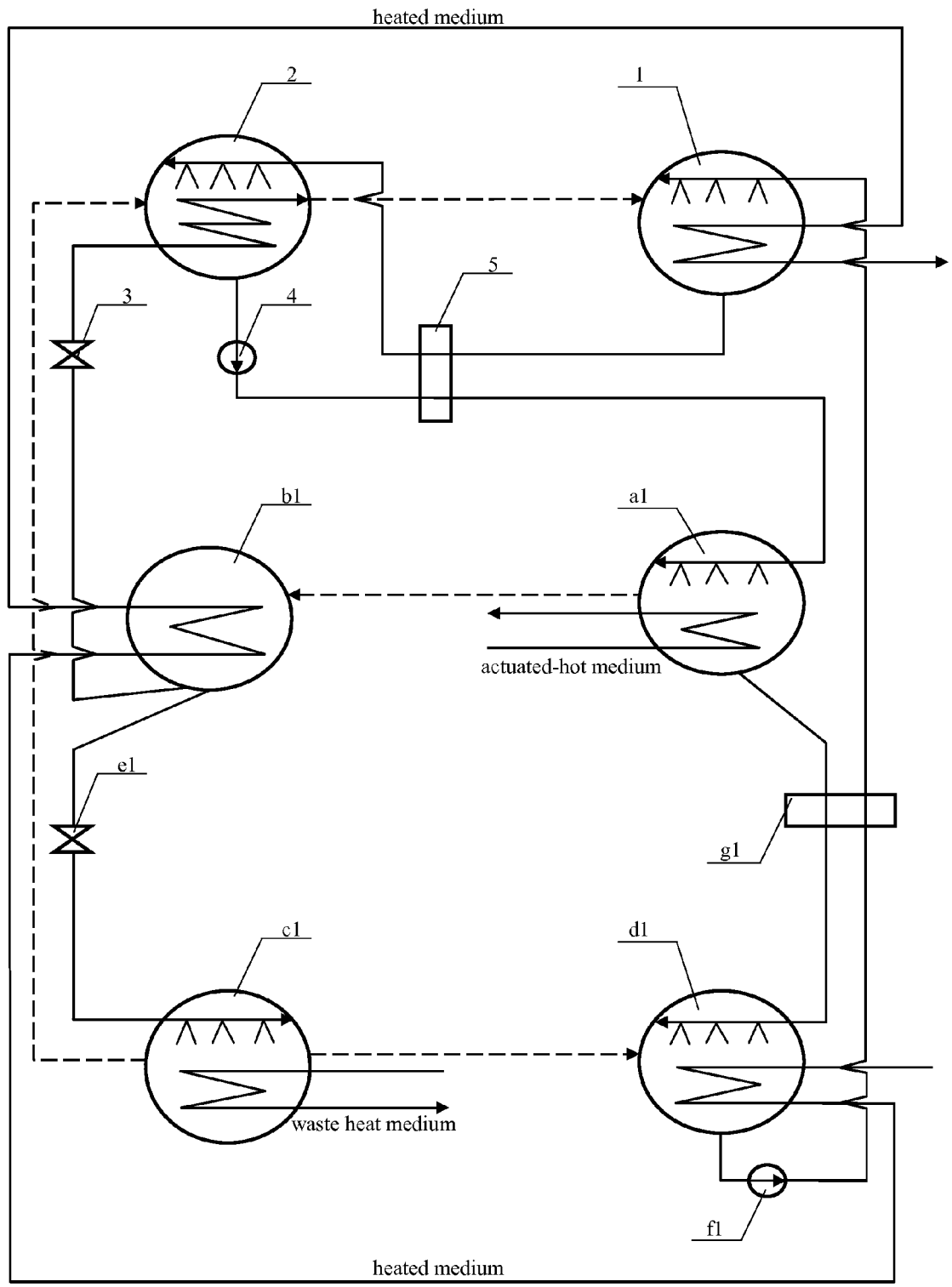
FIG. 3 provides the third construction and flow diagram of absorption heat pump with three-terminal heating that consists of adding an adjacent high-temperature heating-side to the single-stage single-effect absorption heat pump.
Figure 4:
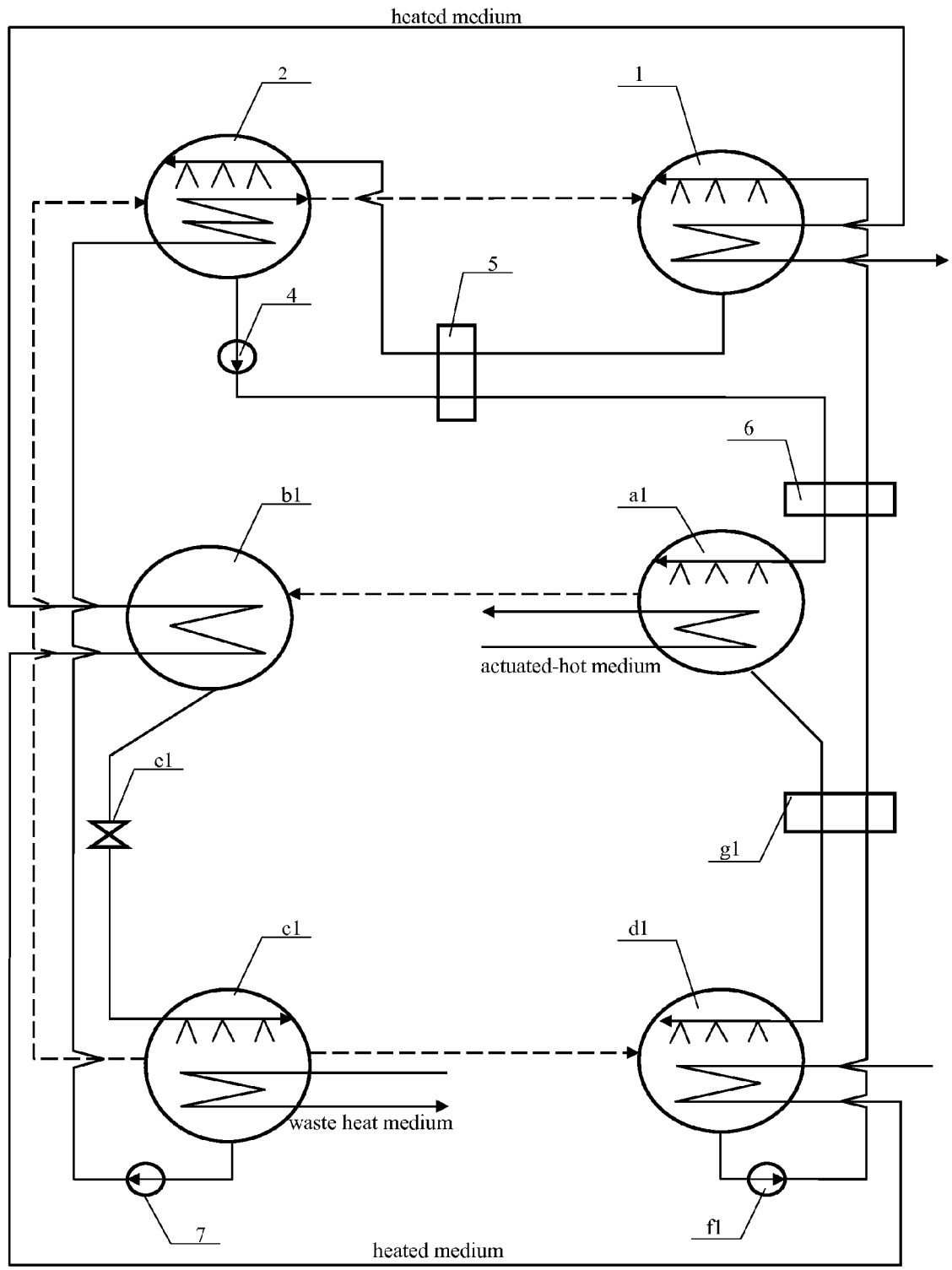
FIG. 4 provides the fourth construction and flow diagram of absorption heat pump with three-terminal heating that consists of adding an adjacent high-temperature heating-side to the single-stage single-effect absorption heat pump.

Comparing FIG. 4 and FIG. 3, the technique project in FIG. 3 and FIG. 4 all form concatenated loops. The difference between them is we add the second new solution heat exchanger on FIG. 4. The technique project in FIG. 3 is adding some components such as the new absorber, the new absorption-evaporator, the new throttle or the new liquid refrigerant pump, the new solution pump, the new solution heat exchanger and having the pipe connection as follows.

Changing that the solution pipe from dilute solution provider passes through solution pump, one or several solution heat exchanger and then connects concentrated solution generator into that the solution pipe from dilute solution provider passes through solution pump, one or several solution heat exchanger and then connects concentrated the new absorber. And the pipe of dilute solution from the new absorber passes through the new solution heat exchanger and then connects the new absorption-evaporator. The pipe of dilute solution from the new absorption-evaporator passes through the new solution pump, the new solution heat exchanger and then connects concentrated solution generator.

The technique project in FIG. 4 is adding some components such as the new absorber, the new absorption-evaporator, the new throttle or the new liquid refrigerant pump, the new solution pump, the new solution heat exchanger, the second solution heat exchanger and having the pipe connection as follows.

Chang the solution pipe from dilute solution provider passes through solution pump, one or several solution heat exchanger and then connects concentrated solution generator into that the solution pipe from dilute solution provider passes through solution pump, one or several solution heat exchanger, the second new solution heat exchanger and then connects concentrated the new absorber. And the pipe of dilute solution from the new absorber passes through the new solution heat exchanger and then connects the new absorption-evaporator. The pipe of dilute solution from the new absorption-evaporator passes through the new solution pump, the new solution heat exchanger, the second new solution heat exchanger and then connects concentrated solution generator.

So special explanation, this manual only introduces one of the projects in the concrete instances of following. The selected project to be introduced is the one without the second new heat exchanger 6.

Shown in FIG. 5, according to the method provided by the invention, the process of adding a high-temperature heating-side to the single-stage single-effect absorption heat pump which provides refrigerant vapor from evaporator to absorber can also be as follows:

On the existing single-stage single-effect absorption heat pump which consists of the generator a1, the condenser b1, the evaporator c1, the absorber d1, the throttle e1, the solution pump f1 and the solution heat exchanger g1 and provides refrigerant vapor from evaporator e1 to the absorber d1, we add the new absorber 1, the new absorption-evaporator 2, the new throttle 3, the new solution pump 4, the new solution heat exchanger 5 and the second new solution pump 8.

Change the pipe of dilute solution from the new the absorber d1 passes through the solution pump f1, the solution heat exchanger g1 and then connects generator a1 into that the pipe of dilute solution from the new the absorber d1 passes through the solution pump f1, the solution heat exchanger g1, the new solution heat exchanger 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8, the new solution heat exchanger 5 and then connects generator a1.

The added pipe of refrigerant vapor from the evaporator c1 connects the new absorption-evaporator 2. The added pipe of the liquid refrigerant from the condenser b1 passes through the new throttle 3 and then connects the new absorption-evaporator 2. After that, the pipe of refrigerant vapor from the new absorption-evaporator 2 connects the new absorber 1. At the same time, the pipe of heated medium from the new absorber 1 connects external.

So we get a new process of heat pump. The dilute solution of the absorber d1 passes through the solution pump f1, the solution heat exchanger g1, the new solution heat exchanger 5 and then enters the new absorption-evaporator 2. After absorbed the refrigerant vapor came from the evaporator c1, it releases heat to heated medium which passes through it. After the concentration in the new absorption-evaporator 2 decreased again, the solution passes through the new solution pump 4 and then enters the new absorber 1. Then it absorbs the refrigerant vapor came from the new absorption-evaporator 2 and releases heat to the heated medium. After the concentration in the new absorber 1 decreased, the solution passes through the second new solution pump 8, the new solution heat exchanger 5 and then enters the generator a1.

Then the dilute solution releases refrigerant vapor into the condenser b1 under the action of actuated-hot resources and then it releases heat to heated medium changing into the liquid refrigerant. The liquid refrigerant in the condenser b1 is divided into two parts. One of the two parts passes through the throttle e1 and then enters the evaporator c1. It absorbs waste heat changing into refrigerant vapor and enters the new absorption-evaporator 2. The other part passes through the new throttle 3 and then enters the new absorption-evaporator 2. It absorbs heat changing into refrigerant vapor and then enters the new absorber 1. The absorber d1, the condenser b1, and the new absorber 1 supply heat to the heated medium separately. The new absorber 1 becomes the high adjacent high-temperature heating-side of the absorber d1 or the condenser b1. At last we get the three-terminal heating absorption heat pump with high-temperature heating-side based on two-terminal heating single-stage single-effect heat pump.

According to the method provided by the invention, the shown in FIG. 6 forms a heat pump with the process of adding a high-temperature heating-side to the single-stage single-effect absorption heat pump which provides refrigerant vapor from evaporator to absorber. By comparison with FIG. 1, it uses new the rectifying tower A1 in FIG. 6 replace the generator a1. The method, adding adjacent high-temperature heating-side on absorption heat pump which takes ammonia solution as working substance, is consistent of the shown in FIG. 1.

According to the method provided by the invention, shown in FIG. 7 forms a heat pump with the process of adding a high-temperature heating-side to the single-stage single-effect absorption heat pump which provides refrigerant vapor from evaporator to absorber. By comparison with FIG. 4, it uses new the rectifying tower A1 in FIG. 7 replace the generator a1. The method, adding adjacent high-temperature heating-side on absorption heat pump which takes ammonia solution as working substance, is consistent of the shown in FIG. 4.

FIG. 6 and FIG. 7 is absorption heat pump which adopts the rectifying tower. The method and process of adding adjacent high-temperature heating-side in FIG. 6 and FIG. 7 is consistent of the absorption heat pump which adopts generator. The two is the representative of the absorption heat pump which adopts the rectifying tower and has additional adjacent high-temperature heating-side.

What should be pointed out is that, in FIG. 1, FIG. 2, FIG. 3, FIG. 5, we were separately described four processes of solution involved in the concrete method of adding adjacent high-temperature heating-side to adsorption heat pump and two processes of refrigerant media (refrigerant vapor and the liquid refrigerant). Therefore, we will mainly describe the connection of new components and the components of existing heat pump when we introduce the following cases with all kinds of additional adjacent high-temperature heating-side on absorption heat pump. We don't make a detailed description to the similar additional new processes (the process of solution and the process of refrigerant media). When there appears a new processes which obviously different from the abodes, we will describe it in detail.

Shown in FIG. 8, according to the method provided by the invention, the process of adding a high-temperature heating-side to the single-stage double-effect absorption heat pump which provides refrigerant vapor from evaporator to absorber and has the concatenated loops can be as follows:

On the concatenated loops single-stage double-effect absorption heat pump which consists of the high pressure generator a2, the low pressure absorber b2, the condenser c2, the evaporator d2, the absorber e2, the throttle f2, the second throttle g2, the solution pump h2, the second solution pump i2, the solution heat exchanger j2, the second solution heat exchanger k2 and recirculation pump of the liquid refrigerant l2, we add the new absorber 1, the new absorption-evaporator 2, the new throttle 3, the new solution pump 4, the new solution heat exchanger 5 and the second new solution heat exchanger 6.

And the added pipe of concentrated solution from the low pressure generator b2 passes through the second new solution heat exchanger 6 and then connects the new absorber 1. The pipe of dilute solution from absorber 1 passes through the new solution heat exchanger 5 and then connects the new absorption-evaporator 2. The pipe of dilute solution from the new absorption-evaporator 2 passes through the new solution pump 4, the new solution heat exchanger 5, the second new solution heat exchanger 6 and then connects the low pressure generator b2.

The added pipe of the liquid refrigerant from the evaporator d2 connects the new absorption-evaporator 2. The pipe of the liquid refrigerant from the condenser c2 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating concatenated loops single-stage double-effect heat pump.

Shown in FIG. 9, according to the method provided by the invention, the process of adding a high-temperature heating-side to the single-stage double-effect absorption heat pump which provides refrigerant vapor from evaporator to absorber and has concatenated loops can be as follows:

On the concatenated loops single-stage double-effect absorption heat pump which consists of the high pressure generator a2, the low pressure absorber b2, the condenser c2, the evaporator d2, the absorber e2, the throttle f2, the second throttle g2, the solution pump h2, the second solution pump i2, the solution heat exchanger j2, the second solution heat exchanger k2, we add the new absorber 1, the new absorption-evaporator 2, the new throttle 3, the new solution pump 4, the new solution heat exchanger 5 and the second new solution heat exchanger 6.

And the added pipe of concentrated solution from the high pressure generator a2 passes through the second new solution heat exchanger 6 and then connects the new absorber 1. The pipe of dilute solution from absorber 1 passes through the new solution heat exchanger 5 and then connects the new absorption-evaporator 2. The pipe of dilute solution from the new absorption-evaporator 2 passes through the new solution pump 4, the new solution heat exchanger 5, the second new solution heat exchanger 6 and then connects the low pressure generator b2.

The added pipe of refrigerant vapor from the evaporator d2 connects the new absorption-evaporator 2. The pipe of the liquid refrigerant from the evaporator d2 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating concatenated loops single-stage double-effect heat pump.

Compared with FIG. 8, in FIG. 9 the high pressure generator a2 provides concentrated solution to the new absorber 1 and the new absorption-evaporator 2 provides dilute solution to the low pressure generator b2. That causes the poor solution concentration which is used in the new high-temperature heating-side producing by the high pressure generator a2 and the low pressure generator b2. Its effect is the heating temperature of added high-temperature heating-side is promoted and the COP of new heat pump is lower than FIG. 8. The COP decreases while the heating-temperature increases.

Shown in FIG. 10, it is a three-terminal heating absorption heat pump with high-temperature heating-side which provides refrigerant vapor from evaporator to absorber and has the concatenated loops in single-stage double-effect absorption heat pump. Compared with FIG. 9, its heating-temperature is promoted and its performance is decreased.

Shown in FIG. 11, according to the method provided by the invention, the process of adding a high-temperature heating-side to the single-stage double-effect absorption heat pump which provides refrigerant vapor from evaporator to absorber and has concatenated loops can also be as follows:

On the concatenated loops single-stage double-effect absorption heat pump which consists of the high pressure generator a2, the low pressure absorber b2, the condenser c2, the evaporator d2, the absorber e2, the throttle f2, the second throttle g2, the solution pump h2, the second solution pump i2, the solution heat exchanger j2, the second solution heat exchanger k2 and recirculation pump of the liquid refrigerant l2, we add the new absorber 1, the new absorption-evaporator 2, the new throttle 3, the new solution pump 4, the new solution heat exchanger 5.

Change the pipe from the absorber e2 passes through the solution pump h2, the solution heat exchanger j2, the second solution heat exchanger k2 and then connects the low pressure generator b2 into that the pipe from the absorber e2 passes through the solution pump h2, the solution heat exchanger j2, the second solution heat exchanger k2 and then connects low the new absorber 1. The pipe of dilute solution from absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the low pressure generator b2.

The added pipe of the liquid refrigerant from the evaporator d2 connects the new absorption-evaporator 2. The pipe of the liquid refrigerant from the condenser c2 passes through throttle 3 and then connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating concatenated loops single-stage double-effect heat pump.

Shown in FIG. 12, according to the method provided by the invention, the process of adding a high-temperature heating-side to the single-stage double-effect absorption heat pump which provides refrigerant vapor from evaporator to absorber and has concatenated loops can also be as follows:

On the concatenated loops single-stage double-effect absorption heat pump which consists of the high pressure generator a2, the low pressure absorber b2, the condenser c2, the evaporator d2, the absorber e2, the throttle f2, the second throttle g2, the solution pump h2, the second solution pump i2, the solution heat exchanger j2, the second solution heat exchanger k2, we add the new absorber 1, the new absorption-evaporator 2, the new liquid refrigerant pump 7, the new solution pump 4, the new solution heat exchanger 5 and the second new solution pump 8.

And the added pipe of concentrated solution from the low pressure generator b2 passes through the new solution heat exchanger 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8, the new solution heat exchanger 5 and then connects the low pressure generator b2.

The added pipe of refrigerant vapor from the evaporator d2 connects the new absorption-evaporator 2. The pipe of the liquid refrigerant from the evaporator d2 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating concatenated loops single-stage double-effect heat pump.

Shown in FIG. 13, according to the method provided by the invention, the process of adding a high-temperature heating-side to the single-stage double-effect absorption heat pump which provides refrigerant vapor from evaporator to absorber and has concatenated loops can also be as follows:

On the concatenated loops single-stage double-effect absorption heat pump which consists of the high pressure generator a2, the low pressure absorber b2, the condenser c2, the evaporator d2, the absorber e2, the throttle f2, the second throttle g2, the solution pump h2, the second solution pump i2, the solution heat exchanger j2, the second solution heat exchanger k2, we add the new absorber 1, the new absorption-evaporator 2, the new liquid refrigerant pump 7, the new solution pump 4, the new solution heat exchanger 5 and the second new solution pump 8.

Change the pipe from the absorber e2 passes through the solution pump h2, the solution heat exchanger j2, the second solution heat exchanger k2 and then connects the low pressure generator b2 into that the pipe from the absorber e2 passes through the solution pump h2, the solution heat exchanger j2, the second solution heat exchanger k2, the new solution heat exchanger 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8, the new solution heat exchanger 5 and then connects the low pressure generator b2.

The added pipe of refrigerant vapor from the evaporator d2 connects the new absorption-evaporator 2. The pipe of the liquid refrigerant from the evaporator d2 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating concatenated loops single-stage double-effect heat pump.

Shown in FIG. 14, according to the method provided by the invention, the process of adding a high-temperature heating-side to the single-stage double-effect absorption heat pump which provides refrigerant vapor from evaporator to absorber and has concatenated loops can also be as follows:

On the concatenated loops single-stage double-effect absorption heat pump which consists of the high pressure generator a2, the low pressure absorber b2, the condenser c2, the evaporator d2, the absorber e2, the throttle f2, the second throttle g2, the solution pump h2, the solution heat exchanger j2, the second solution heat exchanger k2 and recirculation pump of the liquid refrigerant l2, we add the new absorber 1, the new absorption-evaporator 2, the new throttle 3, the new solution pump 4, the new solution heat exchanger 5 and the second new solution heat exchanger 6.

And the added pipe of concentrated solution from the low pressure generator b2 passes through the second new solution heat exchanger 6 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5, the second new solution heat exchanger 6 and then connects the low pressure generator b2.

The added pipe of refrigerant vapor from the evaporator d2 connects the new absorption-evaporator 2. The pipe of the liquid refrigerant from the condenser c2 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating concatenated loops single-stage double-effect heat pump.

Shown in FIG. 15, according to the method provided by the invention, the process of adding a high-temperature heating-side to the single-stage double-effect absorption heat pump which provides refrigerant vapor from evaporator to absorber and has concatenated loops can also be as follows:

On the concatenated loops single-stage double-effect absorption heat pump which consists of the high pressure generator a2, the low pressure absorber b2, the condenser c2, the evaporator d2, the absorber e2, the throttle f2, the second throttle g2, the solution pump h2, the solution heat exchanger j2, the second solution heat exchanger k2 and recirculation pump of the liquid refrigerant l2, we add the new absorber 1, the new absorption-evaporator 2, the new throttle 3, the new solution pump 4, the new solution heat exchanger 5.

Change the pipe from the absorber e2 passes through the solution pump h2, the solution heat exchanger j2, the second solution heat exchanger k2 and then connects the high pressure generator a2 into that the pipe from the absorber e2 passes through the solution pump h2, the solution heat exchanger j2, the second solution heat exchanger k2 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the high pressure generator a2.

The added pipe of refrigerant vapor from the evaporator d2 connects the new absorption-evaporator 2. The pipe of the liquid refrigerant from the condenser c2 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating concatenated loops single-stage double-effect heat pump.

Shown in FIG. 16, it is a three-terminal heating absorption heat pump with high-temperature heating-side which provides refrigerant vapor from evaporator to absorber and has concatenated loops in single-stage double-effect absorption heat pump. Compared with FIG. 15, there are two differences between the two. Firstly, FIG. 16 adopts the new liquid refrigerant pump 7 instead of the new throttle 3. And after that the pipe of the liquid refrigerant from the evaporator d2 passes through the new liquid refrigerant pump 7 and then connects the new absorption-evaporator 2, the pipe of refrigerant vapor from the new absorption-evaporator 2 connects the new absorber 1. Secondly, the single-stage double-effect heat pump in FIG. 16 doesn't adopt recirculation pump of the liquid refrigerant l2.

Shown in FIG. 17, according to the method provided by the invention, the process of adding a high-temperature heating-side to the single-stage double-effect absorption heat pump which provides refrigerant vapor from evaporator to absorber and has concatenated loops can also be as follows:

On the concatenated loops single-stage double-effect absorption heat pump which consists of the high pressure generator a2, the low pressure absorber b2, the condenser c2, the evaporator d2, the absorber e2, the throttle f2, the second throttle g2, the solution pump h2, the solution heat exchanger j2, the second solution heat exchanger k2, we add the new absorber 1, the new absorption-evaporator 2, the new liquid refrigerant pump 7, the new solution pump 4, the new solution heat exchanger 5 and the second new solution pump 8.

And the added pipe of concentrated solution from the low pressure generator b2 passes through the new solution heat exchanger 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8, the new solution heat exchanger 5 and then connects the high pressure generator a2.

The added pipe of refrigerant vapor from the evaporator d2 connects the new absorption-evaporator 2. The pipe of the liquid refrigerant from the evaporator d2 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating concatenated loops single-stage double-effect heat pump.

Shown in FIG. 18, according to the method provided by the invention, the process of adding a high-temperature heating-side to the single-stage double-effect absorption heat pump which provides refrigerant vapor from evaporator to absorber and has the parallel circulation can also be as follows:

On the parallel circulation single-stage double-effect absorption heat pump which consists of the high pressure generator a2, the low pressure absorber b2, the condenser c2, the evaporator d2, the absorber e2, the throttle f2, the second throttle g2, the solution pump h2, the solution heat exchanger j2, the second solution heat exchanger k2 and recirculation pump of the liquid refrigerant l2, we add the new absorber 1, the new absorption-evaporator 2, the new throttle 3, the new solution pump 4, the new solution heat exchanger 5 and the second new solution heat exchanger 6.

And the added pipe of concentrated solution from the low pressure generator b2 passes through the second new solution heat exchanger 6 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5, the second new solution heat exchanger 6 and then connects the low pressure generator b2.

The added pipe of refrigerant vapor from the evaporator d2 connects the new absorption-evaporator 2. The pipe of the liquid refrigerant from the condenser c2 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating parallel circulation single-stage double-effect heat pump.

Shown in FIG. 19, according to the method provided by the invention, the process of adding a high-temperature heating-side to the single-stage double-effect absorption heat pump which provides refrigerant vapor from evaporator to absorber and has the parallel circulation can also be as follows:

On the parallel circulation single-stage double-effect absorption heat pump which consists of the high pressure generator a2, the low pressure absorber b2, the condenser c2, the evaporator d2, the absorber e2, the throttle f2, the second throttle g2, the solution pump h2, the solution heat exchanger j2, the second solution heat exchanger k2, we add the new absorber 1, the new absorption-evaporator 2, new the liquid refrigerant 7, the new solution pump 4, the new solution heat exchanger 5 and the second new solution heat exchanger 6.

And the added pipe of concentrated solution from the high pressure generator a2 passes through the second new solution heat exchanger 6 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5, the second new solution heat exchanger 6 and then connects the high pressure generator a2.

The added pipe of refrigerant vapor from the evaporator d2 connects the new absorption-evaporator 2. The pipe of the liquid refrigerant from the evaporator d2 passes through new the liquid refrigerant 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating parallel circulation single-stage double-effect heat pump.

Shown in FIG. 20, according to the method provided by the invention, the process of adding a high-temperature heating-side to the single-stage double-effect absorption heat pump which provides refrigerant vapor from evaporator to absorber and has the parallel circulation can also be as follows:

On the parallel circulation single-stage double-effect absorption heat pump which consists of the high pressure generator a2, the low pressure absorber b2, the condenser c2, the evaporator d2, the absorber e2, the throttle f2, the second throttle g2, the solution pump h2, the solution heat exchanger j2, the second solution heat exchanger k2 and recirculation pump of the liquid refrigerant l2, we add the new absorber 1, the new absorption-evaporator 2, the new throttle 3, the new solution pump 4, the new solution heat exchanger 5.

Change the pipe from the absorber e2 passes through the solution pump h2, the second solution heat exchanger k2 and then connects the low pressure generator b2 into that the pipe from the absorber e2 passes through the solution pump h2, the second solution heat exchanger k2 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the low pressure generator b2.

The added pipe of refrigerant vapor from the evaporator d2 connects the new absorption-evaporator 2. The pipe of the liquid refrigerant from the condenser c2 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating parallel circulation single-stage double-effect heat pump.

Shown in FIG. 21, according to the method provided by the invention, the process of adding a high-temperature heating-side to the single-stage double-effect absorption heat pump which provides refrigerant vapor from evaporator to absorber and has the parallel circulation can also be as follows:

On the parallel circulation single-stage double-effect absorption heat pump which consists of the high pressure generator a2, the low pressure absorber b2, the condenser c2, the evaporator d2, the absorber e2, the throttle f2, the second throttle g2, the solution pump h2, the solution heat exchanger j2 and the second solution heat exchanger k2, we add the new absorber 1, the new absorption-evaporator 2, the new liquid refrigerant pump 7, the new solution pump 4, the new solution heat exchanger 5.

Change the pipe from the absorber e2 passes through the solution pump h2, the solution heat exchanger j2 and then connects the high pressure generator a2 into that the pipe from the absorber e2 passes through the solution pump h2, the solution heat exchanger j2 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the high pressure generator a2.

The added pipe of refrigerant vapor from the evaporator d2 connects the new absorption-evaporator 2. The pipe of the liquid refrigerant from the evaporator d2 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating parallel circulation single-stage double-effect heat pump.

Shown in FIG. 22, according to the method provided by the invention, the process of adding a high-temperature heating-side to the single-stage double-effect absorption heat pump which provides refrigerant vapor from evaporator to absorber and has the parallel circulation can also be as follows:

On the parallel circulation single-stage double-effect absorption heat pump which consists of the high pressure generator a2, the low pressure absorber b2, the condenser c2, the evaporator d2, the absorber e2, the throttle f2, the second throttle g2, the solution pump h2, the solution heat exchanger j2, the second solution heat exchanger k2 and recirculation pump of the liquid refrigerant l2, we add the new absorber 1, the new absorption-evaporator 2, the new throttle 3, the new solution pump 4, the new solution heat exchanger 5 and the second new solution pump 8.

And the added pipe of concentrated solution from the low pressure generator b2 passes through the new solution heat exchanger 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8, the new solution heat exchanger 5 and then connects the low pressure generator b2.

The added pipe of refrigerant vapor from the evaporator d2 connects the new absorption-evaporator 2. The pipe of the liquid refrigerant from the condenser c2 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating parallel circulation single-stage double-effect heat pump.

Shown in FIG. 23, according to the method provided by the invention, the process of adding a high-temperature heating-side to the single-stage double-effect absorption heat pump which provides refrigerant vapor from evaporator to absorber and has the parallel circulation can also be as follows:

On the parallel circulation single-stage double-effect absorption heat pump which consists of the high pressure generator a2, the low pressure absorber b2, the condenser c2, the evaporator d2, the absorber e2, the throttle f2, the second throttle g2, the solution pump h2, the solution heat exchanger j2, the second solution heat exchanger k2, we add the new absorber 1, the new absorption-evaporator 2, the new liquid refrigerant pump 7, the new solution pump 4, the new solution heat exchanger 5, the second new solution pump 8.

Change the pipe from the absorber e2 passes through the solution pump h2, the second solution heat exchanger k2 and then connects the low pressure generator b2 into that the pipe from the absorber e2 passes through the solution pump h2, the second solution heat exchanger k2, the new solution heat exchanger 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8, the new solution heat exchanger 5 and then connects the low pressure generator b2.

The added pipe of refrigerant vapor from the evaporator d2 connects the new absorption-evaporator 2. The pipe of the liquid refrigerant from the evaporator d2 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber e2, the condenser c2 and the new absorber 1 supply heat to the heated medium separately. The new absorber 1 becomes the adjacent high-temperature heating-side of the absorber e2 or the condenser c2. At last we get the three-terminal heating absorption heat pump with high-temperature heating-side based on two-terminal heating parallel circulation single-stage double-effect heat pump.

Shown in FIG. 24, according to the method provided by the invention, the process of adding a high-temperature heating-side to the concatenated loops single-stage triple-effect absorption heat pump which provides refrigerant vapor from evaporator to absorber can be as follows:

On the solution concatenated loops single-stage triple-effect absorption heat pump which consists of the high pressure generator a3, the medium pressure generator b3, the low pressure generator c3, the condenser d3, the evaporator e3, the absorber f3, the throttle g3, the second throttle h3, the third throttle i3, the solution pump j3, the second solution pump k3, the third solution pump l3, the solution heat exchanger m3, the second solution heat exchanger n3, the third solution heat exchanger o3 and the liquid refrigerant recirculation pump p3, we add the new absorber 1, the new absorption-evaporator 2, the new throttle 3, the new solution pump 4, the new solution heat exchanger 5 and the second new solution heat exchanger 6.

The added pipe of concentrated solution from the low pressure generator c3 passes through the second new solution heat exchanger 6 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and the second new solution heat exchanger 6 and then connects the low pressure generator c3.

The added pipe of refrigerant vapor from the evaporator e3 connects the new absorption-evaporator 2. The pipe of the liquid refrigerant from the evaporator e3 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber f3, the condenser d3 and the new absorber 1 provide heat to the heated medium separately. The new absorber 1 becomes the adjacent high-temperature heating-side of the absorber f3 or the condenser d3. At last we get the three-terminal heating absorption heat pump with additional high-temperature heating-side based on the solution concatenated loops single-stage triple-effect heat pump with two-terminal heating.

Shown in FIG. 25, according to the method provided by the invention, the process of adding a high-temperature heating-side to the concatenated loops single-stage triple-effect absorption heat pump which provides refrigerant vapor from evaporator to absorber can be as follows:

On the solution concatenated loops single-stage triple-effect absorption heat pump which consists of the high pressure generator a3, the medium pressure generator b3, the low pressure generator c3, the condenser d3, the evaporator e3, the absorber f3, the throttle g3, the second throttle h3, the third throttle i3, the solution pump j3, the second solution pump k3, the third solution pump l3, the solution heat exchanger m3, the second solution heat exchanger n3, the third solution heat exchanger o3, we add the new absorber 1, the new absorption-evaporator 2, the new liquid refrigerant pump 7, the new solution pump 4 and the new solution heat exchanger 5.

Change the pipe from the absorber f3 passes through the solution pump j3, the second the solution heat exchanger m3, the second solution heat exchanger n3, the third solution heat exchanger o3 and then connects the low pressure generator c3 into that the pipe from the absorber f3 passes through the solution pump j3, the second the solution heat exchanger m3, the second solution heat exchanger n3, the third solution heat exchanger o3 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the low pressure generator c3.

The added pipe of refrigerant vapor from the evaporator e3 connects the new absorption-evaporator 2. The pipe of the liquid refrigerant from the evaporator e3 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber f3, the condenser d3 and the new absorber 1 provide heat to the heated medium separately. The new absorber 1 becomes the adjacent high-temperature heating-side of the absorber f3 or the condenser d3. At last we get the three-terminal heating absorption heat pump with additional high-temperature heating-side based on the solution concatenated loops single-stage triple-effect heat pump with two-terminal heating.

Shown in FIG. 26, according to the method provided by the invention, the process of adding a high-temperature heating-side to the concatenated loops single-stage triple-effect absorption heat pump which provides refrigerant vapor from evaporator to absorber can be as follows:

On the solution concatenated loops single-stage triple-effect absorption heat pump which consists of the high pressure generator a3, the medium pressure generator b3, the low pressure generator c3, the condenser d3, the evaporator e3, the absorber f3, the throttle g3, the second throttle h3, the third throttle i3, the solution pump j3, the second solution pump k3, the third solution pump l3, the solution heat exchanger m3, the second solution heat exchanger n3, the third solution heat exchanger o3, we add the new absorber 1, the new absorption-evaporator 2, the new liquid refrigerant pump 7, the new solution pump 4, the new solution heat exchanger 5 and the second new solution heat exchanger 6.

The added pipe of concentrated solution from the medium pressure generator b3 passes through the second new solution heat exchanger 6 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and the second new solution heat exchanger 6 and then connects the low pressure generator c3.

The added pipe of refrigerant vapor from the evaporator e3 connects the new absorption-evaporator 2. The pipe of the liquid refrigerant from the evaporator e3 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber f3, the condenser d3 and the new absorber 1 provide heat to the heated medium separately. The new absorber 1 becomes the adjacent high-temperature heating-side of the absorber f3 or the condenser d3. At last we get the three-terminal heating absorption heat pump with additional high-temperature heating-side based on the solution concatenated loops single-stage triple-effect heat pump with two-terminal heating.

Shown in FIG. 27, according to the method provided by the invention, the process of adding a high-temperature heating-side to the concatenated loops single-stage triple-effect absorption heat pump which provides refrigerant vapor from evaporator to absorber can be as follows:

On the solution concatenated loops single-stage triple-effect absorption heat pump which consists of the high pressure generator a3, the medium pressure generator b3, the low pressure generator c3, the condenser d3, the evaporator e3, the absorber f3, the throttle g3, the second throttle h3, the third throttle i3, the solution pump j3, the solution heat exchanger m3, the second solution heat exchanger n3, the third solution heat exchanger o3, we add the new absorber 1, the new absorption-evaporator 2, the new liquid refrigerant pump 7, the new solution pump 4, the new solution heat exchanger 5 and the second new solution heat exchanger 6.

The added pipe of concentrated solution from the low pressure generator c3 passes through the second new solution heat exchanger 6 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and the second new solution heat exchanger 6 and then connects the medium pressure generator b3.

The added pipe of refrigerant vapor from the evaporator e3 connects the new absorption-evaporator 2. The pipe of the liquid refrigerant from the evaporator e3 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber f3, the condenser d3 and the new absorber 1 provide heat to the heated medium separately. The new absorber 1 becomes the adjacent high-temperature heating-side of the absorber f3 or the condenser d3. At last we get the three-terminal heating absorption heat pump with additional high-temperature heating-side based on the solution concatenated loops single-stage triple-effect heat pump with two-terminal heating.

Shown in FIG. 28, according to the method provided by the invention, the process of adding a high-temperature heating-side to the concatenated loops single-stage triple-effect absorption heat pump which provides refrigerant vapor from evaporator to absorber can be as follows:

On the solution concatenated loops single-stage triple-effect absorption heat pump which consists of the high pressure generator a3, the medium pressure generator b3, the low pressure generator c3, the condenser d3, the evaporator e3, the absorber f3, the throttle g3, the second throttle h3, the third throttle i3, the solution pump j3, the solution heat exchanger m3, the second solution heat exchanger n3, the third solution heat exchanger o3 and recirculation pump of the liquid refrigerant p3, we add the new absorber 1, the new absorption-evaporator 2, the new throttle 3, the new solution pump 4 and the new solution heat exchanger 5.

Change the pipe from the absorber f3 passes through the solution pump j3, the second the solution heat exchanger m3, the second solution heat exchanger n3, the third solution heat exchanger o3 and then connects the high pressure generator a3 into that the pipe from the absorber f3 passes through the solution pump j3, the second the solution heat exchanger m3, the second solution heat exchanger n3, the third solution heat exchanger o3 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the high pressure generator a3.

The added pipe of refrigerant vapor from the evaporator e3 connects the new absorption-evaporator 2. The pipe of the liquid refrigerant from the condenser d3 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber f3, the condenser d3 and the new absorber 1 provide heat to the heated medium separately. The new absorber 1 becomes the adjacent high-temperature heating-side of the absorber f3 or the condenser d3. At last we get the three-terminal heating absorption heat pump with additional high-temperature heating-side based on the solution concatenated loops single-stage triple-effect heat pump with two-terminal heating.

Shown in FIG. 29 is absorption heat pump with three-terminal heating which provides refrigerant vapor from evaporator to absorber and is based on the concatenated loops single-stage triple-effect absorption heat pump with additional high-temperature heating-side. Compared with FIG. 28, there are two differences between them. Firstly, it uses the new liquid refrigerant pump 7 in FIG. 29 instead of the new throttle 3 used in FIG. 28. And the pipe of the liquid refrigerant from the evaporator e3 passes through the new liquid refrigerant pump 7 and then connects the new absorption-evaporator 2. After that, the pipe of refrigerant vapor the new absorption-evaporator 2 connects the new absorber 1. Secondly, there is not recirculation pump of the liquid refrigerant p3 in FIG. 29.

Shown in FIG. 30, according to the method provided by the invention, the process of adding a high-temperature heating-side to the concatenated loops single-stage triple-effect absorption heat pump which provides refrigerant vapor from evaporator to absorber can be as follows:

On the solution concatenated loops single-stage triple-effect absorption heat pump which consists of the high pressure generator a3, the medium pressure generator b3, the low pressure generator c3, the condenser d3, the evaporator e3, the absorber f3, the throttle g3, the second throttle h3, the third throttle i3, the solution pump j3, the solution heat exchanger m3, the second solution heat exchanger n3, the third solution heat exchanger o3, we add the new absorber 1, the new absorption-evaporator 2, the new liquid refrigerant pump 7, the new solution pump 4, the new solution heat exchanger 5 and the second new solution pump 8.

Change the pipe from the absorber f3 passes through the solution pump j3, the second the solution heat exchanger m3, the second solution heat exchanger n3, the third solution heat exchanger o3 and then connects the high pressure generator a3 into that the pipe from the absorber f3 passes through the solution pump j3, the second the solution heat exchanger m3, the second solution heat exchanger n3, the third solution heat exchanger o3, the new solution heat exchanger 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8 and the new solution heat exchanger 5 and then connects the high pressure generator a3.

The added pipe of refrigerant vapor from the evaporator e3 connects the new absorption-evaporator 2. The pipe of the liquid refrigerant from the evaporator e3 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber f3, the condenser d3 and the new absorber 1 provide heat to the heated medium separately. The new absorber 1 becomes the adjacent high-temperature heating-side of the absorber f3 or the condenser d3. At last we get the three-terminal heating absorption heat pump with additional high-temperature heating-side based on the solution concatenated loops single-stage triple-effect heat pump with two-terminal heating.

Shown in FIG. 31, according to the method provided by the invention, the process of adding a high-temperature heating-side to the solution parallel loop single-stage triple-effect absorption heat pump which provides refrigerant vapor from evaporator to absorber can be as follows:

On the solution parallel loop single-stage triple-effect absorption heat pump which consists of the high pressure generator a3, the medium pressure generator b3, the low pressure generator c3, the condenser d3, the evaporator e3, the absorber f3, the throttle g3, the second throttle h3, the third throttle i3, the solution pump j3, the solution heat exchanger m3, the second solution heat exchanger n3, the third solution heat exchanger o3 and recirculation pump of the liquid refrigerant p3, we add the new absorber 1, the new absorption-evaporator 2, the new throttle 3, the new solution pump 4, the new solution heat exchanger 5 and the second new solution heat exchanger 6.

The added pipe of concentrated solution from the low pressure generator c3 passes through the second new solution heat exchanger 6 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and the second new solution heat exchanger 6 and then connects the low pressure generator c3.

The added pipe of refrigerant vapor from the evaporator e3 connects the new absorption-evaporator 2. The pipe of the liquid refrigerant from the condenser d3 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber f3, the condenser d3 and the new absorber 1 provide heat to the heated medium separately. The new absorber 1 becomes the adjacent high-temperature heating-side of the absorber f3 or the condenser d3. At last we get the three-terminal heating absorption heat pump with additional high-temperature heating-side based on the solution parallel loop single-stage triple-effect heat pump with two-terminal heating.

Shown in FIG. 32, according to the method provided by the invention, the process of adding a high-temperature heating-side to the parallel loop single-stage triple-effect absorption heat pump which provides refrigerant vapor from evaporator to absorber can be as follows:

On the solution parallel loop single-stage triple-effect absorption heat pump which consists of the high pressure generator a3, the medium pressure generator b3, the low pressure generator c3, the condenser d3, the evaporator e3, the absorber f3, the throttle g3, the second throttle h3, the third throttle i3, the solution pump j3, the solution heat exchanger m3, the second solution heat exchanger n3, the third solution heat exchanger o3, we add the new absorber 1, the new absorption-evaporator 2, the new liquid refrigerant pump 7, the new solution pump 4, the new solution heat exchanger 5.

Change the pipe from the absorber f3 passes through the solution pump j3, the third solution heat exchanger o3 and then connects the low pressure generator c3 into the pipe from the absorber f3 passes through the solution pump j3, the third solution heat exchanger o3 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the low pressure generator c3.

The added pipe of refrigerant vapor from the evaporator e3 connects the new absorption-evaporator 2. The pipe of the liquid refrigerant from the evaporator e3 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber f3, the condenser d3 and the new absorber 1 provide heat to the heated medium separately. The new absorber 1 becomes the adjacent high-temperature heating-side of the absorber f3 or the condenser d3. At last we get the three-terminal heating absorption heat pump with additional high-temperature heating-side based on the solution parallel loop single-stage triple-effect heat pump with two-terminal heating.

Shown in FIG. 33, according to the method provided by the invention, the process of adding a high-temperature heating-side to the parallel loop single-stage triple-effect absorption heat pump which provides refrigerant vapor from evaporator to absorber can be as follows:

On the solution parallel loop single-stage triple-effect absorption heat pump which consists of the high pressure generator a3, the medium pressure generator b3, the low pressure generator c3, the condenser d3, the evaporator e3, the absorber f3, the throttle g3, the second throttle h3, the third throttle i3, the solution pump j3, the solution heat exchanger m3, the second solution heat exchanger n3, the third solution heat exchanger o3 and recirculation pump of the liquid refrigerant p3, we add the new absorber 1, the new absorption-evaporator 2, the new throttle 3, the new solution pump 4, the new solution heat exchanger 5 and the second new solution pump 8.

Change the pipe from the absorber f3 passes through the solution pump j3, the third solution heat exchanger o3 and then connects the low pressure generator c3 into that the pipe from the absorber f3 passes through the solution pump j3, the third solution heat exchanger o3 and the new solution heat exchanger 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8 and the new solution heat exchanger 5 and then connects the low pressure generator c3.

The added pipe of refrigerant vapor from the evaporator e3 connects the new absorption-evaporator 2. The pipe of the liquid refrigerant from the condenser d3 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber f3, the condenser d3 and the new absorber 1 provide heat to the heated medium separately. The new absorber 1 becomes the adjacent high-temperature heating-side of the absorber f3 or the condenser d3. At last we get the three-terminal heating absorption heat pump with additional high-temperature heating-side based on the solution parallel loop single-stage triple-effect heat pump with two-terminal heating.

Shown in FIG. 34, according to the method provided by the invention, the process of adding a high-temperature heating-side to the single-generator two-stage absorption heat pump which provides refrigerant vapor from absorption-evaporator to absorber can be as follows:

Structurally, on the single-generator two-stage absorption heat pump which consists of the generator a4, the condenser b4, the evaporator c4, the absorption-evaporator e4, the absorber d4, the solution pump f4, the throttle g4, the second throttle h4, the solution heat exchanger i4, the second solution heat exchanger j4 and provides refrigerant vapor from the absorption-evaporator e4 to the absorber d4, we add the new absorber 1, the new absorption-evaporator 2, the new throttle 3, the new solution pump 4, the new solution heat exchanger 5 and new the second heat exchanger 6.

The added pipe of concentrated solution from the generator a4 passes through new the second solution heat pump 6 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and new the second heat exchanger 6 and then connects the generator a4.

The added pipe of refrigerant vapor from absorption-evaporator d4 connects the new absorption-evaporator 2. The pipe of the liquid refrigerant from the condenser b4 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber d4, the condenser b4 and the new absorber 1 provide heat to the heated medium separately. The new absorber 1 becomes the adjacent high-temperature heating-side of the absorber d4 or the condenser b4. At last we get the three-terminal heating absorption heat pump with additional high-temperature heating-side based on the single-generator two-stage absorption heat pump with two-terminal heating.

On the process, the process of new heat pump is as follows: the dilute solution from the new absorption-evaporator 2 and a part of dilute solution from the absorption-evaporator e4 enter the generator a4. The solution in generator releases refrigerant vapor under the action of actuated-hot resources. And then, the refrigerant vapor enters the condenser b4 and releases heat to heated medium changing into the liquid refrigerant. The liquid refrigerant can be divided into three parts. One part flows through the throttle g4 and enters the evaporator c4 and absorbs heat changing into refrigerant vapor which is provided to the absorption-evaporator e4. Another part flows through the second throttle h4 and then enters the absorption-evaporator e4 and absorbs heat changing into refrigerant vapor which is provided to the new absorption-evaporator 2. The other part flows through the new throttle 3 and then enters the new absorption-evaporator 2 and absorbs heat changing into refrigerant vapor which is provided to the new absorber 1. The concentrated solution in the generator a4 flows through the second new solution heat exchanger 6 and then enters the new absorber 1. In the new absorber 1, it absorbs refrigerant vapor came from the new absorption-evaporator 2 and releases heat to heated medium. The dilute solution in the new absorber 1 flows through the new solution heat exchanger 5 and then enters the new absorption-evaporator 2. In the new absorption-evaporator 2, it absorbs refrigerant vapor came from the absorption-evaporator e4 and heats the liquid refrigerant changing refrigerant vapor which is provided to the new absorber 1. The dilute solution in the new absorption-evaporator 2 flows through the new solution pump 4, the new solution heat exchanger 5 and the second new solution heat exchanger 6 and then return the generator a4.

Shown in FIG. 35, according to the method provided by the invention, the process of adding a high-temperature heating-side to the single-generator two-stage absorption heat pump which provides refrigerant vapor from absorption-evaporator to absorber can be as follows:

On the single-generator two-stage absorption heat pump which consists of the generator a4, the condenser b4, the evaporator c4, the absorption-evaporator e4, the absorber d4, the solution pump f4, the throttle g4, the liquid refrigerant pump k4, the solution heat exchanger i4, the second solution heat exchanger j4 and provides refrigerant vapor from the absorption-evaporator e4 to the absorber d4, we add the new absorber 1, the new absorption-evaporator 2, the new liquid refrigerant pump 7, the new solution pump 4, the new solution heat exchanger 5 and the second new solution heat exchanger 6.

The added pipe of concentrated solution from the generator a4 passes through new the second solution heat pump 6 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and new the second heat exchanger 6 and then connects the generator a4.

The added pipe of refrigerant vapor from the absorption-evaporator e4 connects the new absorption-evaporator 2. The pipe of the liquid refrigerant from evaporator e4 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber d4, the condenser b4 and the new absorber 1 provide heat to the heated medium separately. The new absorber 1 becomes the adjacent high-temperature heating-side of the absorber d4 or the condenser b4. At last we get the three-terminal heating absorption heat pump with additional high-temperature heating-side based on the single-generator two-stage absorption heat pump with two-terminal heating.

Shown in FIG. 36, according to the method provided by the invention, the process of adding a high-temperature heating-side to the single-generator two-stage absorption heat pump which provides refrigerant vapor from absorption-evaporator to absorber can be as follows:

On the single-generator two-stage absorption heat pump which consists of the generator a4, the condenser b4, the evaporator c4, the absorption-evaporator e4, the absorber d4, the solution pump f4, the throttle g4, the second throttle h4, the solution heat exchanger i4, the second solution heat exchanger j4 and provides refrigerant vapor from the absorption-evaporator e4 to the absorber d4, we add the new absorber 1, the new absorption-evaporator 2, the new throttle 3, the new solution pump 4, the new solution heat exchanger 5.

Change the solution pipe from the absorption-evaporator e4 passes through the solution pump f4, the solution heat exchanger i4, the second solution heat exchanger j4 and then connects the generator a4 into that the solution pipe from the absorption-evaporator e4 passes through the solution pump f4, the solution heat exchanger i4, the second solution heat exchanger j4 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the generator a4.

The added pipe of refrigerant vapor from the absorption-evaporator e4 connects the new absorption-evaporator 2. The pipe of the liquid refrigerant from condenser c4 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber d4, the condenser b4 and the new absorber 1 provide heat to the heated medium separately. The new absorber 1 becomes the adjacent high-temperature heating-side of the absorber d4 or the condenser b4. At last we get the three-terminal heating absorption heat pump with additional high-temperature heating-side based on the single-generator two-stage absorption heat pump with two-terminal heating.

Shown in FIG. 37, according to the method provided by the invention, the process of adding a high-temperature heating-side to the single-generator two-stage absorption heat pump which provides refrigerant vapor from absorption-evaporator to absorber can be as follows:

On the single-generator two-stage absorption heat pump which consists of the generator a4, the condenser b4, the evaporator c4, the absorption-evaporator e4, the absorber d4, the solution pump f4, the throttle g4, the liquid refrigerant pump k4, the solution heat exchanger i4, the second solution heat exchanger j4 and provides refrigerant vapor from the absorption-evaporator e4 to the absorber d4, we add the new absorber 1, the new absorption-evaporator 2, the new liquid refrigerant pump 7, the new solution pump 4, the new solution heat exchanger 5.

Change the solution pipe from the absorption-evaporator e4 passes through the solution pump f4, the solution heat exchanger i4, the second solution heat exchanger j4 and then connects the generator a4 into that the solution pipe from the absorption-evaporator e4 passes through the solution pump f4, the solution heat exchanger i4, the second solution heat exchanger j4 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the generator a4.

The added pipe of refrigerant vapor from the absorption-evaporator e4 connects the new absorption-evaporator 2. The pipe of the liquid refrigerant from the evaporator c4 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The absorber d4, the condenser b4 and the new absorber 1 provide heat to the heated medium separately. The new absorber 1 becomes the adjacent high-temperature heating-side of the absorber d4 or the condenser b4. At last we get the three-terminal heating absorption heat pump with additional high-temperature heating-side based on the single-generator two-stage absorption heat pump with two-terminal heating.

Shown in FIG. 38, according to the method provided by the invention, the process of adding a high-temperature heating-side to the single-generator two-stage absorption heat pump which provides refrigerant vapor from absorption-evaporator to absorber can be as follows:

On the single-generator two-stage absorption heat pump which consists of the generator a4, the condenser b4, the evaporator c4, the absorption-evaporator e4, the absorber d4, the solution pump f4, the throttle g4, the second throttle h4, the solution heat exchanger i4, the second solution heat exchanger j4 and provides refrigerant vapor from the absorption-evaporator e4 to the absorber d4, we add the new absorber 1, the new absorption-evaporator 2, the new throttle 3, the new solution pump 4, the new solution heat exchanger 5 and the second new solution pump 8.

The added pipe of concentrated solution from the generator a4 passes through new solution heat pump 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the new solution heat exchanger 5 and the second new solution pump 8 and then connects the generator a4.

The added pipe of refrigerant vapor from the absorption-evaporator e4 connects the new absorption-evaporator 2. The pipe of the liquid refrigerant from the condenser b4 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber d4, the condenser b4 and the new absorber 1 provide heat to the heated medium separately. The new absorber 1 becomes the adjacent high-temperature heating-side of the absorber d4 or the condenser b4. At last we get the three-terminal heating absorption heat pump with additional high-temperature heating-side based on the single-generator two-stage absorption heat pump with two-terminal heating.

Shown in FIG. 39, according to the method provided by the invention, the process of adding a high-temperature heating-side to the single-generator two-stage absorption heat pump which provides refrigerant vapor from absorption-evaporator to absorber can be as follows:

On the single-generator two-stage absorption heat pump which consists of the generator a4, the condenser b4, the evaporator c4, the absorption-evaporator e4, the absorber d4, the solution pump f4, the throttle g4, the liquid refrigerant pump k4, the solution heat exchanger i4, the second solution heat exchanger j4 and provides refrigerant vapor from the absorption-evaporator e4 to the absorber d4, we add the new absorber 1, the new absorption-evaporator 2, the new throttle 3, the new solution pump 4, the new solution heat exchanger 5 and the second new solution pump 8.

Change the solution pipe from the absorption-evaporator e4 passes through the solution pump f4, the solution heat exchanger i4, the second solution heat exchanger j4 and then connects the generator a4 into that the solution pipe from the absorption-evaporator e4 passes through the solution pump f4, the solution heat exchanger i4, the second solution heat exchanger j4, the new solution heat exchanger 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8, the new solution heat exchanger 5 and then connects the generator a4.

The added pipe of refrigerant vapor from the absorption-evaporator e4 connects the new absorption-evaporator 2. The pipe of the liquid refrigerant from the condenser b4 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The absorber d4, the condenser b4 and the new absorber 1 provide heat to the heated medium separately. The new absorber 1 becomes the adjacent high-temperature heating-side of the absorber d4 or the condenser b4. At last we get the three-terminal heating absorption heat pump with additional high-temperature heating-side based on the single-generator two-stage absorption heat pump with two-terminal heating.

Shown in FIG. 40, according to the method provided by the invention, the process of adding a high-temperature heating-side to the double-generator two-stage absorption heat pump which provides refrigerant vapor from the low pressure generator to the high pressure generator can be as follows:

Structurally, on the double-generator two-stage absorption heat pump which consists of the high pressure generator a5, the condenser b5, the evaporator c5, the high pressure absorber d5, the throttle e5, the solution pump f5, the solution heat exchanger g5, the low pressure generator h5, the low pressure absorber i5, the second solution pump j5, the second solution heat exchanger k5 and recirculation pump of the liquid refrigerant pump l5 and provides refrigerant vapor from the low pressure generator to the high pressure generator, we add the new absorber 1, the new absorption-evaporator 2, the new throttle 3, the new solution pump 4, the new solution heat exchanger 5 and new the second heat exchanger 6.

The added pipe of concentrated solution from the high pressure generator a5 passes through new the second solution heat pump 6 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and new the second heat exchanger 6 and then connects the high pressure generator a5.

The added pipe of refrigerant vapor from the low pressure generator h5 connects the new absorption-evaporator 2. The pipe of the liquid refrigerant from the condenser b5 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The low pressure absorber i5, the high pressure absorber d5, the condenser b5 and the new absorber 1 provide heat to the heated medium separately. The new absorber 1 becomes the adjacent high-temperature heating-side of the high pressure absorber d5 or the condenser b5. At last we get the four-terminal heating absorption heat pump with additional high-temperature heating-side based on the double-generator two-stage absorption heat pump with three-terminal heating.

On the process, the process of new heat pump is as follows: the pipe of concentrated solution from the high pressure generator a5 passes through new the second solution heat pump 6 and then connects the new absorber 1 and absorbs the refrigerant vapor came from the new absorption-evaporator 2 and releases heat to heated medium. After that the concentration of the new absorber 1 decreases, the solution flows through the new solution heat exchanger 5 and then enters the new absorption-evaporator 2 and absorbs the refrigerant vapor came from the low pressure generator h5 and releases heat to refrigerant medium. After that the concentration in the new absorption-evaporator 2 decreases again, the solution flows through the new solution pump 4, the new solution heat exchanger 5 and the second new solution heat exchanger 6 and then enters the high pressure generator a5. The dilute solution in the high pressure generator a5 releases refrigerant vapor under the action of actuated-hot. The refrigerant vapor enters the condenser b5 and releases heat to heated medium changing into the liquid refrigerant. One part of the liquid refrigerant flows through the new throttle 3 and then enters the new absorption-evaporator 2 and absorbs heat changing into refrigerant vapor which is provided to the new absorber 1. The other part flows through the throttle e5 and then enters the evaporator c5 and absorbs waste heat changing into refrigerant vapor which is provided to the low pressure absorber i5. And the refrigerant vapor is absorbed by the solution came from the low pressure generator h5. Then, the solution flows through the second solution pump j5, the second solution heat exchanger k5 and then enters the low pressure generator h5. After that, it is heated and released refrigerant vapor which is provided to the new absorption-evaporator 2.

Shown in FIG. 41 is the absorption heat pump with three-terminal heating which provides refrigerant vapor from the low pressure generator to the high pressure generator and is based on the double-generator two-stage absorption heat pump with additional high-temperature heating-side. Compared with FIG. 40, there are two differences between the two. Firstly, it uses the new liquid refrigerant pump 7 in FIG. 41 instead of the new throttle 3 used in FIG. 40. And the pipe of the liquid refrigerant from the evaporator c5 passes through the new liquid refrigerant pump 7 and then connects the new absorption-evaporator 2. After that, the pipe of refrigerant vapor the new absorption-evaporator 2 connects the new absorber 1. Secondly, the double-generator two-stage absorption heat pump in FIG. 41 doesn't adopt the recirculation pump of the liquid refrigerant l5.

Shown in FIG. 42, according to the method provided by the invention, the process of adding a high-temperature heating-side to the double-generator two-stage absorption heat pump which provides refrigerant vapor from the low pressure generator to the high pressure generator can be as follows:

On the double-generator two-stage absorption heat pump which consists of the high pressure generator a5, the condenser b5, the evaporator c5, the high pressure absorber d5, the throttle e5, the solution pump f5, the solution heat exchanger g5, the low pressure generator h5, the low pressure absorber i5, the second solution pump j5, the second solution heat exchanger k5 and recirculation pump of the liquid refrigerant l5 and provides refrigerant vapor from the low pressure generator to the high pressure generator, we add the new absorber 1, the new absorption-evaporator 2, the new throttle 3, the new solution pump 4, the new solution heat exchanger 5.

Change the solution pipe from the high pressure generator d5 passes through solution pump f5, the solution heat exchanger g5 and then connects the high pressure generator a5 into that the solution pipe from the high pressure generator d5 passes through solution pump f5, the solution heat exchanger g5 and then connects the new absorber 1. The pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the high pressure generator a5.

The added pipe of refrigerant vapor from the low pressure generator h5 connects the new absorption-evaporator 2. The pipe of the liquid refrigerant from the condenser b5 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The low pressure absorber i5, the high pressure absorber d5, the condenser b5 and the new absorber 1 provide heat to the heated medium separately. The new absorber 1 becomes the adjacent high-temperature heating-side of the high pressure absorber d5 or the condenser b5. At last we get the four-terminal heating absorption heat pump with additional high-temperature heating-side based on the double-generator two-stage absorption heat pump with three-terminal heating.

Shown in FIG. 43 is also the absorption heat pump with three-terminal heating which provides refrigerant vapor from the low pressure generator to the high pressure generator and is based on the double-generator two-stage absorption heat pump with additional high-temperature heating-side. Compared with FIG. 42, there are two differences between the two. Firstly, it uses the new liquid refrigerant pump 7 in FIG. 43 instead of the new throttle 3 used in FIG. 42. And the pipe of the liquid refrigerant from the evaporator c5 passes through the new liquid refrigerant pump 7 and then connects the new absorption-evaporator 2. After that, the pipe of refrigerant vapor the new absorption-evaporator 2 connects the new absorber 1. Secondly, the double-generator two-stage absorption heat pump in FIG. 43 doesn't adopt the recirculation pump of the liquid refrigerant l5.

Shown in FIG. 44, according to the method provided by the invention, the process of adding a high-temperature heating-side to the double-generator two-stage absorption heat pump which provides refrigerant vapor from the low pressure generator to the high pressure generator can also be as follows:

On the double-generator two-stage absorption heat pump which consists of the high pressure generator a5, the condenser b5, the evaporator c5, the high pressure absorber d5, the throttle e5, the solution pump f5, the solution heat exchanger g5, the low pressure generator h5, the low pressure absorber i5, the second solution pump j5, the second solution heat exchanger k5 and provides refrigerant vapor from the low pressure generator to the high pressure generator, we add the new absorber 1, the new absorption-evaporator 2, the new liquid refrigerant pump 7, the new solution pump 4, the new solution heat exchanger 5 and the second new solution pump 8.

The added pipe of concentrated solution from the high pressure generator a5 passes through the new solution heat exchanger 5 and then the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8, the new solution heat exchanger 5 and then connects the high pressure generator a5.

The added pipe of refrigerant vapor from the low pressure generator h5 connects the new absorption-evaporator 2. The pipe of the liquid refrigerant from the evaporator c5 passes through the new liquid refrigerant pump 7 connects the new absorption-evaporator 2. After that, the pipe of refrigerant vapor from the new absorption-evaporator 2 connects the new absorber 1. At the same time, the pipe of heated medium from the new absorber 1 connects external.

The low pressure absorber i5, the high pressure absorber d5, the condenser b5 and the new absorber 1 provide heat to the heated medium separately. The new absorber 1 becomes the adjacent high-temperature heating-side of the high pressure absorber d5 or the condenser b5. At last we get the four-terminal heating absorption heat pump with additional high-temperature heating-side based on the double-generator two-stage absorption heat pump with three-terminal heating.

In this technical scheme, we can also change the solution pipe from the high pressure generator d5 passes through solution pump f5, the solution heat exchanger g5 and then connects the high pressure generator a5 into that the solution pipe from the high pressure generator d5 passes through solution pump f5, the solution heat exchanger g5, the new solution heat exchanger 5 and then connects the new absorption-evaporator 2. The pipe of dilute solution from the new absorption-evaporator 2 passes through the new solution pump 4 and then connects the new absorber 1. The pipe of dilute solution from the new absorber 1 passes through the second new solution pump 8, the new solution heat exchanger 5 and then connects the high pressure generator a5. We can adopt the new liquid refrigerant pump 7 instead of the new throttle 3. And the added pipe of the liquid refrigerant from the condenser b5 passes through the new throttle 3 and then connects the new absorption-evaporator 2. After that, the pipe of refrigerant vapor from the new absorption-evaporator 2 connects the new absorber 1.

Shown in FIG. 45, according to the method provided by the invention, the process of adding a high-temperature heating-side to the two-generator two-stage absorption heat pump which provides refrigerant vapor to the high pressure absorber and the low pressure condenser from the low pressure generator can also be as follows:

Structurally, on the two-generator two-stage absorption heat pump which consists of the high pressure generator a6, the high pressure condenser b6, the low pressure condenser c6, the evaporator d6, the low pressure absorber e6, the low pressure generator f6, the high pressure absorber g6, the solution pump h6, the second solution pump i6, the throttle j6, the second throttle k6, the solution heat exchanger l6, the second solution heat exchanger m6, recirculation pump of the liquid refrigerant pump n6 and provides refrigerant vapor to the high pressure absorber and the low pressure condenser from the low pressure generator, we add the new absorber 1, the new absorption-evaporator 2, the new throttle 3, the new solution pump 4, the new solution heat exchanger 5, the second new solution heat exchanger 6.

And the added pipe of concentrated solution from the high pressure generator a6 passes through the second new solution heat exchanger 6 and then connects the new absorber 1. And the pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and the second new solution heat exchanger 6 and then connects the high pressure generator a6.

The added pipe of refrigerant vapor from the low pressure generator f6 connects the new absorption-evaporator 2. The pipe of the liquid refrigerant from the high pressure condenser b6 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The low pressure absorber e6, the low pressure condenser c6, the high pressure absorber g6, the high pressure condenser b6 and the new absorber 1 supply heat to the heated medium separately. The new absorber 1 becomes the adjacent high-temperature heating-side of the high pressure absorber g6 or the high pressure condenser b6. At last we get the five-terminal heating absorption heat pump with high-temperature heating-side based on four-terminal heating two-stage heat pump.

On the process, the new added process of heat pump is as follows:

The concentrated solution of the high pressure generator a6 flows through the second new solution heat exchanger 6 and then enters the new absorber 1. In the new absorber 1, it absorbs refrigerant vapor came from the new absorption-evaporator 2 and releases heat to heated medium. After that the concentration in the new absorber 1 decreases, the solution flows through the new solution heat exchanger 5 and then enters the new absorption-evaporator 2 and absorbs the refrigerant vapor came from the low pressure generator f6 and releases heat to the refrigerant medium which flows through it. After that the concentration in the new absorption-evaporator 2 decreases again, the solution flows through the new solution pump 4, the new solution heat exchanger 5 and the second new solution heat exchanger 6 and then enters the high pressure generator b6. The dilute solution in the high pressure generator b6 releases refrigerant vapor which enters the high pressure condenser b6 under the action of actuated-hot resources and then it releases heat to heated medium changing into the liquid refrigerant.

The liquid refrigerant in the high pressure condenser b6 can be divided into two parts. One of the two parts flows through the new throttle 3 and enters the new absorption-evaporator 2 and absorbs heat changing into refrigerant vapor which is provided to the new absorber 1. The other part flows through the throttle j6, the low pressure condenser c6, the second throttle k6, the evaporator d6 and then enters the low pressure absorber e6. In the low pressure absorber e6, the refrigerant vapor is absorbed by the dilute solution. The refrigerant vapor is released by heating in the low pressure generator f6 and is given to the new absorption-evaporator 2.

Shown in FIG. 46, it is a five-terminal heating absorption heat pump with high-temperature heating-side based on two-generator two-stage absorption heat pump which provides refrigerant vapor to the high pressure absorber and the low pressure condenser from the low pressure generator. Compared with FIG. 45, there are two differences between the two. Firstly, FIG. 46 adopts the new liquid refrigerant pump 7 instead of the new throttle 3. And after that the pipe of the liquid refrigerant from the evaporator d6 passes through the new liquid refrigerant pump 7 and then connects the new absorption-evaporator 2, the pipe of refrigerant vapor from the new absorption-evaporator 2 connects the new absorber 1. Secondly, the two-generator two-stage heat pump in FIG. 46 doesn't adopt recirculation pump of the liquid refrigerant pump n6.

Shown in FIG. 47, according to the method provided by the invention, the process of adding a high-temperature heating-side to the two-generator two-stage absorption heat pump which provides refrigerant vapor to the high pressure absorber and the low pressure condenser from the low pressure generator can also be as follows:

On the two-generator two-stage absorption heat pump which consists of the high pressure generator a6, the high pressure condenser b6, the low pressure condenser c6, the evaporator d6, the low pressure absorber e6, the low pressure generator f6, the high pressure absorber g6, the solution pump h6, the second solution pump i6, the throttle j6, the second throttle k6, the solution heat exchanger l6, the second solution heat exchanger m6, recirculation pump of the liquid refrigerant pump n6 and provides refrigerant vapor to the high pressure absorber and the low pressure condenser from the low pressure generator, we add the new absorber 1, the new absorption-evaporator 2, the new throttle 3, the new solution pump 4, the new solution heat exchanger 5.

Change the pipe from the high pressure absorber g6 passes through the solution pump h6, the solution heat exchanger l6 and then connects the high pressure generator a6 into that the pipe from the high pressure absorber g6 passes through the solution pump h6, the solution heat exchanger l6 and then connects the new absorber 1. And the pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the high pressure generator a6.

The added pipe of refrigerant vapor from the low pressure generator f6 connects the new absorption-evaporator 2. The pipe of the liquid refrigerant from the high pressure condenser b6 passes through the new throttle 3 connects the new absorption-evaporator 2. After that, the pipe of refrigerant vapor from the new absorption-evaporator 2 connects the new absorber 1. At the same time, the pipe of heated medium from the new absorber 1 connects external.

The low pressure absorber e6, the low pressure condenser c6, the high pressure absorber g6, the high pressure condenser b6 and the new absorber 1 supply heat to the heated medium separately. The new absorber 1 becomes the adjacent high-temperature heating-side of the high pressure absorber g6 or the high pressure condenser b6. At last we get the five-terminal heating absorption heat pump with high-temperature heating-side based on four-terminal heating two-stage heat pump.

Shown in FIG. 48, it is a five-terminal heating absorption heat pump with high-temperature heating-side based on two-generator two-stage absorption heat pump which provides refrigerant vapor to the high pressure absorber and the low pressure condenser from the low pressure generator. Compared with FIG. 47, there are three differences between the two. Firstly, FIG. 48 adopts the new liquid refrigerant pump 7 instead of the new throttle 3. And after that the pipe of the liquid refrigerant from the evaporator d6 passes through the new liquid refrigerant pump 7 and then connects the new absorption-evaporator 2, the pipe of refrigerant vapor from the new absorption-evaporator 2 connects the new absorber 1. Secondly, the two-generator two-stage heat pump in FIG. 48 doesn't adopt recirculation pump of the liquid refrigerant pump n6. Thirdly, in FIG. 47, after that the pipe of the liquid refrigerant in the high pressure condenser b6 passes through the throttle j6 and then connects the low pressure condenser c6, the pipe passes through the second throttle k6 and then connects the evaporator d6 while the high pressure condenser b6 and the low pressure condenser k6 have the pipe of the liquid refrigerant which passes through the throttle j6 and the second throttle k6 and then connects evaporator in FIG. 48.

Shown in FIG. 49, according to the method provided by the invention, the process of adding a high-temperature heating-side to the two-generator two-stage absorption heat pump which provides refrigerant vapor to the high pressure absorber and the low pressure condenser from the low pressure generator can also be as follows:

On the two-generator two-stage absorption heat pump which consists of the high pressure generator a6, the high pressure condenser b6, the low pressure condenser c6, the evaporator d6, the low pressure absorber e6, the low pressure generator f6, the high pressure absorber g6, the solution pump h6, the second solution pump i6, the throttle j6, the second throttle k6, the solution heat exchanger l6, the second solution heat exchanger m6 and provides refrigerant vapor to the high pressure absorber and the low pressure condenser from the low pressure generator, we add the new absorber 1, the new absorption-evaporator 2, new the liquid refrigerant 7, the new solution pump 4, the new solution heat exchanger 5, the second new solution heat pump 8.

Change the pipe from the high pressure absorber g6 passes through the solution pump h6, the solution heat exchanger l6 and then connects the high pressure generator a6 into that the pipe from the high pressure absorber g6 passes through the solution pump h6, the solution heat exchanger l6 and the new solution heat exchanger 5 and then connects the new absorption-evaporator 2. And the pipe of dilute solution from the new absorption-evaporator 2 passes through the new solution pump 4 and then connects the new absorber 1. And the pipe of dilute solution from the new absorber 1 passes through the new solution heat exchanger 5, the second new solution heat pump 8 and then connects the high pressure generator a6.

The added pipe of refrigerant vapor from the low pressure generator f6 connects the new absorption-evaporator 2. The pipe of the liquid refrigerant from the evaporator d6 passes through new the liquid refrigerant 7 connects the new absorption-evaporator 2. After that, the pipe of refrigerant vapor from the new absorption-evaporator 2 connects the new absorber 1. At the same time, the pipe of heated medium from the new absorber 1 connects external.

The low pressure absorber e6, the low pressure condenser c6, the high pressure absorber g6, the high pressure condenser b6 and the new absorber 1 supply heat to the heated medium separately. The new absorber 1 becomes the adjacent high-temperature heating-side of the high pressure absorber g6 or the high pressure condenser b6. At last we get the five-terminal heating absorption heat pump with high-temperature heating-side based on four-terminal heating two-stage heat pump.

Shown in FIG. 50, according to the method provided by the invention, the process of adding a high-temperature heating-side to the two-generator two-stage absorption heat pump which provides refrigerant vapor to absorber from absorption-evaporator and the low pressure generator can also be as follows:

Structurally, on the two-terminal heating two-generator two-stage absorption heat pump which consists of the high pressure generator a7, the condenser b7, the evaporator c7, the absorption-evaporator d7, the low pressure generator e7, the absorber f7, the solution pump g7, the second solution pump h7, the throttle i7, the second throttle j7, the solution heat exchanger k7, the second solution heat exchanger l7, the collection steam-steam separator n7 and provides refrigerant vapor to absorber from absorption-evaporator and the low pressure generator by collection steam-steam separator, we add the new absorber 1, the new absorption-evaporator 2, the new throttle 3, the new solution pump 4, the new solution heat exchanger 5, the second new solution heat exchanger 6.

After that the added pipe of refrigerant vapor from the collection steam-steam separator n7 connects the new absorption-evaporator 2 and the added pipe of the liquid refrigerant from the condenser b7 passes through the new throttle 3 and then connects the new absorption-evaporator 2, the pipe of refrigerant vapor from the new absorption-evaporator 2 connects the new absorber 1. At the same time, the pipe of heated medium from the new absorber 1 connects external.

The absorber f7, the condenser b7 and the new absorber 1 supply heat to the heated medium separately. The new absorber 1 becomes the adjacent high-temperature heating-side of the absorber f7 and the condenser b7. At last we get the three-terminal heating absorption heat pump with high-temperature heating-side based on two-terminal heating two-generator or two-stage heat pump.

On the process, the new added process of heat pump is as follows:

The dilute solution of the new absorption-evaporator 2 enters the high pressure generator a7. In the high pressure generator a7, it releases refrigerant vapor which enters the condenser b7 under the action of actuated-hot resources and gives heat to heated medium changing into the liquid refrigerant. One part of the liquid refrigerant flows through the new throttle 3 and then enters the new absorption-evaporator 2 absorbing heat changing into refrigerant vapor which provides to the new absorber 1. The other part of the liquid refrigerant flows the throttle i7, the second throttle j7 and then enters the generation system of refrigerant vapor which consists of the evaporator c7, the absorption-evaporator d7, the low pressure generator e7, the second solution pump h7, solution heat exchanger l7. The cold agent steam-generating system S produces refrigerant vapor which enters the collection steam-steam separator n7 and is provided to the new absorption-evaporator 2.

Shown in FIG. 51, according to the method provided by the invention, the process of adding a high-temperature heating-side to the two-generator two-stage absorption heat pump which provides refrigerant vapor to absorber from absorption-evaporator and the low pressure generator can also be as follows:

On the two-terminal heating two-generator two-stage absorption heat pump which consists of the high pressure generator a7, the condenser b7, the evaporator c7, the absorption-evaporator d7, the low pressure generator e7, the absorber f7, the solution pump g7, the second solution pump h7, the throttle i7, the liquid refrigerant pump m7, the solution heat exchanger k7, the second solution heat exchanger l7, the liquid refrigerant pump m7, the collection steam-steam separator n7 and provides refrigerant vapor to absorber from absorption-evaporator and the low pressure generator by collection steam-steam separator, we add the new absorber 1, the new absorption-evaporator 2, the new liquid refrigerant pump 7, the new solution pump 4, the new solution heat exchanger 5, the second new solution heat exchanger 6.

And the added pipe of concentrated solution from the high pressure generator a7 passes through the second new solution heat exchanger 6 and then connects the new absorber 1. And the pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and the second new solution heat exchanger 6 and then connects the high pressure generator a7.

After that the added pipe of refrigerant vapor from the collection steam-steam separator n7 connects the new absorption-evaporator 2 and the added pipe of the liquid refrigerant from the evaporator c7 passes through the new liquid refrigerant pump 7 and then connects the new absorption-evaporator 2, the pipe of refrigerant vapor from the new absorption-evaporator 2 connects the new absorber 1. At the same time, the pipe of heated medium from the new absorber 1 connects external.

The absorber f7, the condenser b7 and the new absorber 1 supply heat to the heated medium separately. The new absorber 1 becomes the adjacent high-temperature heating-side of the absorber f7 and the condenser b7. At last we get the three-terminal heating absorption heat pump with high-temperature heating-side based on two-terminal heating two-generator two-stage heat pump.

Shown in FIG. 52, according to the method provided by the invention, the process of adding a high-temperature heating-side to the two-generator two-stage absorption heat pump which provides refrigerant vapor to absorber from absorption-evaporator and the low pressure generator can also be as follows:

On the two-terminal heating two-generator two-stage absorption heat pump which consists of the high pressure generator a7, the condenser b7, the evaporator c7, the absorption-evaporator d7, the low pressure generator e7, the absorber f7, the solution pump g7, the second solution pump h7, the throttle i7, the second throttle j7, the solution heat exchanger k7, the second solution heat exchanger l7, the collection steam-steam separator n7 and provides refrigerant vapor to absorber from absorption-evaporator and the low pressure generator by collection steam-steam separator, we add the new absorber 1, the new absorption-evaporator 2, the new throttle 3, the new solution pump 4, the new solution heat exchanger 5.

Change the pipe from the absorber f7 passes through the solution pump g7, the solution heat exchanger k7 and then connects the high pressure generator a7 into that the pipe from the absorber f7 passes through the solution pump g7, the solution heat exchanger k7 and then connects the new absorber 1. And the pipe of dilute solution from the new absorber 1 passes through the new solution heat exchanger 5 and then connects the new absorption-evaporator 2. The pipe of dilute solution from the new absorption-evaporator 2 passes through the new solution pump 4, the new solution heat exchanger 5 and then connects the high pressure generator a7.

After that the added pipe of refrigerant vapor from the collection steam-steam separator n7 connects the new absorption-evaporator 2 and the added pipe of the liquid refrigerant from the condenser b7 passes through the new throttle 3 and then connects the new absorption-evaporator 2, the pipe of refrigerant vapor from the new absorption-evaporator 2 connects the new absorber 1. At the same time, the pipe of heated medium from the new absorber 1 connects external.

The absorber f7, the condenser b7 and the new absorber 1 supply heat to the heated medium separately. The new absorber 1 becomes the adjacent high-temperature heating-side of the absorber f7 and the condenser b7. At last we get the three-terminal heating absorption heat pump with high-temperature heating-side based on two-terminal heating two-generator two-stage heat pump.

Shown in FIG. 53, it is a three-terminal heating absorption heat pump with high-temperature heating-side based on two-generator two-stage absorption heat pump which provides refrigerant vapor to absorber from absorption-evaporator and the low pressure generator. Compared with FIG. 52, there are two differences between the two. Firstly, FIG. 53 adopts the liquid refrigerant pump m7 instead of the second throttle j7 which is used in FIG. 52. Secondly, in FIG. 52, after that the pipe of the liquid refrigerant in the condenser b7 passes through the second throttle j7 and then connects the absorption-evaporator d7, the pipe of refrigerant vapor from the absorption-evaporator d7 connects the collection steam-steam separator n7 while the evaporator c7 have the pipe of the liquid refrigerant which passes through the liquid refrigerant pump m7 and then enters the absorption-evaporator d7 which has the pipe of refrigerant vapor connecting the collection steam-steam separator n7 in FIG. 53.

Shown in FIG. 54, according to the method provided by the invention, the process of adding a high-temperature heating-side to the two-generator two-stage absorption heat pump which provides refrigerant vapor to absorber from absorption-evaporator and the low pressure generator can also be as follows:

On the two-terminal heating two-generator two-stage absorption heat pump which consists of the high pressure generator a7, the condenser b7, the evaporator c7, the absorption-evaporator d7, the low pressure generator e7, the absorber f7, the solution pump g7, the second solution pump h7, the throttle i7, the second throttle j7, the solution heat exchanger k7, the second solution heat exchanger l7, the collection steam-steam separator n7 and provides refrigerant vapor to absorber from absorption-evaporator and the low pressure generator by collection steam-steam separator, we add the new absorber 1, the new absorption-evaporator 2, the new throttle 3, the new solution pump 4, the new solution heat exchanger 5, the second new solution pump 8.

And the added pipe of concentrated solution from the high pressure generator a7 passes through the new solution heat exchanger 5 and then connects the new absorption-evaporator 2. And the pipe of dilute solution from the new absorption-evaporator 2 passes through the new solution pump 4 and then connects the new absorber 1. And the pipe of dilute solution from the new absorber 1 passes through the second new solution pump 8, the new solution heat exchanger 5 and then connects the high pressure generator a7.

After that the added pipe of refrigerant vapor from the collection steam-steam separator n7 connects the new absorption-evaporator 2 and the added pipe of the liquid refrigerant from the condenser b7 passes through the new throttle 3 and then connects the new absorption-evaporator 2, the pipe of refrigerant vapor from the new absorption-evaporator 2 connects the new absorber 1. At the same time, the pipe of heated medium from the new absorber 1 connects external.

The absorber f7, the condenser b7 and the new absorber 1 supply heat to the heated medium separately. The new absorber 1 becomes the adjacent high-temperature heating-side of the absorber f7 and the condenser b7. At last we get the three-terminal heating absorption heat pump with high-temperature heating-side based on two-terminal heating two-generator two-stage heat pump.

Shown in FIG. 55, according to the method provided by the invention, the process of adding a high-temperature heating-side to the two-generator two-stage absorption heat pump which provides refrigerant vapor to absorber from absorption-evaporator and the low pressure generator can also be as follows:

On the two-terminal heating two-generator two-stage absorption heat pump which consists of the high pressure generator a7, the condenser b7, the evaporator c7, the absorption-evaporator d7, the low pressure generator e7, the absorber f7, the solution pump g7, the second solution pump h7, the throttle i7, the liquid refrigerant pump m7, the solution heat exchanger k7, the second solution heat exchanger l7, the liquid refrigerant pump m7, the collection steam-steam separator n7 and provides refrigerant vapor to absorber from absorption-evaporator and the low pressure generator by collection steam-steam separator, we add the new absorber 1, the new absorption-evaporator 2, the new liquid refrigerant pump 7, the new solution pump 4, the new solution heat exchanger 5, the second new solution pump 8.

Change the pipe from the absorber f7 passes through the solution pump g7, the solution heat exchanger k7 and then connects the high pressure generator a7 into that the pipe from the absorber f7 passes through the solution pump g7, the solution heat exchanger k7, the new solution heat exchanger 5 and then connects the new absorption-evaporator 2. And the pipe of dilute solution from the new absorption-evaporator 2 passes through the new solution pump 4 and then connects the new absorber 1. And the pipe of dilute solution from the new absorber 1 passes through the second new solution pump 8, the new solution heat exchanger 5 and then connects the high pressure generator a7.

After that the added pipe of refrigerant vapor from the collection steam-steam separator n7 connects the new absorption-evaporator 2 and the added pipe of the liquid refrigerant from the evaporator c7 passes through the new liquid refrigerant pump 7 and then connects the new absorption-evaporator 2, the pipe of refrigerant vapor from the new absorption-evaporator 2 connects the new absorber 1. At the same time, the pipe of heated medium from the new absorber 1 connects external.

The absorber f7, the condenser b7 and the new absorber 1 supply heat to the heated medium separately. The new absorber 1 becomes the adjacent high-temperature heating-side of the absorber f7 and the condenser b7. At last we get the three-terminal heating absorption heat pump with high-temperature heating-side based on two-terminal heating two-generator two-stage heat pump.

Figure 1:
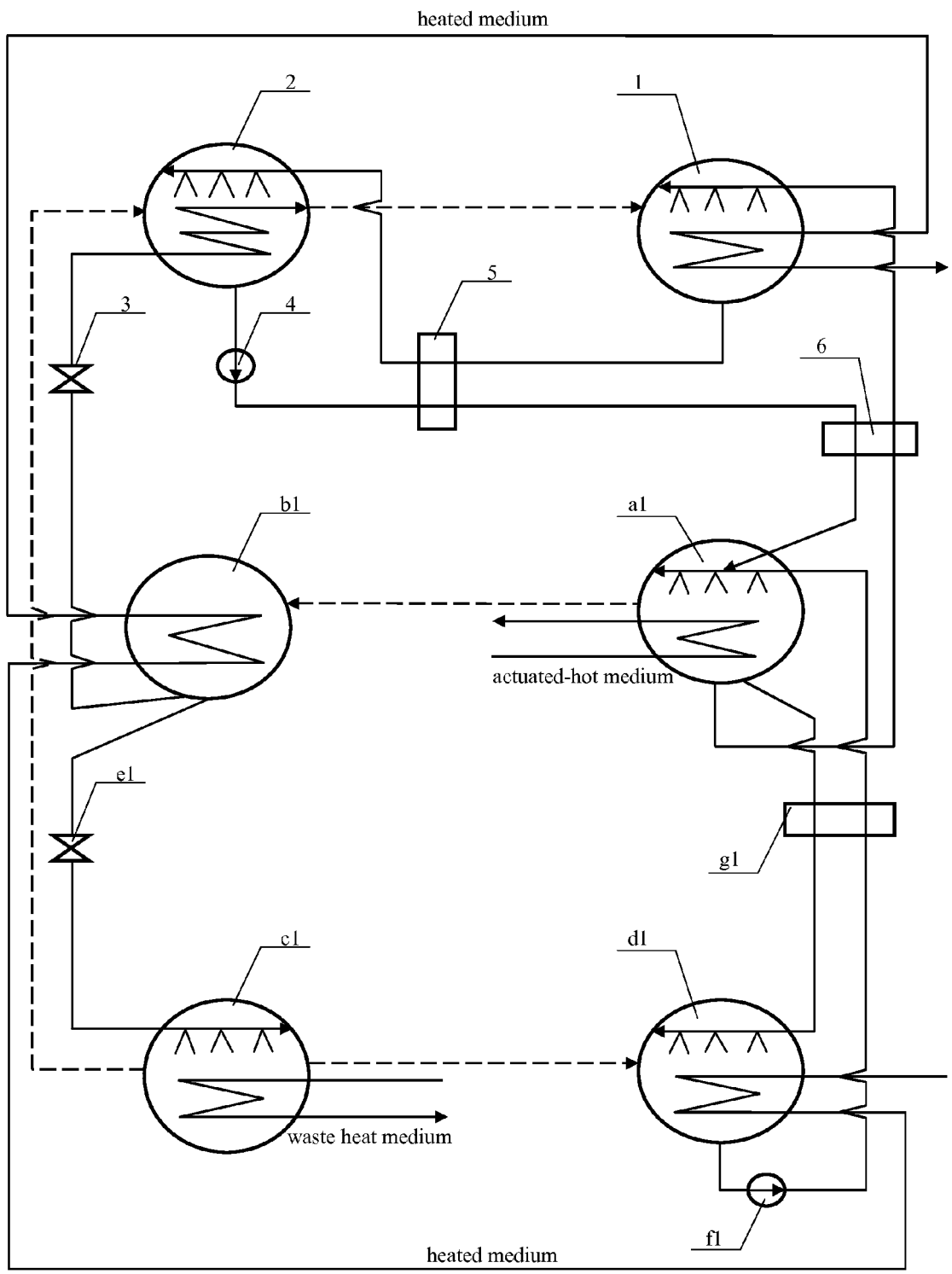
FIG. 1 provides the first construction and flow diagram of absorption heat pump with three-terminal heating that consists of adding an adjacent high-temperature heating-side to the single-stage single-effect absorption heat pump.

Shown in FIG. 56, according to the method provided by the invention, the process of adding a high-temperature heating-side to the absorption heat pump can be as follows:

On the absorption heat pump shown in FIG. 1, we add the adding absorber a, the adding absorption-evaporator b, the adding throttle c, the adding solution pump d, the adding solution heat exchanger e, the second adding solution heat exchanger f.

And the added pipe of concentrated solution from generator a1 passes through the second adding solution heat exchanger f and then connects the adding absorber a. And the pipe of dilute solution from the adding absorber a passes through the adding solution heat exchanger e and then connects the adding absorption-evaporator b. And the pipe of dilute solution from the adding absorption-evaporator b passes through the adding solution pump d, the adding solution heat exchanger e, the second adding solution heat exchanger f and then connects the generator a1.

The added pipe of refrigerant vapor from the new absorption-evaporator 2 connects the adding absorption-evaporator b. And the added pipe of the liquid refrigerant from the condenser b1 passes through the adding throttle c and then connects the adding absorption-evaporator b. After that, the pipe of refrigerant vapor from the adding absorption-evaporator b connects the adding absorber a. At the same time, the pipe of heated medium from the adding absorber a. connects external.

The adding absorber a. becomes the adjacent high-temperature heating-side of absorber 1. Therefore, we get the absorption heat pump with high-temperature heating-side.

Shown in FIG. 57, according to the method provided by the invention, the process of adding a high-temperature heating-side to the absorption heat pump can be as follows:

On the absorption heat pump shown in FIG. 3, we add the adding absorber a, the adding absorption-evaporator b, the adding the liquid refrigerant pump g, the adding solution pump d, the adding solution heat exchanger e, the second the adding solution pump h.

And the added pipe of concentrated solution from generator a1 passes through the adding solution heat exchanger e and then connects the adding absorption-evaporator b. And the pipe of dilute solution from the adding absorption-evaporator b passes through the adding solution pump d and then connects the adding absorber a. And the pipe of dilute solution from the adding absorber a passes through adding the second solution pump h, the adding solution heat exchanger e and then connects the generator a1.

The added pipe of refrigerant vapor from the new absorption-evaporator 2 connects the adding absorption-evaporator b. And the added pipe of the liquid refrigerant from the evaporator c1 passes through the adding the liquid refrigerant pump g and then connects the adding absorption-evaporator b. After that, the pipe of refrigerant vapor from the adding absorption-evaporator b connects the adding absorber a. At the same time, the pipe of heated medium from the adding absorber a. connects external.

The adding absorber a becomes the adjacent high-temperature heating-side of absorber 1. Therefore, we get the absorption heat pump with high-temperature heating-side.

Shown in FIG. 58, according to the method provided by the invention, the process of adding a high-temperature heating-side to the absorption heat pump can also be as follows:

On the absorption heat pump shown in FIG. 1, we add the adding absorber a, the adding absorption-evaporator b, the adding throttle c, the adding solution pump d, the adding solution heat exchanger e. Change the pipe from the generator a1 passes through the second new solution heat exchanger 6 and then connects the new the generator a1 into that the pipe from the generator a1 passes through the second new solution heat exchanger 6 and then connects the adding absorber a.

And the added pipe of dilute solution from the adding absorber a passes through the adding solution heat exchanger e and then connects the adding absorption-evaporator b. And the pipe of dilute solution from the adding absorption-evaporator b passes through the adding solution pump d, the adding solution heat exchanger e and then connects the new absorber 1.

The added pipe of refrigerant vapor from the new absorption-evaporator 2 connects the adding absorption-evaporator b. And the added pipe of the liquid refrigerant from the condenser b1 passes through the adding throttle c and then connects the adding absorption-evaporator b. After that, the pipe of refrigerant vapor from the adding absorption-evaporator b connects the adding absorber a. At the same time, the pipe of heated medium from the adding absorber connects the external.

The adding absorber a becomes the adjacent high-temperature heating-side of absorber 1. Therefore, we get the absorption heat pump with high-temperature heating-side.

Shown in FIG. 59, according to the method provided by the invention, the process of adding a high-temperature heating-side to the absorption heat pump can also be as follows:

On the absorption heat pump shown in FIG. 3, we add the adding absorber a, the adding absorption-evaporator b, the adding throttle c, the adding solution pump d, the adding solution heat exchanger e. Change the pipe from dilute solution provider passes through the solution pump f1, the solution heat exchanger g1 and then connects the new the generator a1 into that the pipe from dilute solution provider passes through the solution pump f1, the solution heat exchanger g1 and then connects the adding absorber a. And the added pipe of dilute solution from the adding absorber a passes through the adding solution heat exchanger e and then connects the adding absorption-evaporator b. And the pipe of dilute solution from the adding absorption-evaporator b passes through the adding solution pump d, the adding solution heat exchanger e and then connects the new absorber 1.

The added pipe of refrigerant vapor from the new absorption-evaporator 2 connects the adding absorption-evaporator b. And the added pipe of the liquid refrigerant from the evaporator c1 passes through the adding the liquid refrigerant pump g and then connects the adding absorption-evaporator b. After that, the pipe of refrigerant vapor from the adding absorption-evaporator b connects the adding absorber a. And change the pipe of the liquid refrigerant from the condenser b1 passes through the new throttle 3 and then connects the new absorption-evaporator 2 into that the pipe of the liquid refrigerant from the evaporator c1 passes through the adding the liquid refrigerant pump g, the new throttle 3 and then connects the new absorption-evaporator 2. At the same time, the pipe of heated medium from the adding absorber a connects external.

The adding absorber a becomes the adjacent high-temperature heating-side of absorber 1. Therefore, we get the absorption heat pump with high-temperature heating-side.

What should be especially pointed out is that, from FIG. 56 to FIG. 59, we can get the representative of absorption heat pump with two-terminal heating by the different ways in which we add high-temperature heating-side again after adding high-temperature heating-side on it.

From these four specific examples, the techniques in this field can get other absorption heat pump with additional high-temperature heating-side by adopting the similar measures on absorption heat pump.

The effect and advantage of this invention which provides the method of additional adjacent high-temperature heating-side and the absorption heat pump with multiterminal heating is as follows:

① Using the method of this invention, we can gain new heat pump with different stages. It enriches the type and stage of heat pump and realizes a better match between the heating of heat pump and the need of users and expands the application range of absorption heat pump.

② Using the method of this invention, we can get the new system of heat pump with simple structure, reasonable process and a higher COP.

③ The new system of heat pump can use the waste heat with lower temperature or promote a higher heating temperature.

④ The new system of heat pump can decrease the need temperature of actuated-hot resources or refrigerating medium.

⑤ Using the new system of heat pump based on the method of this invention, we can get a better use of the value of actuated-hot resources.

In all, using the new system of heat pump and combining the existing absorption heat pump, we can get a series of absorption heat pump with multiterminal heating of different stages and structures. The method realizes the diversity of heat pump/refrigeration unit and meets the heating/cooling need of users in a better way. The unit has simple structure and high COP and can promote the using value of actuated-hot resources and waste heat resources. It has the characterizations of novelty, creativity and practicality.

What is claimed is:

1. A method of adding an adjacent high-temperature heating-side on a multi-terminal heating type I absorption heat pump, which is based on a type I absorption heat pump using an absorber and a condenser to heat the heated media of two or more stages, wherein the method of changing the type I absorption heat pump comprises the steps of: adding components including an additional absorber, an additional absorption-evaporator, an additional throttle or a liquid refrigerant pump, an additional solution pump, an additional solution heat exchanger and second solution heat exchanger;

wherein an added pipe of concentrated solution from a concentrated solution generator passes through the second new solution heat exchanger and then connects the additional absorber, wherein a pipe of dilute solution from the additional absorber passes through the additional solution heat exchanger and then connects the additional absorption-evaporator, wherein the pipe of dilute solution from the additional absorption-evaporator passes through the additional solution pump, the additional solution heat exchanger and the second new solution heat exchanger and then connects the concentrated solution generator;

adding a pipe of cold agent steam from a refrigerant vapor provider to the additional absorption evaporator, wherein the refrigerant vapor provider is an evaporator, an absorption-evaporator or a low pressure generator, or an absorption-evaporator and a low pressure generator; adding a pipe of cold agent liquid, from the condenser through the additional throttle or from the evaporator through the additional liquid refrigerant pump to the additional absorption-evaporator, then to the additional absorber through pipes of refrigerant vapor; adding pipes of heated media in the additional absorber which connects with outside components, and the process making the additional absorber into an adjacent high-temperature heating-side of heat pump.

2. The method, as recited in claim 1, further comprising a three-terminal heating type I absorption heat pump which increases adjacent high-temperature heating-side on single-stage single-effect type I absorption heat pump of double-terminal heating made up of a generator, the condenser, the evaporator, the absorber, a throttle, the solution pump and a solution heat exchanger, wherein the change of single-stage single-effect type I absorption heat pump comprises the steps of: adding components including the additional absorber (1), the additional absorption-evaporator (2), the additional throttle (3) or the liquid refrigerant pump (7), the additional solution pump (4), the additional solution heat exchanger (5) and the second solution heat exchanger (6);

wherein the added pipe of concentrated solution from the generator (a1) passes through the second new solution heat exchanger (6) and then connects the additional absorber (1), wherein the pipe of dilute solution from the absorber (1) passes through the additional solution heat exchanger (5) and then connects the additional absorption-evaporator (2), wherein the pipe of dilute solution from the additional absorption-evaporator (2) passes through the additional solution pump (4), the additional solution heat exchanger (5), and then connects the generator (a1);

adding the pipe of cold agent steam from evaporator (e1) to the additional absorption-evaporator (2); adding the pipe of cold agent liquid from condenser (b1) through the additional throttle (3) or from evaporator (e1) through the additional liquid refrigerant pump (7) to the additional absorption-evaporator (2), then to the additional absorber (1) through pipes of refrigerant vapor; adding pipes of heated media in the additional absorber (1) which connects with outside components, wherein the absorber (d1), condenser (b1) and the additional absorber (1) all heat the heated media, wherein the additional absorber (1) becomes adjacent high-temperature heating-side of the absorber (d1) or condenser (b1).

3. The method, as recited in claim 1, further comprising a three-terminal heating type I absorption heat pump which increases adjacent high-temperature heating-side on concatenated loops single-stage double-effect type I absorption heat pump of double-terminal heating made up of a high pressure generator, a low pressure generator, the condenser, the evaporator, the absorber, the throttle, a second throttle, the solution pump, a second solution pump, the solution heat exchanger and a second solution heat exchanger, wherein the change of concatenated loops single-stage double-effect type I absorption heat pump comprises the steps of: adding components including the additional absorber (1), the additional absorption-evaporator (2), the additional throttle (3) or the liquid refrigerant pump (7), the additional solution pump (4), the additional solution heat exchanger (5) and the second solution heat exchanger (6);

wherein the added pipe of concentrated solution from the low pressure generator (b2) or the high pressure generator (a2) passes through the second new solution heat exchanger (6) and then connects the additional absorber (1), wherein the pipe of dilute solution from the additional absorber (1) passes through the additional solution heat exchanger (5) and then connects the additional absorption-evaporator (2), wherein the pipe of dilute solution from the additional absorption-evaporator (2) passes through the additional solution pump (4), the additional solution heat exchanger (5), the second new solution heat exchanger (6) and then connects the low pressure generator (b2) or the high pressure generator (a2);

adding the pipe of cold agent steam from the evaporator (d2) to the additional absorption-evaporator (2); adding the pipe of cold agent liquid from the condenser (c2) through the additional throttle (3) or from the evaporator (d2) through the additional liquid refrigerant pump (7) to the additional absorption-evaporator (2), then to the additional absorber (1) through pipes of refrigerant vapor; adding pipes of heated media in the additional absorber (1) which connect with outside components, wherein the absorber (e2), the condenser (c2) and the additional absorber (1) all heat the heated media, wherein the additional absorber (1) becomes adjacent high-temperature heating-side of the absorber (e2) or the condenser (c2).

4. The method, as recited in claim 1, further comprising a three-terminal heating type I absorption heat pump which increases adjacent high-temperature heating-side on concatenated loops single-stage double-effect type I absorption heat pump of double-terminal heating made up of the high pressure generator, the low pressure generator, the condenser, the evaporator, the absorber, throttle, the second throttle, the solution pump, the solution heat exchanger and the second solution heat exchanger, wherein the change of concatenated loops single-stage double-effect type I absorption heat pump comprises the steps of: adding components including the additional absorber (1), the additional absorption-evaporator (2), the additional throttle (3) or the liquid refrigerant pump (7), the additional solution pump (4), the additional solution heat exchanger (5) and second solution heat exchanger (6);

wherein the added pipe of concentrated solution from the low pressure generator (b2) or the high pressure generator (a2) passes through the second new solution heat exchanger (6) and then connects the additional absorber (1), wherein the pipe of dilute solution from the additional absorber (1) passes through the additional solution heat exchanger (5) and then connects the additional absorption-evaporator (2), wherein the pipe of dilute solution from the additional absorption-evaporator (2) passes through the additional solution pump (4), the additional solution heat exchanger (5), the second new solution heat exchanger (6) and then connects the low pressure generator (b2) or the high pressure generator (a2);

adding the pipe of cold agent steam from the evaporator (d2) to the additional absorption-evaporator (2); adding the pipe of cold agent liquid from the condenser (c2) through the additional throttle (3) or from the evaporator (d2) through the additional liquid refrigerant pump (7) to the additional absorption-evaporator (2), then to the additional absorber (1) through pipes of refrigerant vapor; adding pipes of heated media in the additional absorber (1) which connect with outside components, wherein the absorber (e2), the condenser (c2) and the additional absorber (1) all heat the heated media, wherein the additional absorber (1) becomes adjacent high-temperature heating-side of the absorber (e2) or the condenser (c2).

5. The method, as recited in claim 1, further comprising a three-terminal heating type I absorption heat pump which increases adjacent high-temperature heating-side on parallel circulation single-stage double-effect type I absorption heat pump of double-terminal heating made up of a high pressure generator, the low pressure generator, the condenser, the evaporator, the absorber, the throttle, the second throttle, the solution pump, the solution heat exchanger and the second solution heat exchanger, wherein the change of concatenated loops single-stage double-effect type I absorption heat pump comprises the steps of: adding components including the additional absorber (1), the additional absorption-evaporator (2), the additional throttle (3) or the liquid refrigerant pump (7), the additional solution pump (4), the additional solution heat exchanger (5) and second solution heat exchanger (6);

wherein the added pipe of concentrated solution from the low pressure generator (b2) or the high pressure generator (a2) passes through the second new solution heat exchanger (6) and then connects the additional absorber (1), wherein the pipe of dilute solution from the additional absorber (1) passes through the additional solution heat exchanger (5) and then connects the additional absorption-evaporator (2), wherein the pipe of dilute solution from the additional absorption-evaporator (2)

passes through the additional solution pump (4), the additional solution heat exchanger (5), the second new solution heat exchanger (6) and then connects the low pressure generator (b2) or the high pressure generator (a2);

adding the pipe of cold agent steam from the evaporator (d2) to the additional absorption-evaporator (2); adding the pipe of cold agent liquid from the condenser (c2) through the additional throttle (3) or from the evaporator (d2) through the additional liquid refrigerant pump (7) to the additional absorption-evaporator (2), then to the additional absorber (1) through pipes of refrigerant vapor; adding pipes of heated media in the additional absorber (1) which connect with outside components, wherein the absorber (e2), the condenser (c2) and the additional absorber (1) all heat the heated media, wherein the additional absorber (1) becomes adjacent high-temperature heating-side of the absorber (e2) or the condenser (c2).

6. The method, as recited in claim 1, further comprising a three-terminal heating type I absorption heat pump which increases adjacent high-temperature heating-side on concatenated loops single-stage triple-effect type I absorption heat pump of double-terminal heating made up of the high pressure generator, a medium pressure generator, the low pressure generator, the condenser, the evaporator, the absorber, the throttle, the second throttle, a third throttle, the solution pump, the second solution pump, a third solution pump, the solution heat exchanger, the second solution heat exchanger and a third solution heat exchanger, wherein the change of concatenated loops single-stage triple-effect type I absorption heat pump comprises the steps of: adding components including the additional absorber (1), the additional absorption-evaporator (2), the additional throttle (3) or the liquid refrigerant pump (7), the additional solution pump (4), the additional solution heat exchanger (5) and second solution heat exchanger (6);

wherein the pipe of concentrated solution from the low pressure generator (c3) or the medium pressure generator (b3) or the high pressure generator (a3) passes through the second new solution heat exchanger (6) and then connects the additional absorber (1), wherein the pipe of dilute solution from the additional absorber (1) passes through the additional solution heat exchanger (5) and then connects the additional absorption-evaporator (2), wherein the pipe of dilute solution from the additional absorption-evaporator (2) passes through the additional solution pump (4), the additional solution heat exchanger (5) and the second new solution heat exchanger (6) and then connects the low pressure generator (c3) or the medium pressure generator (b3) or the high pressure generator (a3);

adding the pipe of cold agent steam from the evaporator (e3) to the additional absorption-evaporator (2); adding the pipe of cold agent liquid from the condenser (d3) through the additional throttle (3) or from the evaporator (e3) through the additional liquid refrigerant pump (7) to the additional absorption-evaporator (2), then to the additional absorber (1) through pipes of refrigerant vapor; adding pipes of heated media in the additional absorber (1) which connect with outside components, wherein the absorber (f3), the condenser (d3) and the additional absorber (1) all heat the heated media, wherein the additional absorber (1) becomes adjacent high-temperature heating-side of the absorber (f3) or the condenser (d3).

7. The method, as recited in claim 1, further comprising a three-terminal heating type I absorption heat pump which increases adjacent high-temperature heating-side on concatenated loops single-stage triple-effect type I absorption heat pump of double-terminal heating made up of the high pressure generator, the medium pressure generator, the low pressure generator, the condenser, the evaporator, the absorber, the throttle, the second throttle, the third throttle, the solution pump, the solution heat exchanger, the second solution heat exchanger and the third solution heat exchanger, wherein the change of concatenated loops single-stage triple-effect type I absorption heat pump comprises the steps of: adding components including the additional absorber (1), the additional absorption-evaporator (2), the additional throttle (3) or the liquid refrigerant pump (7), the additional solution pump (4), the additional solution heat exchanger (5) and second solution heat exchanger (6);

wherein the pipe of concentrated solution from the low pressure generator (c3) or the medium pressure generator (b3) or the high pressure generator (a3) passes through the second new solution heat exchanger (6) and then connects the additional absorber (1), wherein the pipe of dilute solution from the additional absorber (1) passes through the additional solution heat exchanger (5) and then connects the additional absorption-evaporator (2), wherein the pipe of dilute solution from the additional absorption-evaporator (2) passes through the additional solution pump (4), the additional solution heat exchanger (5) and the second new solution heat exchanger (6) and then connects the low pressure generator (c3) or the medium pressure generator (b3) or the high pressure generator (a3);

adding the pipe of cold agent steam from the evaporator (e3) to the additional absorption-evaporator (2); adding the pipe of cold agent liquid from the condenser (d3) through the additional throttle (3) or from the evaporator (e3) through the additional liquid refrigerant pump (7) to the additional absorption-evaporator (2), then to the additional absorber (1) through pipes of refrigerant vapor; adding pipes of heated media in the additional absorber (1) which connect with outside components, wherein the absorber (f3), the condenser (d3) and the additional absorber (1) all heat the heated media, wherein the additional absorber (1) becomes adjacent high-temperature heating-side of the absorber (f3) or the condenser (d3).

8. The method, as recited in claim 1, further comprising a three-terminal heating type I absorption heat pump which increases adjacent high-temperature heating-side on parallel circulation single-stage triple-effect type I absorption heat pump of double-terminal heating made up of the high pressure generator, the medium pressure generator, the low pressure generator, the condenser, the evaporator, the absorber, the throttle, the second throttle, the third throttle, the solution pump, the solution heat exchanger, the second solution heat exchanger and the third solution heat exchanger, wherein the change of concatenated loops single-stage triple-effect type I absorption heat pump comprises the steps of: adding components including the additional absorber (1), the additional absorption-evaporator (2), the additional throttle (3) or the liquid refrigerant pump (7), the additional solution pump (4), the additional solution heat exchanger (5) and second solution heat exchanger (6);

wherein the pipe of concentrated solution from the low pressure generator (c3) or the medium pressure generator (b3) or the high pressure generator (a3) passes through the second new solution heat exchanger (6) and then connects the additional absorber (1), wherein the pipe of dilute solution from the additional absorber (1) passes through the additional solution heat exchanger (5) and then connects the additional absorption-evaporator (2), wherein the pipe of dilute solution from the additional absorption-evaporator (2) passes through the additional solution pump (4), the additional solution heat exchanger (5) and the second new solution heat exchanger (6) and then connects the low pressure generator (c3) or the medium pressure generator (b3) or the high pressure generator (a3);

adding the pipe of cold agent steam from the evaporator (e3) to the additional absorption-evaporator (2); adding the pipe of cold agent liquid from the condenser (d3) through the additional throttle (3) or from the evaporator (e3) through the additional liquid refrigerant pump (7) to the additional absorption-evaporator (2), then to the additional absorber (1) through pipes of refrigerant vapor; adding pipes of heated media in the additional absorber (1) which connect with outside components, wherein the absorber (f3), the condenser (d3) and the additional absorber (1) all heat the heated media, wherein the additional absorber (1) becomes adjacent high-temperature heating-side of the absorber (f3) or the condenser (d3).

9. The method, as recited in claim 1, further comprising a three-terminal heating type I absorption heat pump which increases adjacent high-temperature heating-side on single-generator two-stage type I absorption heat pump of double-terminal heating, which provides refrigerant vapor from absorption-evaporator to the absorber and is made up of the generator, the condenser, the evaporator, the absorption-evaporator, the absorber, the solution pump, the throttle, the second throttle or the liquid refrigerant, the solution heat exchanger and the second solution heat exchanger, wherein the change of single-generator two-stage type I absorption heat pump comprises the steps of: adding components including the additional absorber (1), the additional absorption-evaporator (2), the additional throttle (3) or the liquid refrigerant pump (7), the additional solution pump (4), the additional solution heat exchanger (5) and second solution heat exchanger (6);

wherein the added pipe of concentrated solution from the generator (a4) passes through the second new solution heat pump (6) and then connects the additional absorber (1), wherein the pipe of dilute solution from the additional absorber (1) passes through the additional solution heat exchanger (5) and then connects the additional absorption-evaporator (2), wherein the pipe of dilute solution from the additional absorption-evaporator (2) passes through the additional solution pump (4), the additional solution heat exchanger (5) and the second new solution heat exchanger (6) and then connects the generator (a4);

adding the pipe of cold agent steam from the absorption-evaporator (e4) to the additional absorption-evaporator (2); adding the pipe of cold agent liquid from the condenser (b4) through the additional throttle (3) or from the evaporator (c4) through the additional liquid refrigerant pump (7) to the additional absorption-evaporator (2), then to the additional absorber (1) through pipes of refrigerant vapor; adding pipes of heated media in the additional absorber (1) which connect with outside components, wherein the absorber (d4), the condenser (b4) and the additional absorber (1) all heat the heated media, wherein the additional absorber (1) becomes adjacent high-temperature heating-side of the absorber (d4) or the condenser (b4).

10. The method, as recited in claim 1, further comprising a four-terminal heating type I absorption heat pump which increases adjacent high-temperature heating-side on two-generator two-stage type I absorption heat pump of three-terminal heating, which provides refrigerant vapor from the low pressure generator to the high pressure absorber and is made up of the high pressure generator, the condenser, a high pressure absorber, the throttle, the solution pump, solution heat exchanger, the low pressure generator, a low pressure absorber, the second solution pump and the second solution heat exchanger, wherein the change o two-generator two-stage type I absorption heat pump comprises the steps of: adding components including the additional absorber (1), the additional absorption-evaporator (2), the additional throttle (3) or the liquid refrigerant pump (7), the additional solution pump (4), the additional solution heat exchanger (5) and second solution heat exchanger (6);

wherein the pipe of concentrated solution from the high pressure generator (a5) passes through the second new solution heat pump (6) and then connects the additional absorber (1), wherein the pipe of dilute solution from the additional absorber (1) passes through the additional solution heat exchanger (5) and then connects the additional absorption-evaporator (2), wherein the pipe of dilute solution from the additional absorption-evaporator (2) passes through the additional solution pump (4), the additional solution heat exchanger (5) and the second new heat exchanger (6) and then connects the high pressure generator (a5);

adding the pipe of cold agent steam from the low pressure generator (h5) to the additional absorption-evaporator (2); adding the pipe of cold agent liquid from the condenser (b5) through the additional throttle (3) or from the evaporator (c5) through the additional liquid refrigerant pump (7) to the additional absorption-evaporator (2), then to the additional absorber (1) through pipes of refrigerant vapor; adding pipes of heated media in the additional absorber (1) which connect with outside components, wherein the low pressure absorber (i5), the high pressure absorber (d5), the condenser (b5) and the additional absorber (1) all heat the heated media, wherein the additional absorber (1) becomes adjacent high-temperature heating-side of the high pressure absorber (d5) or condenser (b5).

11. The method, as recited in claim 1, further comprising a five-terminal heating type I absorption heat pump which increases adjacent high-temperature heating-side on two-stage type I absorption heat pump of four-terminal heating, which provides refrigerant vapor to the high pressure absorber and the low pressure condenser from the low pressure generator and is made up of the high pressure generator, a high pressure condenser, a low pressure condenser, evaporator, the low pressure absorber, the low pressure generator, the high pressure absorber, the solution pump, the second solution pump, the throttle, the second throttle, solution heat exchanger and the second solution heat exchanger, wherein the change of two-generator two-stage type I absorption heat pump comprises the steps of: adding components including the additional absorber (1), the additional absorption-evaporator (2), the additional throttle (3) or the liquid refrigerant pump (7), the additional solution pump (4), the additional solution heat exchanger (5) and second solution heat exchanger (6);

wherein the pipe of concentrated solution from the high pressure generator (a6) passes through the second new solution heat pump (6) and then connects the additional absorber (1), wherein the pipe of dilute solution from the additional absorber (1) passes through the additional solution heat exchanger (5) and then connects the additional absorption-evaporator (2), wherein the pipe of dilute solution from the additional absorption-evaporator (2) passes through the additional solution pump (4), the additional solution heat exchanger (5) and the second new heat exchanger (6) and then connects the high pressure generator (a6);

adding the pipe of cold agent steam from the low pressure generator (f6) to the additional absorption-evaporator (2); adding the pipe of cold agent liquid from the high pressure condenser (b6) through the additional throttle (3) or from the evaporator (d6) through the additional liquid refrigerant pump (7) to the additional absorption-evaporator (2), then to the additional absorber (1) through pipes of refrigerant vapor; adding pipes of heated media in the additional absorber (1) which connect with outside components, wherein the low pressure absorber (e6), the low pressure condenser (c6), the high pressure absorber (g6), the high pressure condenser (b6) and the additional absorber (1) all heat the heated media, wherein the additional absorber (1) becomes adjacent high-temperature heating-side of the high pressure absorber (g6) or the high pressure condenser (b6).

12. The method, as recited in claim 1, further comprising a three-terminal heating type I absorption heat pump which increases adjacent high-temperature heating-side on two-stage type I absorption heat pump of two-terminal heating, which provides refrigerant vapor to absorber from the absorption-evaporator and the low pressure generator by collection steam-steam separator and is made up of the high pressure generator, the condenser, evaporator, the absorption-evaporator, the low pressure generator, the absorber, the solution pump, the second solution pump, the throttle, the second throttle, the solution heat exchanger, the second solution heat exchanger and a collection steam-steam separator, wherein the change of two-generator two-stage type I absorption heat pump comprises the steps of: adding components including the additional absorber (1), the additional absorption-evaporator (2), the additional throttle (3) or the liquid refrigerant pump (7), the additional solution pump (4), the additional solution heat exchanger (5) and second solution heat exchanger (6);

wherein the pipe of concentrated solution from the high pressure generator (a7) passes through the second new solution heat pump (6) and then connects the additional absorber (1), wherein the pipe of dilute solution from the additional absorber (1) passes through the additional solution heat exchanger (5) and then connects the additional absorption-evaporator (2), wherein the pipe of dilute solution from the additional absorption-evaporator (2) passes through the additional solution pump (4), the additional solution heat exchanger (5) and the second new heat exchanger (6) and then connects the high pressure generator (a7);

adding the pipe of cold agent steam from the collection steam-steam separator (n7) to the additional absorption-evaporator (2); adding the pipe of cold agent liquid from the condenser (b7) through the additional throttle (3) or from the evaporator (c7) through the additional liquid refrigerant pump (7) to the additional absorption-evaporator (2), then to the additional absorber (1) through pipes of refrigerant vapor; adding pipes of heated media in the additional absorber (1) which connect with outside components, wherein the absorber (f7), the condenser (b7) and the additional absorber (1) all heat the heated media, wherein the additional absorber (1) becomes adjacent high-temperature heating-side of the absorber (f7) or the condenser (b7).

13. A type I absorption heat pump with adding high-temperature heating-side, wherein the change of increasing high-temperature heating-side type I absorption heat pump as recited in claim 2 comprises the steps of: adding components including an absorber (a), an absorption-evaporator (b), a throttle (c) or a liquid refrigerant pump (g), a solution pump (d), a solution heat exchanger (e) and a second solution heat exchanger (f);

wherein the added pipe of the concentrated solution from the concentrated solution generator passes through adding the second solution heat exchanger (f) and then connects the adding absorber (a), wherein the pipe of dilute solution from the adding absorber (a) passes through the adding solution heat exchanger (e) and then connects the adding absorption-evaporator (b), wherein the pipe of dilute solution from adding absorption-evaporator (b) passes through the adding solution pump (d), the adding solution heat exchanger (e), adding the second solution heat exchanger (f) and then connects the concentrated solution generator;

adding the pipe of cold agent liquid from the condenser through the throttle (c) or from the evaporator through the liquid refrigerant pump (g) to the absorption-evaporator (b), then to the absorber (a) through pipes of refrigerant vapor; And changing the pipe of cold agent liquid from the condenser through the additional throttle (3) to the additional absorption-evaporator (2) into the pipe of cold agent liquid from the evaporator through the added liquid refrigerant pump (g) and the additional throttle (3) to the additional absorption-evaporator (2); adding the pipe of cold agent steam from the additional absorption-evaporator (2) to the adding absorption-evaporator (b), wherein there is heated media in the adding absorber (a) which connect with outside components, wherein the adding absorber (a) becomes adjacent high-temperature heating-side of the additional absorber.

* * * * *